United States Patent
Ikai et al.

(10) Patent No.: US 10,244,256 B2
(45) Date of Patent: Mar. 26, 2019

(54) IMAGE DECODING DEVICE

(71) Applicant: SHARP KABUSHIKI KAISHA, Sakai, Osaka (JP)

(72) Inventors: Tomohiro Ikai, Sakai (JP); Takeshi Tsukuba, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/517,429

(22) PCT Filed: Oct. 6, 2015

(86) PCT No.: PCT/JP2015/078347
§ 371 (c)(1),
(2) Date: Apr. 6, 2017

(87) PCT Pub. No.: WO2016/056550
PCT Pub. Date: Apr. 14, 2016

(65) Prior Publication Data
US 2017/0302961 A1    Oct. 19, 2017

(30) Foreign Application Priority Data
Jan. 29, 2015 (JP) ................. 2015-015036

(51) Int. Cl.
*H04N 19/593* (2014.01)
*H04N 19/597* (2014.01)
(Continued)

(52) U.S. Cl.
CPC ........... *H04N 19/593* (2014.11); *H04N 19/11* (2014.11); *H04N 19/17* (2014.11); *H04N 19/176* (2014.11); *H04N 19/597* (2014.11); *H04N 19/70* (2014.11)

(58) Field of Classification Search
CPC .... H04N 19/593; H04N 19/17; H04N 19/597; H04N 19/70; H04N 19/105; H04N 19/119; H04N 19/44; H04N 19/52
See application file for complete search history.

(56) References Cited

U.S. PATENT DOCUMENTS

2014/0341290 A1* 11/2014 Merkle .................. H04N 19/52
375/240.16
2015/0172717 A1* 6/2015 Zhao .................... H04N 19/597
375/240.16
(Continued)

FOREIGN PATENT DOCUMENTS

EP           1 087 533 A1    3/2001
WO    WO 99/55007 A1    10/1999

OTHER PUBLICATIONS

Ikai et al., "Combination of JCT3V-J0025 and JCT3V-J0035 for DMM", Joint Collaborative Team on 3D Video Coding Extensions of ITU-T SG 16 WP 3 and ISO/IEC JTC 1/SC 29/WG 11, 10th Meeting: Strasbourg, FR, Oct. 18-24, 2014, Document: JCT3V-J0112, 11 pgs.
(Continued)

*Primary Examiner* — Yon J Couso
(74) *Attorney, Agent, or Firm* — Birch, Stewart, Kolasch & Birch, LLP

(57) ABSTRACT

In generation of a wedgelet pattern, all the patterns are generated through a line segment drawing process and a region filling process. Therefore, there is a problem that a processing amount is large.

A moving image decoding device (1) includes: a wedgelet pattern generation section (145T4) that generates a wedge pattern; a rotation pattern generation section (1465) that derives a rotation pattern by rotating the wedge pattern; a pattern storage section (1464) that adds the rotation pattern to a wedge pattern table; and a DC prediction value deri-
(Continued)

vation section (145T3) that derives a prediction value of each region partitioned in the wedge pattern included in the wedge pattern table (145T5).

6 Claims, 32 Drawing Sheets

(51) Int. Cl.
    *H04N 19/70*     (2014.01)
    *H04N 19/17*     (2014.01)
    *H04N 19/176*    (2014.01)
    *H04N 19/11*     (2014.01)

(56) References Cited

U.S. PATENT DOCUMENTS

2017/0006309 A1*   1/2017   Liu ...................... H04N 19/176
2017/0251224 A1*   8/2017   Lee ...................... H04N 19/597

OTHER PUBLICATIONS

Ikai et al., "Simplification of DMM table derivation", Joint Collaborative Team on 3D Video Coding Extensions of ITU-T SG 16 WP 3 and ISO/IEC JTC 1/SC 29/WG 11, 10th Meeting: Strasbourg, FR, Oct. 18-24, 2014, Document: JCT3V-J0025_r1, 8 pgs.
Tech et al., "3D-HEVC Draft Text 5", Joint Collaborative Team on 3D Video Coding Extensions of ITU-T SG 16 WP 3 and ISO/IEC JTC 1/SC 29/WG 11, 9th Meeting: Sapporo, JP, Jul. 3-9, 2014, Document: JCT3V-I1001-v3, 10 pgs.

* cited by examiner

FIG. 4

(a) | VPS | SPS#0 | SPS#1 | PPS#0 | PPS#1 | SEI | PICT #0 | PICT #1 |

(b) PICT

| $S_1$ | $S_2$ | ........ | $S_{NS}$ |

(c) S

| SH | $TBLK_1$ | $TBLK_2$ | ........ | $TBLK_{NC}$ |

SDATA (d) TBLK

| TBLKH | | | $CU_1$ | $CU_2$ | ..... | $CU_{NL}$ |
| SP_TBLK | Δqp | ... | | | | |

(e) CU

| SKIP | PTI | | TTI | | | |
| | PType | PInfo | SP_TU | $TUI_1$ | ... | $TUI_{NT}$ |

| coding_unit(x0, y0, log2CbSize, ctDepth) { | Descriptor |
|---|---|
| ... | |
|   if( sdcEnableFlag ) | |
|     sdc_flag[ x0 ][ y0 ] | ae(v) |
|   if(PredMode[ x0 ][ y0 ] == MODE_INTRA) { | |
|     if(PartMode == PART_2Nx2N && pcm_enabled_flag && | |
|       log2CbSize >= Log2MinIpcmCbSizeY && | |
|       log2CbSize <= Log2MaxIpcmCbSizeY ) | |
|     ... | |
|     pbOffset = ( PartMode == PART_NxN ) ? ( nCbS / 2 ) : nCbS | |
|     log2PbSize = log2CbSize − ( ( PartMode == PART_NxN ) ? 1 : 0 ) | |
|     for( j = 0; j < nCbS; j = j + pbOffset ) | |
|       for( i = 0; i < nCbS; i = i + pbOffset ) { | |
|         if ( intra_sdc_dmm_wfull_flag [ nuh_layer_id ] \|\| | |
|           dmm_cpredtex_flag[ nuh_layer_id ] ) | |
|         intra_mode_ext(x0+i, y0+j, log2PbSize) | ← SYN01 |
|         if( dim_not_present_flag[ x0 + i ][ y0 + j ] ) | |
|           prev_intra_luma_pred_flag[ x0 + i ][ y0 + j ] | ae(v) ← SYN02 |
|       } | |
|     for( j = 0; j < nCbS; j = j + pbOffset ) | |
|       for( i = 0; i < nCbS; i = i + pbOffset ) | |
|         if( dim_not_present_flag[ x0 + i ][ y0 + j ] ){ | |
|           if( prev_intra_luma_pred_flag[ x0 + i ][ y0 + j ]) | |
|             mpm_idx[ x0 + i ][ y0 + j ] | ae(v) ← SYN03 |
|           else | |
|             rem_intra_luma_pred_mode[ x0 + i ][ y0 + j ] | ae(v) ← SYN04 |
|         } | |
|     ... | |
|   } | |
|   } else { | |
|   cu_extension(x0, y0) | |
|   ... | |
| } | |

(b)

| intra_mode_ext(x0, y0, log2PbSize ) { | Descriptor | |
|---|---|---|
|   if ( logPbSize < 6 ) | | |
|     dim_not_present_flag[ x0 ][ y0 ] | ae(v) | ← SYN01A |
|   if ( !dim_not_present_flag[ x0 ][ y0 ] ) | | |
|     depth_intra_mode_flag[ x0 ][ y0 ] | ae(v) | ← SYN01B |
|   if(DepthIntraMode[ x0 ][ y0 ] == INTRA_DEP_DMM_WFULL) | | |
|     wedge_full_tab_idx[ x0 ][ y0 ] | ae(v) | ← SYN01C |
| } | | |

FIG. 6

| cu_extension( x0 , y0 , log2CbSize ) { | Descriptor | |
|---|---|---|
| ... | | |
| if( cuDepthDcPresentFlag ) { | | |
| pbOffset = (PartMode == PART_NxN && CuPredMode[ x0 ][ y0 ] == MODE_INTRA ) ? ( nCbS / 2 ) : nCbS | | |
| for( j = 0; j < nCbS; j = j + pbOffset ) | | |
| for( k = 0; k < nCbS; k = k + pbOffset ) | | |
| if( puDepthDcPresentFlag ) { | | |
| if(CuPredMode[ x0 ][ y0 ] == MODE_INTRA && sdc_flag[ x0 ][ y0 ] ) | | |
| depth_dc_flag[ x0 + k ][ y0 + j ] | ae(v) | —SYND1 |
| dcNumSeg = DmmFlag[ x0 + k ][ y0 + j ] ? 2 : 1 | | |
| if( depth_dc_flag[ x0 + k ][ y0 + j ] ) | | |
| for( i = 0; i < dcNumSeg; i ++ ) { | | |
| depth_dc_abs[ x0 + k ][ y0 + j ][ i ] | ae(v) | —SYND2 |
| if ( (depth_dc_abs[ x0 + k ][ y0 + j ] + dcNumSeg -2) > 0 ) | | |
| depth_dc_sign_flag[ x0 + k ][ y0 + j ][ i ] | ae(v) | —SYND3 |
| } | | |
| } | | |
| } | | |
| } | | |
| } | | |

FIG. 7

| Intra prediction mode (PredModeIntra) | Intra prediction method |
|---|---|
| 0 | INTRA_PLANAR |
| 1 | INTRA_DC |
| 2..34 | INTRA_ANGULAR (INTRA_ANGULAR2..INTRA_ANGULAR34) |
| 35 | INTRA_DMM_WFULL |
| 36 | INTRA_DMM_CREDTEX |

FIG. 11
(a) 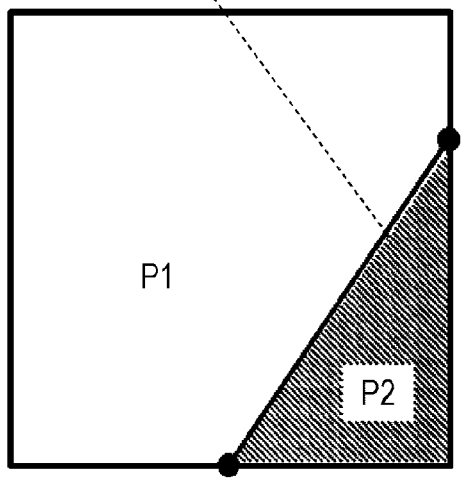
(b)
| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 0 | 0 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 1 | 1 | 1 | 1 | 1 |
wedgePattern[x][y]
(c) 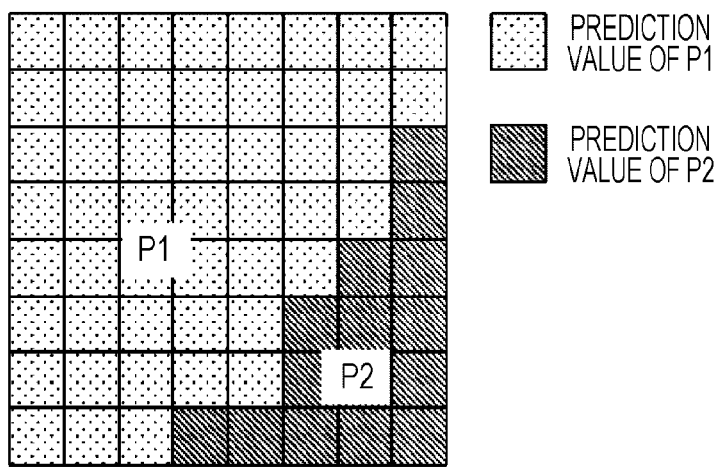

FIG. 12
(a)
(b)
(c)
(d)
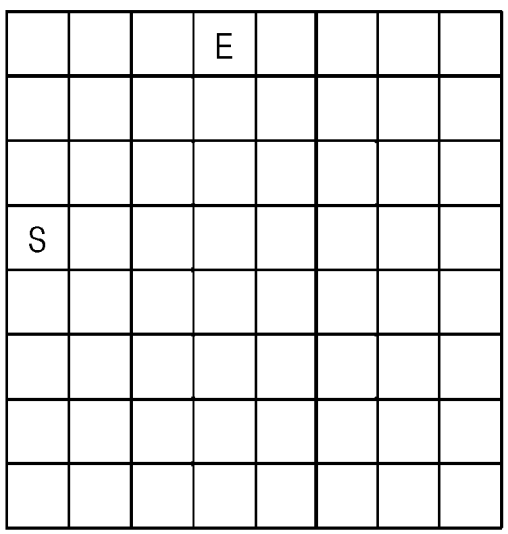
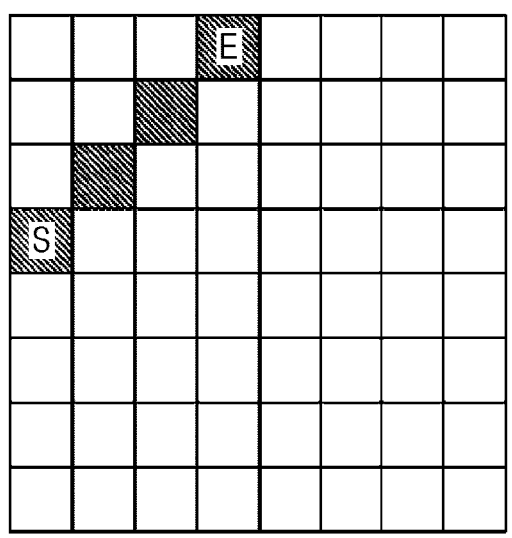
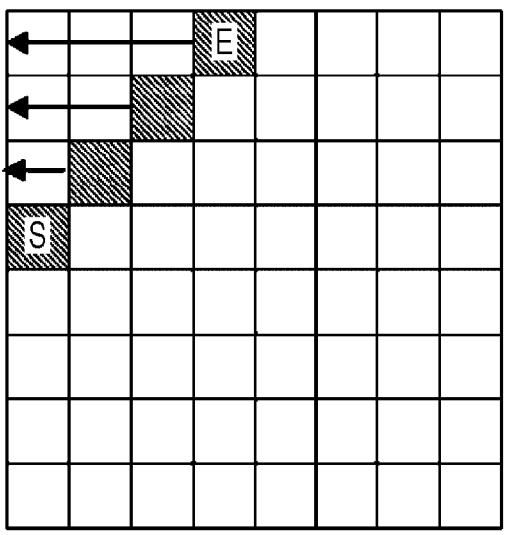
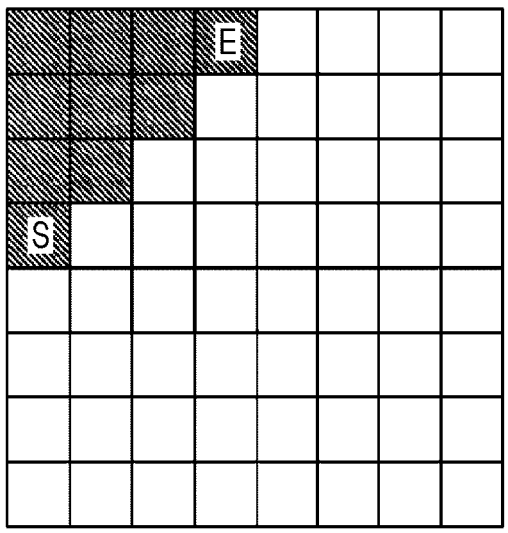

FIG. 19

| wedgeOri | 0 | 1 | 2 | 3 | 4 | 5 |
|---|---|---|---|---|---|---|
| xPosS | 0 | patternSize-1 | patternSize-1 | 0 | 0 | patternSize-1 |
| yPosS | 0 | 0 | patternSize-1 | patternSize-1 | 0 | 0 |
| xPosE | 0 | - | - | - | 0 | - |
| yPosE | 0 | - | - | - | wBlkSize-1 | - |
| xIncS | 1 | 0 | -1 | 0 | 1 | 0 |
| yIncS | 0 | 1 | 0 | -1 | 0 | 1 |
| XIncE | 0 | -1 | 0 | 1 | 1 | -1 |
| yIncE | 1 | 0 | -1 | 0 | 0 | 0 |

(a) ↓ column 0 (wedgeOri=0)
(b) ↑ column 1
(c) ↑ column 2
(d) ↑ column 3
(e) ↓ column 4
(f) ↑ column 5

FIG. 24
(a)
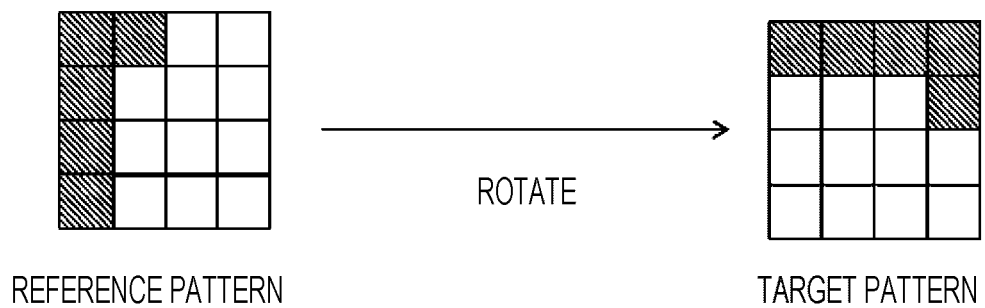
REFERENCE PATTERN　　　　　　　　　　TARGET PATTERN
(b)
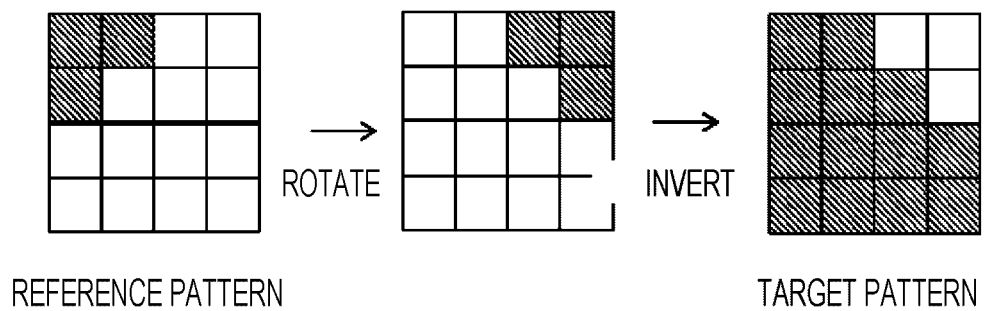
REFERENCE PATTERN　　　　　　　　　　TARGET PATTERN FIG. 25
(a)
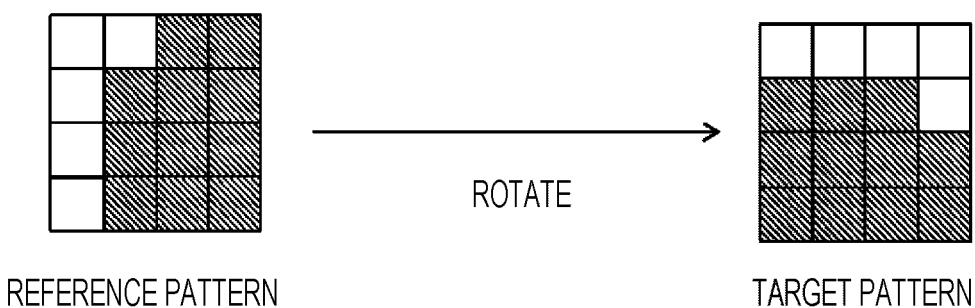
(b)
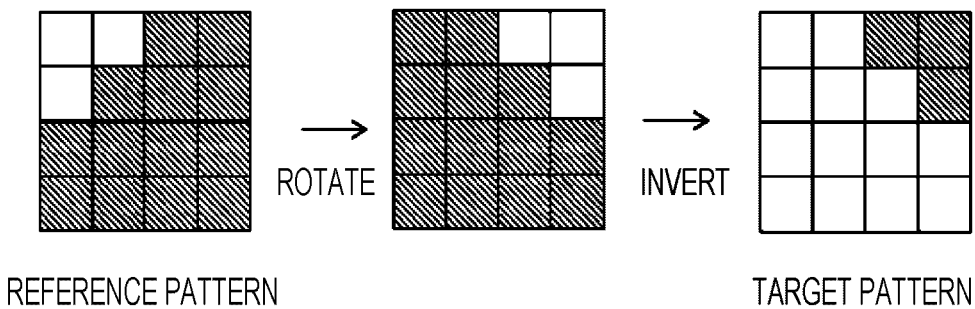

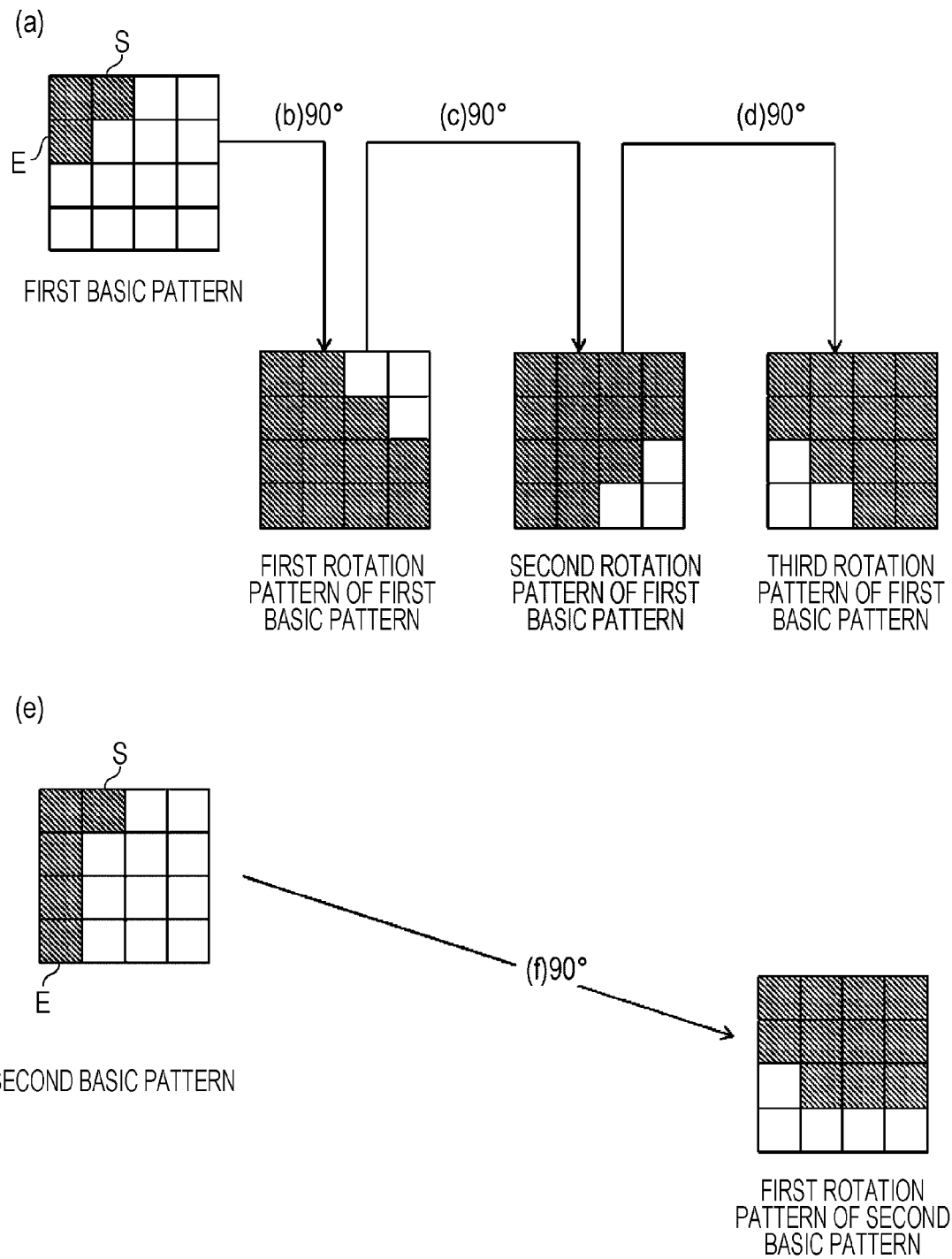

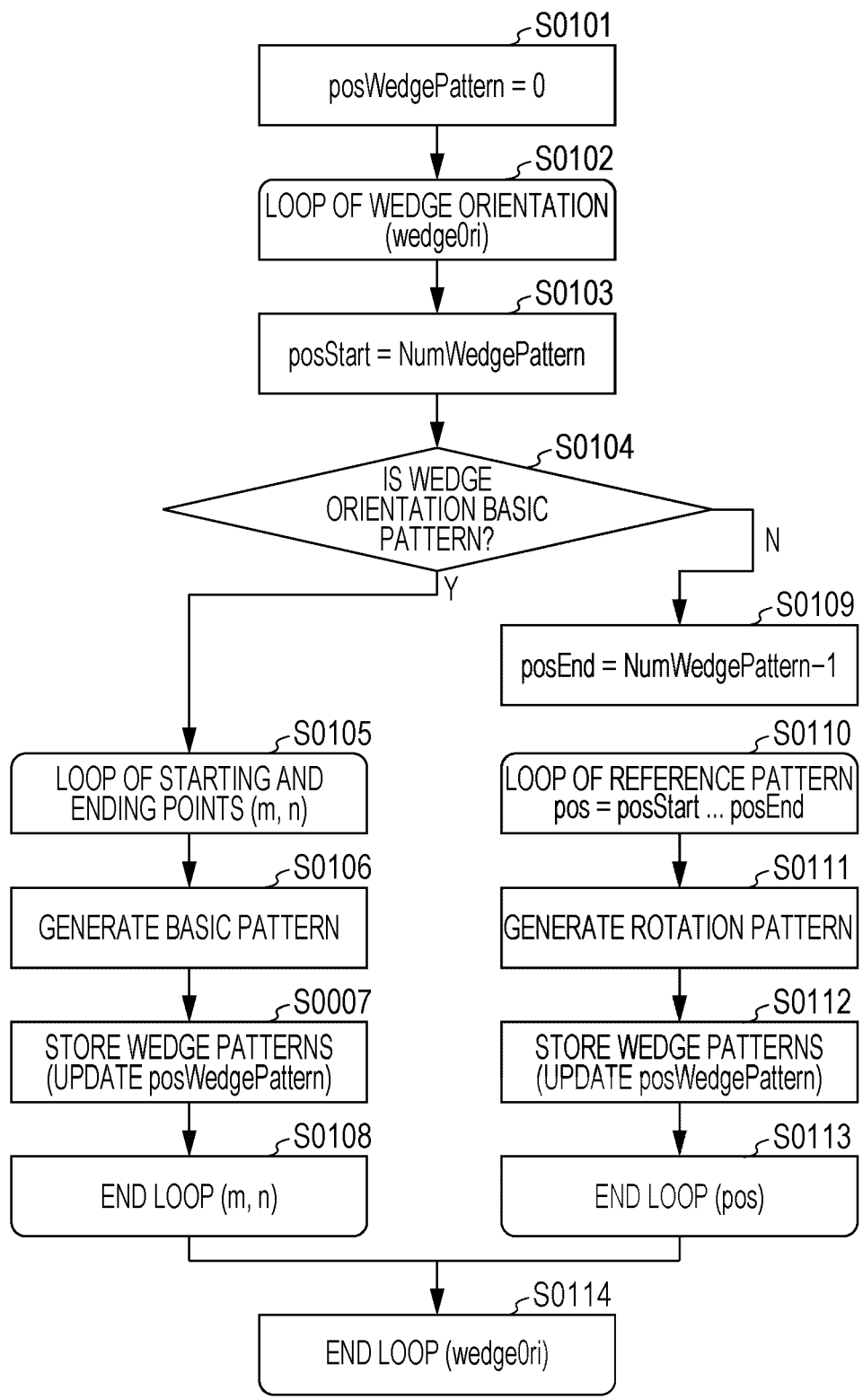

IMAGE DECODING DEVICE

TECHNICAL FIELD

The present invention relates to an image decoding device decoding coded data indicating an image and an image coding device generating coded data by coding an image.

BACKGROUND ART

In image coding technologies for a plurality of viewpoints, disparity prediction coding of reducing the amount of information by predicting disparity between images at the time of coding of images of a plurality of viewpoints and decoding methods corresponding to the coding methods have been proposed. A vector indicating disparity between viewpoint images is referred to as a disparity vector. A disparity vector is a 2-dimensional vector that has a component (x component) in the horizontal direction and a component (y component) in the vertical direction and is calculated for each block which is a region obtained by partitioning one image. To acquire images of a plurality of viewpoints, it is general to use cameras disposed at viewpoints. In coding for a plurality of viewpoints, viewpoint images are coded as different layers in a plurality of layers. A coding method for a moving image formed in a plurality of layers is generally referred to as scalable coding or hierarchical coding. In scalable coding, high coding efficiency is realized by executing prediction between layers. A layer which does not execute prediction between layers and serves as a standard is referred to as a base layer and other layers are referred to as enhancement layers. Scalable coding in a case in which layers are formed from viewpoint images is referred to as view scalable coding. At this time, a base layer is also referred to as a base view and an enhancement layer is also referred to as a non-base view. Further, scalable coding in a case in which layers are formed as a texture layer (image layer) of textures (images) and a depth layer (distance image layer) of a depth map (distance image) in addition to view scalable is referred to as 3-dimensional scalable coding.

For example, NPL 1 discloses a 3-dimensional scalable coding technology of an HEVC base. In NPL 1, in order to code a depth map efficiently, there is a depth coding tool such as depth modeling mode (DMM) prediction (also referred to as depth intra prediction) or segment-wise DC (SDC) coding.

The segment-wise DC coding is a technology for coding prediction residual DC information indicating an average (DC) value of prediction residual without performing frequency conversion and inverse quantization on the prediction residual for each region or every plurality of regions in a target block on a depth map.

Basically, the DMM prediction is based on a depth model in which a target block on a depth map (also referred to as a depth block) is configured by two nonrectangular flat regions and in which a depth value of each flat region is expressed with a fixed value. The depth model is configured by partition information indicating a region to which each pixel belongs and depth value information regarding each region.

In the DMM prediction, there are wedgelet partition and contour partition. In NPL 1, in the DMM 1 prediction, a partition pattern (a wedge pattern or a wedgelet pattern) of the wedgelet partition is retained in a lookup table defined in advance for each block size and a wedge pattern designated by an identifier (a wedge pattern index wedge_full_tab_idx) designating a partition pattern is selected. There is a technology for partitioning a depth block into two regions based on the selected wedge pattern and predicting a prediction value for restoring a depth value of each region based on a depth prediction value predicted from a peripheral pixel in each of the partitioned regions and depth value information for correcting the depth prediction value.

The depth value information of each region in the DMM prediction and prediction residual DC information of each region in the segment-wise DC coding are collectively referred to as DC offset information. In NPL 1, coding is performed using a common syntax (depth_dc_flag, depth_dc_abs, and depth_dc_sign_flag).

CITATION LIST

Non Patent Literature

NPL 1: G. Tech, K. Wegner, Y. Chen, S. Yea, "3D-HEVC Draft Text 5", JCT3V-I1001_v3, JCT-3V 9th Meeting: Sapporo, JP, 3 to 9 Jul. 2014 (disclosed on 13 Aug. 2014)

SUMMARY OF INVENTION

Technical Problem

In generation of a wedge pattern in NPL 1, all the patterns are generated through a line segment drawing process and a region filling process. Therefore, there is a problem that a process amount is large. Further, there is a problem that a memory size is large when a block size is virtually doubled horizontally and vertically and wedge patterns are generated. Furthermore, in a case in which all of the wedge patterns are stored, there is a problem that a storage processing amount is large since matching comparison of the wedge patterns is performed.

Solution to Problem

According to an aspect of the invention, there is provided an image decoding device decoding an image and including a wedge pattern generation section that generates a wedge pattern; a rotation pattern generation section that derives a rotation pattern by rotating the wedge pattern; a pattern storage section that adds the rotation pattern to a wedge pattern table; and a DC prediction value derivation section that derives a prediction value of each region partitioned in the wedge pattern included in the wedge pattern table.

Advantageous Effects of Invention

A wedgelet pattern generation section 145T4 according to an embodiment does not generate all the wedge patterns through a line segment drawing process and a region filling process performed using a line segment drawing section 1462 and a region filling section 1463, but generates some of the wedge patterns through a rotation process performed using the rotation pattern generation section 1565. Since the line segment drawing process and the region filling process in which a processing amount is large are substituted with a rotation process in which the processing amount is small, the advantageous effect of reducing the processes is obtained.

BRIEF DESCRIPTION OF DRAWINGS

FIG. 4 is a diagram illustrating a data structure of coded data generated by a moving image coding device and decoded by the moving image decoding device according to the embodiment of the present invention, FIG. 4(a) illustrates a sequence layer that defines a sequence SEQ, FIG. 4(b) illustrates a picture layer that defines a picture PICT, FIG. 4(c) illustrates a slice layer that defines a slice S, FIG. 4(d) illustrates a tree block layer that defines a tree block included in slice data, and FIG. 4(e) illustrates a coding unit layer (CU layer) that defines a coding unit (CU) included in the coding tree unit.

FIG. 5 is a diagram illustrating an example of a syntax included in the CU layer, FIG. 5(a) illustrates an example of a syntax table related to intra CU, and FIG. 5(b) illustrates an example of a syntax table related to intra-prediction mode extension.

FIG. 6 is a diagram illustrating an example of a syntax related to DC offset information included in the CU layer.

FIG. 7 is a diagram illustrating an example of a prediction mode number corresponding to classification of intra prediction method used in the moving image decoding device.

FIG. 11 is a diagram illustrating schematic DMM prediction, FIG. 11(a) illustrates an example of an edge boundary of an object on a block, FIG. 11(b) illustrates an example of a wedgelet pattern (wedgePattern) which is a partition pattern indicating that the block is partitioned into two regions (P1 and P2) along the edge boundary of the object, and FIG. 11(c) illustrates an example in which prediction values are allocated to the partitioned regions.

FIG. 12 is a diagram illustrating a method of generating the wedgelet pattern based on wedgelet partition (DMM 1) in the DMM prediction, FIG. 12(a) illustrates an example of a starting point S and an ending point E on a block, FIG. 12(b) illustrates an example of a line segment connecting the starting point S and the ending point E, FIG. 12(c) illustrates an example of filling of regions partitioned by a line segment, and FIG. 12(d) illustrates an example of a wedge rate pattern.

FIG. 13(a) illustrates an example of a wedgelet pattern of wedgeOri=0, FIG. 13(b) illustrates an example of a wedgelet pattern of wedgeOri=1, FIG. 13(c) illustrates an example of a wedgelet pattern of wedgeOri=2, FIG. 13(d) illustrates an example of a wedgelet pattern of wedgeOri=3, FIG. 13(e) illustrates an example of a wedgelet pattern of wedgeOri=4, and FIG. 13(f) illustrates an example of a wedgelet pattern of wedgeOri=5.

FIG. 19 is a table illustrating parameters used to generate basic patterns and generate rotation patterns.

FIG. 24 is a diagram illustrating an operation of a rotation pattern generation section 1465' according to the embodiment.

FIG. 25 is a diagram illustrating an operation of a rotation pattern generation section 1465' according to the embodiment.

FIG. 31 is a diagram illustrating a wedgelet pattern generation process in the wedgelet pattern generation section 145T4B according to the embodiment.

FIG. 32 is a flowchart illustrating an operation of the wedgelet pattern generation section 145T4B according to the embodiment.

DESCRIPTION OF EMBODIMENTS

[Overview]

Hereinafter, an embodiment of the present invention will be described with reference to the drawings.

Figure 2:
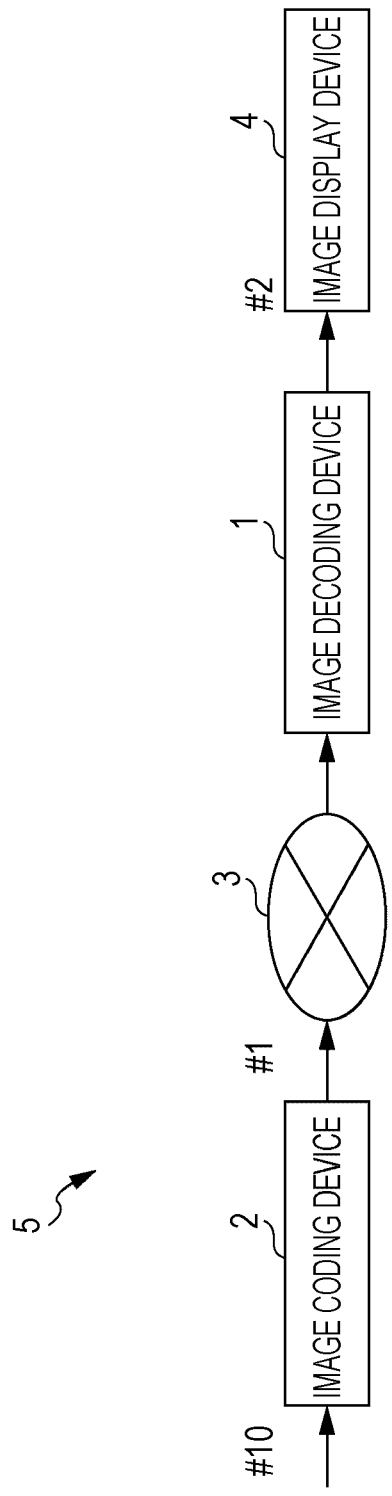
FIG. 2 is a schematic diagram illustrating the configuration of an image transmission system according to an embodiment of the invention.

FIG. 2 is a schematic diagram illustrating the configuration of an image transmission system 5 according to the embodiment.

The image transmission system 5 is a system that transmits codes obtained by coding a plurality of layer images and displays images obtained by decoding the transmitted codes. The image transmission system 5 is configured to include an image coding device 2, a network 3, an image decoding device 2, and an image display device 4.

Signals T indicating a plurality of layer images (also referred to as texture images) are input to the image coding device 2. The layer images are images viewed or captured at certain resolutions and certain viewpoints. In a case in which view scalable coding of coding a 3-dimensional image using a plurality of layer images is executed, each of the plurality of layer images is referred to as a viewpoint image. Here, the viewpoint corresponds to an observation point or the position of an imaging device. For example, a plurality of viewpoint images are images obtained when right and left imaging devices image a subject. The image coding device 2 codes the signals to generate coded data #1. The details of the coded data #1 will be described later. The viewpoint image is a 2-dimensional image (planar image) observed at a certain viewpoint. The viewpoint image is expressed with, for example, a luminance value or a color signal value of each of the pixels arrayed in a 2-dimensional plane.

Hereinafter, one viewpoint image or a signal indicating the viewpoint image is referred to as a picture. In the embodiment, coding and decoding of images including at least a base layer image and images (enhancement layer images) other than the base layer image as a plurality of layer images are treated. An image on a referred side in two layers having a reference relation (dependency relation) in images or coding parameters among a plurality of layers is referred to as a first layer image and an image on a referring side is referred to as a second layer image. For example, in a case in which there is an enhancement layer image (other than a base layer) coded referring to the base layer, the base layer image is treated as the first layer image and an enhancement layer image is treated as a second layer image. As an example of the enhancement layer image, there is a viewpoint image or a depth image other than a base view.

For example, a viewpoint image is indicated by a luminance value or a color signal value for each of the pixels disposed in a 2-dimensional plane. A depth image (also referred to as a depth map, a "depth image", or a "distance image") is a signal value (referred to as a "depth value" or a "depth") corresponding to a distance of a subject or a background contained in an object plane from a viewpoint (an imaging device or the like) and is an image signal formed from a signal value (pixel value) of each of the pixels arrayed in a 2-dimensional plane. The pixels forming a depth map correspond to the pixels forming a viewpoint image. Accordingly, the depth map serves as a clue for expressing a 3-dimensional object plane using a viewpoint image which is an image signal serving as a standard in which an object plane is projected to a 2-dimensional plane.

The network 3 transmits the coded data #1 generated by the image coding device 2 to the image decoding device 1. The network 3 is the Internet, a wide area network (WAN), a local area network (LAN), or a combination thereof. The network 3 is not necessarily limited to a bi-directional communication network, but may be a uni-directional or bi-directional communication network in which broadcast waves of terrestrial digital broadcast or satellite broadcast are transmitted. The network 3 may be substituted with a storage medium that stores the coded data #1, such as a digital versatile disc (DVD) or a Blue-ray (BD) disc.

The image decoding device 1 decodes the coded data #1 transmitted by the network 3 to generate a plurality of decoded layer images Td (decoded viewpoint images TexturePic and a decoded depth map DepthPic) and outputs the decoded data.

The image display device 4 displays some or all of the plurality of decoded layer images Td generated by the image decoding device 1. For example, in the view scalable coding, in the case in which all of the decoded layer images are displayed, 3-dimensional images (stereoscopic images) or free viewpoint images are displayed. In the case in which some of the decoded layer images are displayed, 2-dimensional images are displayed. The image display device 4 includes, for example, a display device such as a liquid crystal display or an organic electro-luminescence (EL) display. In the spatial scalable coding and the SNR scalable coding, in a case in which the image decoding device 1 and the image display device 4 have a high processing capability, enhancement layer images with high quality are displayed. In a case in which the image decoding device 1 and the image display device 4 have a lower processing capability, base layer images for which a high processing capability or display capability is not necessary in an enhancement layer are displayed.

For example, a viewpoint image is indicated by a luminance value or a color signal value for each of the pixels disposed in a 2-dimensional plane. A depth image (also referred to as a depth map, a "depth image", or a "distance image") is a signal value (referred to as a "depth value" or a "depth") corresponding to a distance of a subject or a background contained in an object plane from a viewpoint (an imaging device or the like) and is an image signal formed from a signal value (pixel value) of each of the pixels arrayed in a 2-dimensional plane. The pixels forming a depth map correspond to the pixels forming a viewpoint image. Accordingly, the depth map serves as a clue for expressing a 3-dimensional object plane using a viewpoint image which is an image signal serving as a standard in which an object plane is projected to a 2-dimensional plane.

Figure 3:
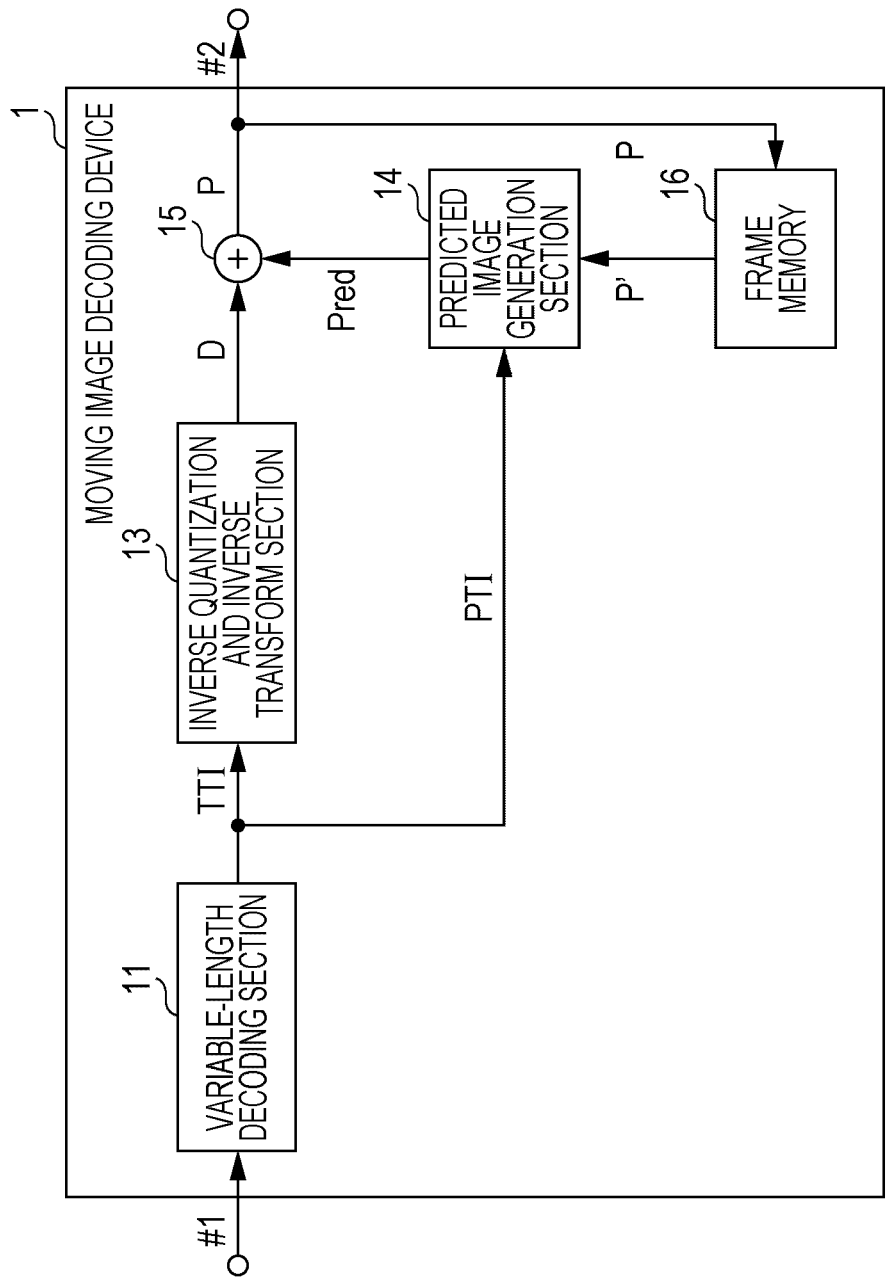
FIG. 3 is a functional block diagram illustrating a schematic configuration of a moving image decoding device according to the embodiment.

Hereinafter, the image decoding device 1 and the image coding device 2 according to an embodiment of the invention will be described with reference to FIGS. 1 to 32. FIG. 3 is a functional block diagram illustrating a schematic configuration of the image decoding device 1.

The coded data #1 obtained when the moving image coding device 2 codes a layer image (one viewpoint image TexturePic or a plurality of viewpoint images TexturePic and a depth map DepthPic of the same time corresponding to the viewpoint image TexturePic) is input to the moving image decoding device 1. The moving image decoding device 1 decodes the input coded data #1 and outputs layer image #2 (one viewpoint image TexturePic or a plurality of viewpoint images TexturePic and the depth map (DepthPic) of the same time corresponding to the viewpoint image TexturePic) to the outside. The structure of the coded data #1 will be described below before detailed description of the moving image decoding device 1.

[Structure of Coded Data]

An example of the structure of the coded data #1 generated by the moving image coding device 2 and decoded by the moving image decoding device 1 will be described with reference to FIG. 4. The coded data #1 includes a sequence and a plurality of pictures included in the sequence, for example.

The structure of hierarchy of the sequence layer and the lower layers in the coded data #1 is illustrated in FIG. 4. FIGS. 4(*a*) to 4(*e*) are diagrams illustrating a sequence layer that defines a sequence SEQ, a picture layer that defines a picture PICT, a slice layer that defines a slice S, a slice data layer that defines slice data, and a coding unit layer that defines a coding unit (CU) included in the coding tree, respectively.

(Sequence Layer)

In the sequence layer, a set of data referred to by the moving image decoding device 1 is defined to decode a processing target sequence SEQ (hereinafter also referred to as a target sequence). As illustrated in FIG. 4(a), the sequence SEQ includes a video parameter set, a sequence parameter set SPS, a picture parameter set PPS, pictures PICT, and supplemental enhancement information SEI. Here, a value shown after # indicates a layer ID. FIG. 4 illustrates an example in which there are coded data of #0 and #1, that is, layers 0 and 1, but the types of layers and the number of layers are not limited thereto.

The video parameter set VPS defines a set of coding parameters common to a plurality of moving images in regard to a moving image formed by a plurality of layers and a set of coding parameters related to the plurality of layers included in the moving image and the individual layer.

The sequence parameter set SPS defines a set of coding parameters referred to by the moving image decoding device 1 to decode a target sequence. For example, the width or height of a picture is defined.

In the picture parameter set PPS, a set of coding parameters referred to by the moving image decoding device 1 is defined to decode each picture in the target sequence. For example, a standard value (pic_init_qp_minus26) of a quantization width used to decode a picture or a flag (weighted_pred_flag) indicating application to weighted prediction. There are the plurality of PPSs. In this case, one of the plurality of PPSs is selected from the pictures in the target sequence.

(Picture Layer)

In the picture layer, a set of data referred to by the moving image decoding device 1 is defined to decode a processing target picture PICT (hereafter also referred to as a target picture). As illustrated in FIG. 4(b), the picture PICT includes slices $S_1$ to $S_{NS}$ (where NS is a total number of slices included in the picture PICT).

In a case in which it is not necessary to distinguish the slices $S_1$ to $S_{NS}$ from each other, the slices are sometimes described below by omitting the subscripts of the codes. The same also applies to data which is data included in the coded data #1 to be described below and is other data to which subscripts are appended.

(Slice Layer)

In the slice layer, a set of data which is referred to by the moving image decoding device 1 to decode a processing target slice S (a slice segment also referred to as a target slice) is defined. As illustrated in FIG. 4(c), the slice S includes a slice header SH and slice data SDATA.

The slice header SH includes a coding parameter group which is referred to by the moving image decoding device 1 to decide a target slice decoding method. Slice type designation information (slice_type) designating a type of slice is an example of a coding parameter included in the slice header SH.

As the types of slices which can be designated by the slice type designation information, (1) an I slice in which only intra-prediction is used at the time of coding, (2) a P slice in which uni-directional prediction or intra-prediction are used at the time of coding, and (3) a B slice in which uni-directional prediction, bi-directional prediction, or intra-prediction is used at the time of coding can be exemplified.

The slice data SDATA includes one tree block or a plurality of tree blocks $TBLK_1$ to $TBLK_{NC}$ (where NC is a total number of tree blocks included in the slice data SDATA).

(Tree Block Layer)

In the tree block layer, a set of data referred to by the moving image decoding device 1 is defined to decode a processing target tree block TBLK (hereinafter referred to as a target tree block).

The tree block TBLK includes a tree block header TBLKH and coding unit information $CU_1$ to $CU_{NL}$ (where NL is a total number of pieces of coding unit information included in the tree block TBLK). First, a relation between the tree block TBLK and the coding unit information CU will be described here below.

The tree block TBLK is partitioned into intra-prediction or inter-prediction and a unit for specifying a block size for each process of transform.

The foregoing unit of the tree block TBLK is partitioned by recursive quadtree partition. A tree structure obtained by the recursive quadtree partition is referred to as a coding tree below.

Hereinafter, a unit corresponding to a leaf which is a node at the termination of the coding tree is referred as a coding node. Since the coding node is a basic unit of a coding process, the coding node is also referred to as a coding unit (CU).

That is, the pieces of coding unit information (hereinafter referred to as CU information) $CU_1$ to $CU_{NL}$ are information corresponding to coding nodes (coding units) obtained by executing the recursive quadtree partition on the tree block TBLK.

The root of the coding tree is associated with the tree block TBLK. In other words, the tree block TBLK is associated with the most significant node of the tree structure of the quadtree partition recursively including a plurality of coding nodes.

The size of each coding node is half of the horizontal and vertical sizes of a coding node to which the coding node directly belongs (that is, a unit of an immediately upper node of this coding node).

(Tree Block Header)

The tree block header TBLKH includes a coding parameter which is referred to by the moving image decoding device 1 to decide a method of decoding a target tree block. Specifically, as illustrated in FIG. 4(d), the tree block header TBLKH includes tree block partition information SP_TBLK for designating a partition pattern of the target tree block into each CU and a quantization parameter difference Δqp (qp_delta) for designating the magnitude of a quantization step.

The tree block partition information SP_TBLK is information indicating a coding tree for partitioning a tree block. Specifically, the tree block partition information SP_TBLK is information for designating the shape and size of each CU included in the target tree block and the position of each CU in the target tree block.

The quantization parameter difference Δqp is a difference qp−qp' between a quantization parameter qp in a target tree block and a quantization parameter qp' in a tree block coded immediately before the target tree block.

(CU Layer)

In the CU layer, a set of data referred to by the moving image decoding device 1 is defined to decode a processing target CU (hereinafter referred to as a target CU).

Here, a tree structure of data included in the CU will be described before description of detailed content of the data included in CU information CU. The coding node is a node of the root of a prediction tree (PT) and a transform tree (TT). The prediction tree and the transform tree will be described below.

In the prediction tree, the coding node is partitioned in to one prediction block or a plurality of prediction blocks and the position and size of each prediction block are defined.

The prediction process is executed for each prediction block. Hereinafter, the prediction block which is a unit of prediction is referred to as a prediction unit (PU).

There are two types of partition in the prediction tree in the case of intra-prediction and the case of inter-prediction. In the case of intra-prediction, there are 2N×2N (which is the same size of the coding node) and N×N partition methods. In the case of inter-prediction, there are 2N×2N (which is the same size of the coding node), 2N×N, N×2N, and N×N partition methods.

In the transform tree, the coding node is partitioned into one transform block or a plurality of transform blocks and the position and size of each transform block are defined.

A transform process is executed for each transform block. Hereinafter, the transform block which is a unit of transform is referred to as a transform unit (TU).

(Data Structure of CU Information)

Next, specific content of data included in the CU information CU will be described with reference to FIG. 4(e). As illustrated in FIG. 4(e), specifically, the CU information CU includes a skip flag SKIP, PT information PTI, and TT information TTI.

The skip flag SKIP is a flag indicating whether a skip mode is applied to a target PU. In a case in which a value of the skip flag SKIP is 1, that is, a case in which the skip mode is applied to the target CU, the PT information PTI and the TT information TTI in the CU information CU are omitted.

The PT information PTI is information regarding the PT included in the CU. The PT information PTI includes prediction type information PType and prediction information PInfo, as illustrated in FIG. 4(d).

The prediction type information PType (or CuPredMode) is information for designating use of the intra-prediction or use of the inter-prediction. For example, in a case in which the intra-prediction is used, the prediction type information CuPredMode is set in MODE_INTRA indicating the intra-prediction. In a case in which the inter-prediction is used, the prediction type information CuPredMode is set in MODE_INTER indicating the intra-prediction. CU to which the intra-prediction is applied is referred to as an intra-CU and CU to which the inter-CU is applied is referred to as an inter-CU.

The prediction information PInfo is configured by intra-prediction information or inter-prediction information according to which prediction method is designated by the prediction type information PType. Hereinafter, the PU applied to the intra-prediction is referred to as an intra-PU and the PU applied to the inter-prediction is referred to as an inter-PU.

The prediction information PInfo includes information for designating the shape, size, and position of the target PU. As described above, a predicted image is generated using the PU as a unit. The details of the prediction information PInfo will be described later.

The TT information TTI is information regarding the TT included in the CU. In other words, the TT information TTI is a set of information regarding one TU or the plurality of TUs included in the TT and is referred to when residual data is decoded by the moving image decoding device 1. Hereinafter, the TU is referred to as a transform block in some cases.

As illustrated in FIG. 4(d), the TT information TTI includes TT partition information SP_TU for designating a partition pattern of the target CU into transform blocks and pieces of TU information $TUI_1$ to $TUI_{NT}$ (where NT is a total number of transform blocks included in the target CU).

Specifically, the TT partition information SP_TU is information for deciding the shape and size of each TU included in the target CU and the position of the TU in the target CU. For example, the TT partition information SP_TU can be realized from information (split_transform_unit_flag) indicating whether a target node is partitioned and information (trafoDepth) indicating depth of the partition.

The TU partition information SP_TU includes information indicating whether there is a non-zero transform coefficient in each TU. For example, for information (CBP: Coded Block Flag) indicating whether there is the non-zero coefficient in the individual TU, CBF regarding luminance luma is referred to as cbf_luma, CBF regarding chroma Cb is referred to as cbf_cb, and CBF regarding chroma Cr is referred to as cbf_cr for each color space. Further, information (also referred to as rqt_root_flag or no_residual_data_flag) indicating whether there is the non-zero coefficient in the plurality of TUs is included in the TU partition information SP_TU. Instead of coding the non-zero transform coefficient in each TU, an SDC flag sdc_flag indicating whether prediction residual DC information (DC offset information) indicating an average (DC) value of prediction residuals (segment-wise DC coding is performed) is coded is included in each region or every plurality of regions in the TU. The segment-wise DC coding is also referred to as segment-wise DC coding (SDC). In particular, the segment-wise DC coding in the intra-prediction is referred to as intra-SDC and the segment-wise DC coding in the inter-prediction is referred to as inter-SDC. In a case in which the segment-wise DC coding is applied, the CU size, the PU size, and the TU size may be the same as each other.

The pieces of TU information $TUI_1$ to $TUI_{NT}$ are individual information regarding one TU or the plurality of TUs included in the TT. For example, the TU information TUI includes a quantization prediction residual.

Each quantization prediction residual is coded data that is generated when the moving image coding device 2 executes the following process A or B on a target block which is a processing target block.

(Process A: Case in which Frequency Conversion and Quantization is Performed)

Process A-1: a prediction residual obtained by subtracting a predicted image from a coding target image is subjected to discrete cosine transform (DCT transform);

Process A-2: a transform coefficient obtained in the process A-1 is quantized; and Process A-3: the transform coefficient quantized in the process A-2 is subjected to variable-length coding. The above-described quantization parameter qp indicates the magnitude of the quantization step QP used when the moving image coding device 2 quantizes the transform coefficient (QP=2qp/6).

(Process B: Case of Segment-Wise DC Coding (SDC))

Process B-1: an average value (DC value) of the prediction residual obtained by subtracting the predicted image from the coding target image is calculated.

Process B-2: the DC value obtained in process B-1 is subjected to the variable-length coding.

In particular, the segment-wise DC coding performed on the DC value is referred to as segment-wise DC coding (SDC) and is effective in coding of a prediction residual of a flat region. For example, in coding of the depth map, the depth block coding is used to code the prediction residual of one partitioned region or a plurality of partitioned regions.

(Prediction Information PInfo)

As described above, as the prediction information PInfo, there are two types of inter-prediction information and intra-prediction information.

The inter-prediction information includes a coding parameter referred to when the moving image decoding device 1 generates an inter-predicted image through the inter-prediction. More specifically, the inter-prediction information includes inter-PU partition information for designating the partition pattern of the target CU into inter-PUs and an inter-prediction parameter of each inter-PU.

The inter-prediction parameter includes a reference image index, an estimation motion vector index, and a motion vector residual.

On the other hand, the intra-prediction information includes a coding parameter referred to when the moving image decoding device 1 generates an intra-predicted image through the intra-prediction. More specifically, the intra-prediction information includes intra-PU partition information for designating the partition pattern of the target CU into intra-PUs and an intra-prediction parameter of each intra-PU. The intra-prediction parameter is a parameter for restoring intra-prediction (prediction mode) of each intra-PU.

Parameters (intra-prediction parameters) related to the intra-prediction (DC prediction, planar prediction, and angular prediction) commonly used to code depth map DepthPic and a texture TexturePic include mpm_flag which is a flag related to most probable mode (MPM, the same applies below), mpm_idx which is an index for selecting the MPM, and rem_idx which is an index (residual prediction mode index) for designating the prediction mode other than the MPM. Further, mpm_flag and rem_idx correspond to "prev_intra_luma_pred_flag" (SYN02 of FIG. 5(*a*)) and "rem_intra_luma_pred_mode" (SYN03 of FIG. 5(*a*)) in NPL 1. In addition, chroma mode corresponds to "intra_chroma_pred_mode" (not illustrated).

As parameters (a depth intra-prediction parameter and DMM prediction mode information) for restoring a prediction mode (an intra-extension mode (SYN01 of FIG. 5(*a*))) related to the depth intra-prediction (DMM prediction) used to code the depth map, there are a flag (depth intra-prediction presence or absence flag) dim_not_present_flag (SYN01A of FIG. 5(*b*)) indicating presence or absence of the depth intra-prediction and an index (wedge pattern index) wedge_full_tab_idex (SYN01C of FIG. 5(*b*)) for designating the wedge pattern indicating the partition pattern in the PU in the DMM 1 prediction.

As the intra-SDC, the inter-SDC, and the prediction parameters for the depth intra-prediction, there is DC offset information for correcting depth prediction values of one region or two regions partitioned in the PU, that is, a DC offset presence or absence flag depth_dc_flag (SYND1 of FIG. 6), depth_dc_abs (SYND02 of FIG. 6) indicating the absolute value of the DC offset value, and depth_dc_sign_flag (SYND03 of FIG. 6) indicating the sign of the DC offset value.

[Moving Image Decoding Device]

Hereinafter, the configuration of the moving image decoding device 1 according to the embodiment will be described with reference to FIGS. 1 to 28.

(Overview of Moving Image Decoding Device)

The moving image decoding device 1 generates a predicted image for each PU, generates a decoded image #2 by adding the generated predicted image and prediction residual decoded from the coded data #1, and outputs the generated decoded image #2 to the outside.

Here, the predicted image is generated with reference to coding parameters obtained by decoding the coded data #1. The coding parameters are parameters which are referred to generate the predicted image. The coding parameters include the size or shape of the PU, the size or shape of a block, and residual data between an original image and the predicted image in addition to a prediction parameter such as a motion vector referred to in the inter prediction or a prediction mode referred to in the intra-prediction. Hereinafter, a set of all pieces of information among pieces of information included in the coded parameters excluding the residual data is referred to as side information.

Hereinafter, a picture (frame), a slice, a tree block, a CU, a block and a PU to be decoded are referred to as a target picture, a target slice, a target tree block, a target CU, a target block, and a target PU, respectively.

The size of the tree block is, for example, 64×64 pixels, the size of the CU is, for example, 64×64 pixels. 32×32 pixels, 16×16 pixels, or 8×8 pixels, and the size of the PU is, for example, 64×64 pixels. 32×32 pixels, 16×16 pixels, 8×8 pixels, or 4×4 pixels. These sizes are merely examples, and thus the sizes of the tree block the CU, and the PU may be sizes other than the above-mentioned sizes.

(Configuration of Moving Image Decoding Device)

Referring back to FIG. 3, a schematic configuration of the moving image decoding device 1 will be described below. FIG. 3 is a functional block diagram illustrating the schematic configuration of the moving image decoding device 1.

As illustrated in FIG. 3, the moving image decoding device 1 includes a variable-length decoding section 11, an inverse quantization and inverse transform section 13, a predicted image generation section 14, an addition section 15, and a frame memory 16.

[Variable-Length Decoding Section]

The variable-length decoding section 11 decodes various parameters included in the coded data #1 input from the moving image decoding device 1. In the following description, the variable-length decoding section 11 is assumed to appropriately decode the parameters decoded by an entropy coding method such as CABAC. Specifically, the variable-length decoding section 11 decodes the coded data #1 equivalent to one frame in the following procedure.

First, the variable-length decoding section 11 demultiplexes the coded data #1 equivalent to one frame to separate the coded data #1 into various pieces of information included in the hierarchical structure illustrated in FIG. 4. For example, the variable-length decoding section 11 sequentially separates the coded data #1 into the slices and the tree blocks with reference to information included in various headers.

Here, various headers include (1) information regarding a method of partitioning a target picture into slices and (2) information regarding the size and shape of a tree block belonging to a target slice and the position of the tree block in the target slice.

The variable-length decoding section 11 partitions the target tree block into the CUs with reference to the tree block partition information SP_TBLK included in the tree block header TBLKH. The variable-length decoding section 11 decodes the TT information TTI regarding the transform tree obtained in regard to the target CU and the PT information PTI regarding the prediction tree obtained in regard to the target CU.

The variable-length decoding section 11 supplies the TT information TTI obtained in regard to the target CU to the TU information decoding section 12. The variable-length decoding section 11 supplies the PT information PTI obtained in regard to the target CU to the predicted image generation section 14. The TT information TTI includes the TU information TUI corresponding to the TU included in the transform tree, as described above. The PT information PTI includes the PU information PUI (the prediction information Pinfo of each PU) corresponding to each PU included in the target prediction tree, as described above.

Hereinafter, a schematic process of decoding the intra-prediction parameters included in the prediction information Pinfo of the deep intra PU according to the invention and the DC offset information used for the segment-wise DC coding (the intra-SDC and the inter-SDC) or the depth intra-prediction will be described.

(Intra-Prediction Parameter)

The variable-length decoding section 11 decodes each syntax from the coded data #1 according to a syntax table of an intra-prediction mode extension intra_mode_ext( ) shown in SYN01 of FIG. 5. In a decoding target layer, the intra-prediction mode extension intra_mode_ext( ) is decoded in a case in which a flag (DMM 1 prediction mode enable flag) intra_sdc_dmm_wfull_flag indicating whether DMM 1 prediction in the depth coding tool is performed is 1. In a case in which the DMM 1 prediction mode enable flag intra_sdc_dimm_wfull_flag is 1, it is indicated that a DMM 1 prediction mode which is the depth coding tool is applied in the decoding target layer. In a case in which the flag intra_sdc_dmm_wfull_flag is 0, it is indicated that the DMM 1 prediction mode which is the depth coding tool is not applied. The DMM 1 prediction mode enable flag is decoded from parameter sets (the video parameter set VPS, the sequence parameter set SPS, the picture parameter set PPS, and the slice header SH) or the like.

First, the variable-length decoding section 11 decodes the depth intra-prediction presence or absence flag dim_not_present_flag (SYN01A of FIG. 5(*b*)) in a case in which a target PU size is equal to or less than 32×32 (where log PbSize<6). In a case in which the target PU size is greater than 32×32, the value of the flag is estimated to be 1. In a case in which the flag is a flag indicating presence or absence of the depth intra-prediction and the value of the flag is 1, it is indicated that the depth intra-prediction mode flag depth_intra_mode_flag related to the target PU is not present in the coded data and the intra-prediction method of one of intra-prediction mode numbers '0' to '34' (the DC prediction, the planar prediction, and the angular prediction) is used for the target PU. In a case in which the flag is 0, it is indicated that the depth intra-prediction mode depth_intra_mode_flag is present in the coded data.

The variable-length decoding section 11 derives the DMM flag DmmFlag of a target PU by the following formula based on the decoded depth intra-prediction presence or absence flag dim_not_present_flag.

DmmFlag=!dim_not_present_flag.

That is, the value of logical NOT of the depth intra-prediction presence or absence flag is set in the DMM flag. In a case in which the DMM flag is 1, it is indicated that the depth intra-prediction is used. In a case in which the DMM flag is 0, it is indicated that the depth intra-prediction is not used.

(Case in which Depth Intra-Prediction Presence or Absence Flag is 1)

In a case in which a depth intra-mode flag depth_intra_mode_flag is 0, that is, the depth intra-prediction is DMM 1 prediction, the variable-length decoding section 11 sets a prediction mode number indicating DMM 1 prediction in a prediction mode predModeIntra. Further, a wedge pattern index wedge_full_tab_idx for designating the wedge pattern indicating the partition pattern in the PU is decoded.

(Case in which Depth Intra-Prediction Presence or Absence Flag is 0)

In a case in which a depth intra-prediction presence or absence flag dim_not_present_flag is 0, the variable-length decoding section 11 decodes an MPM flag mpm_flag indicating whether the intra-prediction mode of the target PU matches an estimation prediction mode MPM. In a case in which the MPM flag mpm_flag is 1, the MPM flag mpm_flag indicates that the intra-prediction mode of the target PU matches the estimation prediction mode MPM. In a case in which the MPM flag mpm_flag is 0, the MPM flag mpm_flag indicates that the intra-prediction mode is any prediction mode other than the estimation prediction mode MPM among prediction mode numbers '0' to '34' (any one of the DC prediction, the planar prediction, and the angular prediction).

In the case in which the MPM flag is 1, the variable-length decoding section 11 further decodes the MPM index mpm_idx for designating the estimation prediction mode MPM and sets the estimation prediction mode indicated by the MPM index mpm_idx in the prediction mode predModeIntra.

In the case in which the MPM flag is 0, the variable-length decoding section 11 further decodes an index rem_idx for designating a prediction mode other than the MPM flag and sets any prediction mode number among prediction mode numbers '0' to '34' (any one of the DC prediction, the planar prediction, and the angular prediction) other than the estimation prediction mode MPM specified from the index rem_idx in the prediction mode predModeIntra.

(DC Offset Information)

The variable-length decoding section 11 further includes a DC offset information decoding section 111 (not illustrated). The DC offset information decoding section 111 decodes the DC offset information included in the target CU.

More specifically, the DC offset information decoding section 111 derives a DC offset information presence or absence flag cuDepthDcPresentFlag of the CU indicating there the DC offset information is present or absent in the target CU by the following formula.

In a case in which cuDepthDcPresentFlag=(sdc_flag|| (CuPredMode==MODE INTRA)), that is, the SDC flag sdc_flag, is 1 or a prediction type information CuPredMode is intra-prediction, the DC offset information presence or absence flag of the CU is set to 1 (true). In other cases (the SDC flag is 0 (false) or the case of the inter-prediction), the DC offset information presence or absence flag of the CU is set to 0 (false). In a case in which the DC offset information presence or absence flag of the CU is 1, it is indicated that the DC offset information in the target CU can be present. In a case in which the DC offset information presence or absence flag of the CU is 0, it is indicated that the DC offset information in the target CU is not present.

Subsequently, in the case in which the DC offset information presence or absence flag in the CU is 1, the DC offset information decoding section 111 decodes the DC offset information to correct the depth prediction value of one partitioned region or the plurality of partitioned regions in the PU for each PU of the target CU.

More specifically, the DC offset information decoding section 111 first derives a DC offset information presence or absence flag puDepthDcPresentFlag of the PU indicating whether the DC offset information regarding the target PU is present by the following formula.

puDepthDcPresentFlag=(DmmFlag||sdc_flag).

That is, in a case in which the DMM flag of the target PU is 1 or the SDC flag is 1, the DC offset information presence or absence flag in the PU is set to 1 (true). In other cases (DmmFlag==0 && sdc_flag==0), the DC offset information presence or absence flag is set to 0 (false). In a case in which the DC offset information flag in the PU is 1, it is indicated that the DC offset information is present in the target PU. In a case in which the DC offset information flag is 0, it is indicated that the DC offset information is not present in the target PU.

The DC offset information decoding section 111 derives the number of partition regions dcNumSeg in the target PU by the following formula based on the DMM flag of the target PU.

dcNumSeg=DmmFlag ? 2:1.

That is, in a case in which the DMM flag is 1, the number of partition regions dcNumSeg in the target PU is set to 2. In a case in which the DMM flag is 0, the number of partition regions dcNumSeg in the target PU is set 1. X ? Y:Z is a three-term operator that selects Y in a case in which X is true (other than 0) and selects Z in a case in which X is false (0).

The DC offset information decoding section 111 derives a DC offset value DcOffset[i] corresponding to a partition region Ri (where i=0 to dcNumSeg−1) in each PU based on the DC offset information (the DC offset information presence or absence flag depth_dc_flag, a DC offset absolute value depth_dc_abs[i], and a DC offset sign depth_dc_sign_flag[i]) and the number of partition regions dcNumSeg by the following formula.

DcOffset[i]=!depth_dc_offset_flag?0:(1−2*depth_dc_sign_flag[i])*(depth_dc_abs[i]+dcNumSeg−2).

That is, in a case in which the DC offset information presence or absence flag is 0, the DC offset value DcOffset[i] of the partition region Ri is set to 0. In a case in which the DC offset information presence or absence flag is 1, the DC offset value DcOffset[i] of the partition region Ri is set based on depth_dc_sign_flag[i] and depth_dc_abs[i], and the number of partition regions dcNumSeg.

The derivation formula for the DC offset value is not limited to the foregoing formula and can be changed within an executable range. For example, the DC offset value may be derived by the following formula.

DcOffset[i]=(1−2*depth_dc_sign_flag[i])*(depth_dc_abs[i]+dcNumSeg−2).

[Inverse Quantization and Inverse Transform Section]

The inverse quantization and inverse transform section 13 executes an inverse quantization and inverse transform process on each block included in the target CU based on the TT information TTI. Specifically, the inverse quantization and inverse transform section 13 restores a prediction residual D (or resSamples[x][y]) of each pixel corresponding to the target TU by executing inverse quantization and inverse orthogonal transform of a quantization prediction residual included in the TU information TUI corresponding to the target TU on each target TU. Here, orthogonal transform refers to orthogonal transform from a pixel region to a frequency domain. Accordingly, inverse orthogonal transform is transform from a frequency domain to a pixel region. Examples of the inverse orthogonal transform include inverse discrete cosine transform (DCT) and inverse discrete sine transform (DST). The inverse quantization and inverse transform section 13 supplies the restored prediction residual D to the addition section 15. In a case in which the SDC flag is 1, the inverse quantization and inverse transform section 13 omits the inverse quantization and inverse transform process, sets the prediction residual D (or resSamples[x][y]) of each pixel of the target TU to 0, and supplies the prediction residual D to the addition section 15.

[Predicted Image Generation Section]

The predicted image generation section 14 generates a predicted image in regard to each PU included in the target CU based on the PT information PTI. Specifically, the predicted image generation section 14 generates a predicted image Fred from a local decoded image P' which is an image after decoding by executing intra-prediction or inter-prediction on each target PU according to the parameters included in the PU information PUI (prediction information Pinfo) corresponding to the target PU. The predicted image generation section 14 supplies the generated predicted image Pred to the addition section 15. The configuration of the predicted image generation section 14 will be described in more detail later.

[Addition Section]

The addition section 15 generates a decoded image P in regard to the target CU by adding the predicted image Pred supplied from the predicted image generation section 14 and the prediction residual D supplied from the inverse quantization and inverse transform section 13.

[Frame Memory]

The decoded images P which have been decoded are sequentially recorded on the frame memory 16. The decoded images corresponding to all of the tree blocks (for example, all of the tree blocks previous in a raster scan procedure) decoded earlier than the target tree block are recorded at a time point at which the target tree block is decoded on the frame memory 16.

At a time point at which the target CU is decoded, the decoded images corresponding to all of the CUs decoded earlier than the target CU are recorded.

At a time point at which the decoded image generation process in the tree block unit ends in regard to all of the tree blocks in the image in the moving image decoding device 1, the decoded image #2 corresponding to the coded data #1 input to the moving image decoding device 1 and corresponding to an one input frame is output to the outside.

(Definition of Prediction Mode)

As described above, the predicted image generation section 14 generates a predicted image based on the PT information PTI and outputs the predicted image. In a case in which the target CU is an intra-CU, the PU information PTI input to the predicted image generation section 14 includes, for example, a motion vector mvLX (where X=0 and 1) and a reference image index refIdxLX (where X=0 and 1) or single prediction (L0 prediction and L1 prediction) for designating a decoded image stored in the frame memory 16 as a reference image or an inter-prediction identifier inter pred idx for designating an inter-prediction scheme such as bi-directional prediction.

In a case in which the target CU is an intra-CU, the PU information PTI input to the predicted image generation section 14 includes a prediction mode (IntraPredMode) and a chroma prediction mode (IntraPredModeC). Hereinafter, definition of the prediction modes (luminance and chroma) will be described with reference to FIG. 7.

(Overview)

FIG. 7 illustrates examples of classification of intra-prediction modes used in the moving image decoding device 1 and corresponding prediction mode numbers. Prediction mode number '0' is allocated to the planar prediction (INTRA_PLANAR), prediction mode number '1' is allocated to the DC prediction (INTRA DC), prediction mode numbers '2' to '34' are allocated to the angular prediction (INTRA ANGULAR), prediction mode number '35' is allocated to the DMM 1 prediction (INTRA_DMM_WFULL), and prediction mode number '36' is allocated to the DMM 4 prediction (INTRA_DMM_CREDTEX). The DMM 1 prediction and the DMM 4 prediction are collectively referred to as depth intra-prediction. The depth intra-prediction is based on a depth model in which a target block on a depth map (also referred to as a depth block) is configured by two nonrectangular flat regions and a depth value of each flat region is expressed with a fixed value. As a depth block partition method, there are wedgelet partition called DMM 1 and contour partition called DMM 4. In the present specification, a method of using the wedgelet partition will be described.

Figure 8:
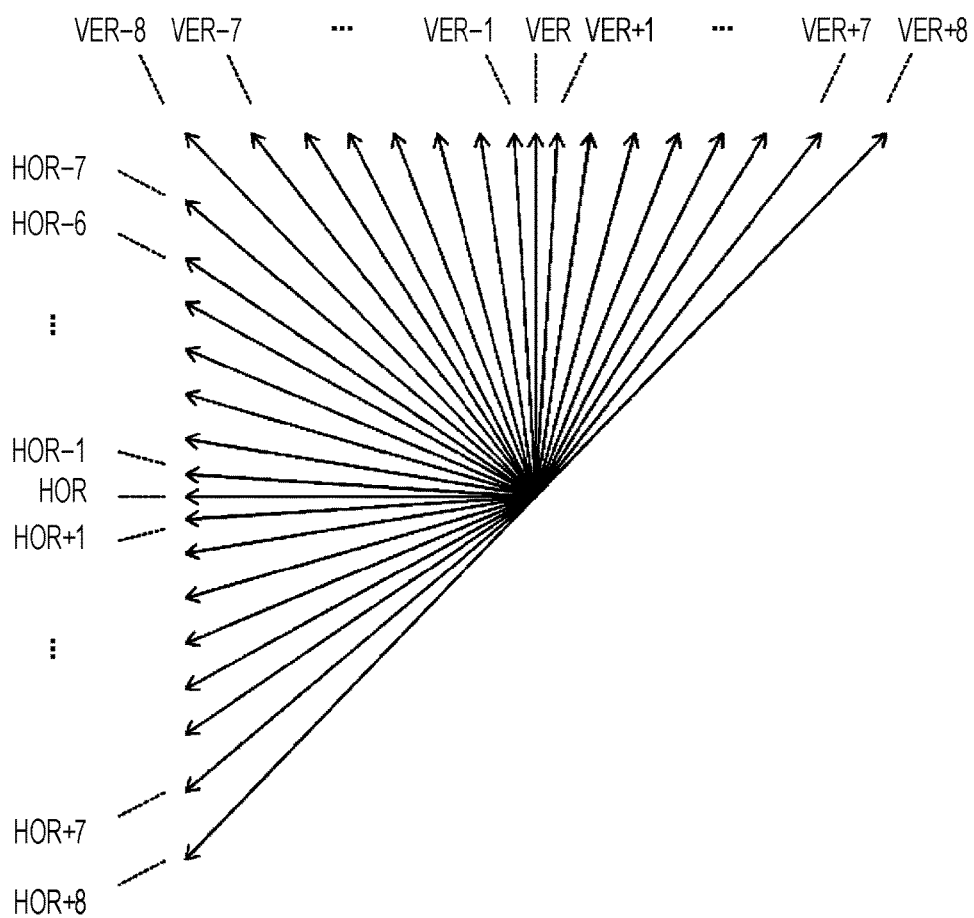
FIG. 8 is a diagram illustrating a prediction direction corresponding to an identifier of a prediction mode in 33 types of prediction modes belonging to directional prediction.

Next, an identifier of each prediction mode included in the angular prediction will be described with reference to FIG. 8. In FIG. 8, identifiers of the prediction modes and corresponding prediction directions are illustrated in 33 types of prediction modes belonging to directional prediction.

(Details of Predicted Image Generation Section)

Figure 9:
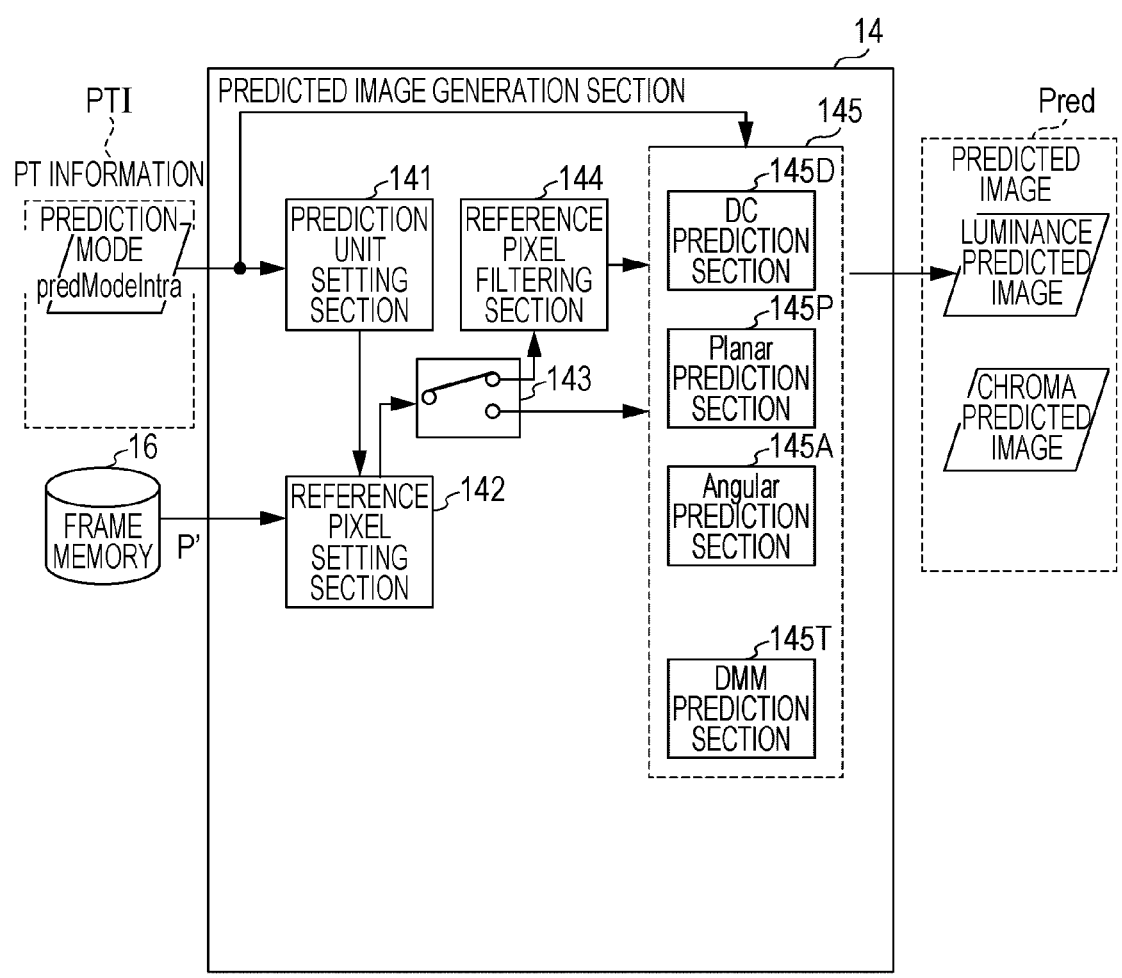
FIG. 9 is a functional block diagram illustrating an example of the configuration of a predicted image generation section included in the moving image decoding device.

Next, the configuration of the predicted image generation section 14 will be described in more detail with reference to FIG. 9. FIG. 9 is a functional block diagram illustrating an example of the configuration of the predicted image generation section 14. In the example of the configuration, a functional block related to generation of a predicted image of the intra-CU in the functions of the predicted image generation section 14 is illustrated.

As illustrated in FIG. 9, the predicted image generation section 14 includes a prediction unit setting section 141, a reference pixel setting section 142, a switch 143, a reference pixel filtering section 144, and a predicted image derivation section 145.

The prediction unit setting section 141 sets target PUs in a setting procedure of the definition of the PUs included in the target CU and outputs information (target PU information) regarding the target PU. The target PU information includes at least a size nS of the target PU, the position of the target PU in the CU, and an index (luminance or chroma index cIdx) indicating a luminance or chroma plane of the target PU.

The switch 143 outputs a reference pixel to a corresponding output destination based on the luminance or chroma index cIdx and the prediction mode predModeIntra among the pieces of input target PU information. More specifically, on the assumption that the luminance or chroma index cIdx is 0 (a processing target pixel is luminance) and the prediction mode predModeIntra is 0 to 34 (the prediction mode is the planar prediction, the DC prediction, or the angular prediction (predModeIntra<<35)), the switch 143 outputs the input reference pixel to the reference pixel filtering section 144. In other cases, that is, on the assumption that the luminance or chroma index cIdx is 1 (a processing target pixel is chroma) or the prediction mode predModeIntra is the depth intra-prediction allocated to prediction mode number '35' (predModeIntra>=35), the switch 143 outputs the input reference pixel to the predicted image derivation section 145.

The reference pixel filtering section 144 applies a filter to the input reference pixel value and outputs the reference pixel value after the application of the filter. Specifically, the reference pixel filtering section 144 decides whether to apply a filter according to the target PU size and the prediction mode predModeIntra.

The predicted image derivation section 145 generates a predicted image predSamples in the target PU based on the input PU information (the prediction mode predModeIntra, the luminance or chroma index cIdx, and the PU size nS) and the reference pixel p[x][y] and outputs the predicted image predSamples. The details of the predicted image derivation section 145 will be described later.

(Flow of Predicted Image Generation Process)

Figure 10:
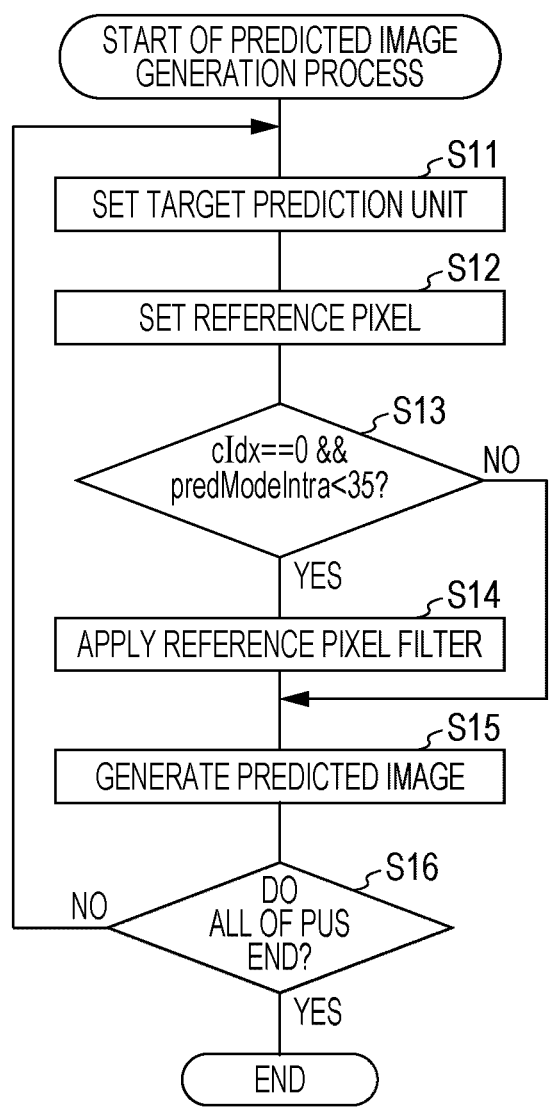
FIG. 10 is a flowchart illustrating a schematic predicted image generation process in a CU unit in the predicted image generation section.

Next, a schematic predicted image generation process in the CU unit in the predicted image generation section 14 will be described with reference to the flowchart of FIG. 10. When the predicted image generation process in the CU unit starts, the prediction unit setting section 141 first sets one PU included in the CU as a target PU in the pre-decided procedure and outputs the target PU information to the reference pixel setting section 142 and the switch 143 (S11). Next, the reference pixel setting section 142 sets a reference pixel of the target PU using a decoded pixel value read from an external frame memory (S12). Next, the switch 143 determines whether the target PU is luminance or chroma or the prediction mode predModeIntra is the DMM prediction based on the input target PU information and switches an output according to the determination result (S13).

In a case in which the target PU is luminance and the prediction mode predModeIntra is not the depth intra-prediction (cIdx==0 && predModeIntra<35) (YES in S13), the output of the switch 143 is connected to the reference pixel filtering section 144. Subsequently, the reference pixel is input to the reference pixel filtering section 144, a reference pixel filter is applied according to a separately input prediction mode, and the reference pixel after the application of the filter is output to the predicted image derivation section 145 (S14).

Conversely, in a case in which the target PU is the chroma or the prediction mode predModeIntra is the depth intra-prediction (cIdx==1||predModeIntra>=35) (NO in S13), the output of the switch 143 is connected to the predicted image derivation section 145.

Next, the predicted image derivation section 145 generates the predicted image predSamples in the target PU based on the input PU information (the prediction mode predModeIntra, the luminance or chroma index cIdx, and the PU size nS) and the reference pixel p[x][y] and outputs the predicted image predSamples (S15).

When the generation of the predicted image of the luminance or the chroma of the target PU ends, the prediction unit setting section 141 determines whether the predicted image of all of the PUs in the target CU is generated (S16). In a case in which the predicted image of some of the PUs in the target CU is not generated (NO in S16), the process returns to the foregoing S1 and the predicted image generation process of a subsequent PU in the target CU is executed. In a case in which the predicted image of all of the PUs in the target CU is generated (YES in S16), the predicted image of the luminance and the chroma of each PU in the target CU is accordingly output as the predicted image of the target CU and the process ends.

(Details of Predicted Image Derivation Section 145)

Next, the details of the predicted image derivation section 145 will be described. As illustrated in FIG. 9, the predicted image derivation section 145 further includes a DC prediction section 145D, a planar prediction section 145P, an angular prediction section 145A, and a DMM prediction section 145T.

The predicted image derivation section 145 selects a prediction method to be used to generate a predicted image based on the input prediction mode predModeIntra. The selection of the prediction method is realized by selecting a prediction method corresponding to the prediction mode number of the input prediction mode predModeIntra based on the above-described definition of FIG. 7.

Further, the predicted image derivation section 145 derives the predicted image according to the selection result of the prediction method. More specifically, in a case in which the prediction method is the planar prediction, the DC prediction, the angular prediction, and the DMM prediction, the planar prediction section 145P, the DC prediction section 145D, the angular prediction section 145A, and the DMM prediction section 145T of the predicted image derivation section 145 derive the predicted image, respectively.

The DC prediction section 145D derives a DC prediction value equivalent to an average value of the pixel values of the input reference pixels and outputs the predicted image in which the derived DC prediction value is set as a pixel value.

The planar prediction section 145P generates the predicted image in accordance with the pixel value derived by linearly adding the plurality of reference pixels according to a distance from the prediction target pixel and outputs the predicted image.

[Angular Prediction Section 145A]

The angular prediction section 145A generates the predicted image corresponding to the target PU using the reference pixel in the prediction direction (reference direction) corresponding to the input prediction mode predModeIntra and outputs the predicted image. In the process of generating the predicted image through the angular prediction, a main reference pixel is set according to a value of the prediction mode predModeIntra and the predicted image is generated with reference to the main reference pixel in units of lines or columns in the PU.

[DMM Prediction Section 145T]

The DMM prediction section 145T generates a predicted image corresponding in the target PU based on the DMM prediction (Depth Modeling Mode which is also referred to as depth intra-prediction) corresponding to the input prediction mode predModeIntra and outputs the predicted image.

A schematic DMM prediction will be described with reference to FIG. 11 before detailed description of the DMM prediction section 145T. FIG. 11 is a conceptual diagram illustrating the DMM prediction executed by the DMM prediction section 145T. As illustrated in FIG. 11(*a*), a depth map is mainly characterized in that the depth map has an edge region indicating an object boundary and a flat region (a depth value is substantially constant) indicating an object area. First, in the DMM prediction, basically, a target block is partitioned into two regions P1 and P2 along an edge of an object using the image characteristics of the depth map and a wedge pattern WedgePattern[x][y] which is pattern information indicating a region to each pixel belongs is derived, as illustrated in FIG. 11(*b*).

The wedge pattern (wedgelet pattern) WedgePattern[x][y] is a matrix which has a size of width×height of a target block (target PU) and in which 0 or 1 is set for each component (x, y), and indicates that each pixel of the target block belongs one of the two regions P1 and P2. In the example of FIG. 11(*b*), when the value of a component is 0, the pixel belongs to the region P1. When the value of a component is 1, the pixel belongs to the region P2. Next, as illustrated in FIG. 11(*c*), a predicted image is generated by filling the regions P1 and P2 with depth prediction values.

Hereinafter, a wedge pattern partitioned by a line segment referred to as wedgelet is referred to as a wedgelet pattern for convenience. Since the wedge pattern and the wedgelet pattern are the same (2-dimensional pattern partitioned into two regions), the wedge pattern and the wedgelet pattern may not particularly distinguished from each other. The wedge pattern (the wedgelet pattern) is also simply referred to as a pattern.

Figure 1:
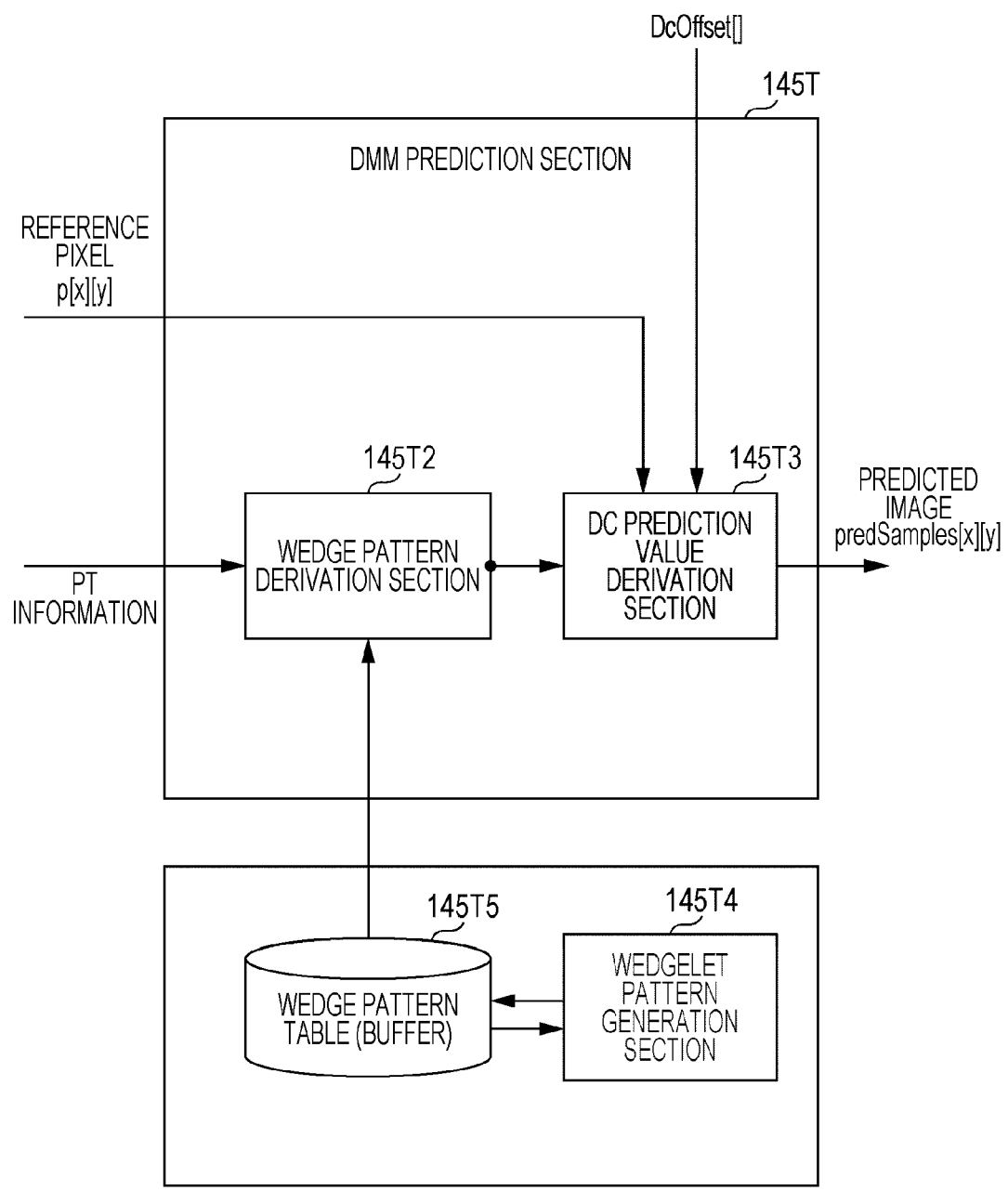
FIG. 1 is a block diagram illustrating the detailed configuration of a DMM prediction section according to an embodiment.

Hereinafter, the configuration of the DMM prediction section 145T will be described with reference to FIG. 1. FIG. 1 is a functional block diagram illustrating an example of the configuration of the DMM prediction section 145T.

As illustrated in FIG. 1, a DMM prediction section 145T includes a wedge pattern derivation section 145T2 and a DC prediction value derivation section 145T3 are included.

The DMM prediction section 145T activates wedge pattern generation means corresponding to the input prediction mode predModeIntra to generate a wedge pattern wedgePattern[x][y] indicating the partition pattern of the target PU. More specifically, in a case in which the prediction mode predModeIntra is prediction mode number '35', that is, in the INTRA_DMM_WEDGEFULL mode, a wedge pattern derivation section 145T2 is activated. On the other hand, in a case in which the prediction mode predModeIntra is prediction mode number '36', that is, in the INTRA_DMM_i mode, a DC prediction value derivation section 145T3 is activated.

[Wedge Pattern Derivation Section 145T2]

The wedge pattern derivation section 145T2 derives the wedge pattern wedgePattern[x][y] to be applied to the target PU from an array WedgePatternTable[x][y] of the wedge pattern table stored in the wedge pattern table 145T5 based on the input target PU size nS, the wedge pattern index wedge_full_tab_idx, a preset reference wedge pattern size nBS, and the number of reference wedge patterns NumWedgePattern[log 2 (nS)], and then outputs the wedge pattern wedgePattern[x][y] to the DC prediction value derivation section 145T3.

$$\text{wedgePattern}[x][y]=\text{WedgePatternTable}[\log 2(ns)]\\ [\text{wedge\_full\_tab\_idx}][x][y]$$

with x=0 to nS−1 and y=0 to nS−1.

Here, log 2(nS) is a logarithmic value of the target PU size (nS) to base 2 and is also expressed as log 2BlkSize (=log 2(nS)). For nS=4, 8, 16, 32, and 64, log 2(nS) is 2, 3, 4, 5, and 6.

[DC Prediction Value Derivation Section 145T3]

The DC prediction value derivation section 145T3 partitions the target PU into two regions (for example, regions P1 and P2 illustrated in FIG. 11(*c*)) based on the wedge pattern wedgePattern[x][y] indicating the partition pattern of the target PU, derives a prediction value for the region P1 and a prediction value for the region P2 based on the input PT information and the reference pixel p[x][y], and sets and derives the prediction value derived in each region to a predicted image predSamples[x][y].

[Wedgelet Pattern Generation Section 145T4]

The wedge pattern derivation section 145T2 activates the wedgelet pattern generation section 145T4 only at the first activation time to generate a plurality of wedge patterns for each block size nS. Next, the generated wedge patterns are stored in the wedge pattern table 145T5.

An overview of a method of generating the wedgelet patterns will be described with reference to FIG. 12 before a method of generating the wedge pattern table in the wedgelet pattern generation section 145T4 is described. First, a wedgelet pattern in which all the components are 0 is generated. Next, a starting point S (xS, yS) and an ending point E (xE, yE) are set in the wedgelet pattern. The starting point and the ending point are set on sides of a quadrangle that forms a pattern. In an example of FIG. 12(*a*), the starting point S (xS, yS)=(3, patternSize−1) and the ending point E (xE, yE)=(patternSize−1, 2). Next, a line segment is drawn between the starting point S and the ending point E using the Bresenham algorithm (components on a diagonal line in FIG. 12(b)). In an example of FIG. 12(c), a wedgelet pattern wedgePattern[x][y] is continuously generated by setting 1 in components on the line segment and components corresponding to coordinates of the left side of the line segment, as illustrated in FIG. 12(d). Here, patternSize is the size (the vertical width and the horizontal width) of a block that generates a wedgelet pattern.

Figure 13:
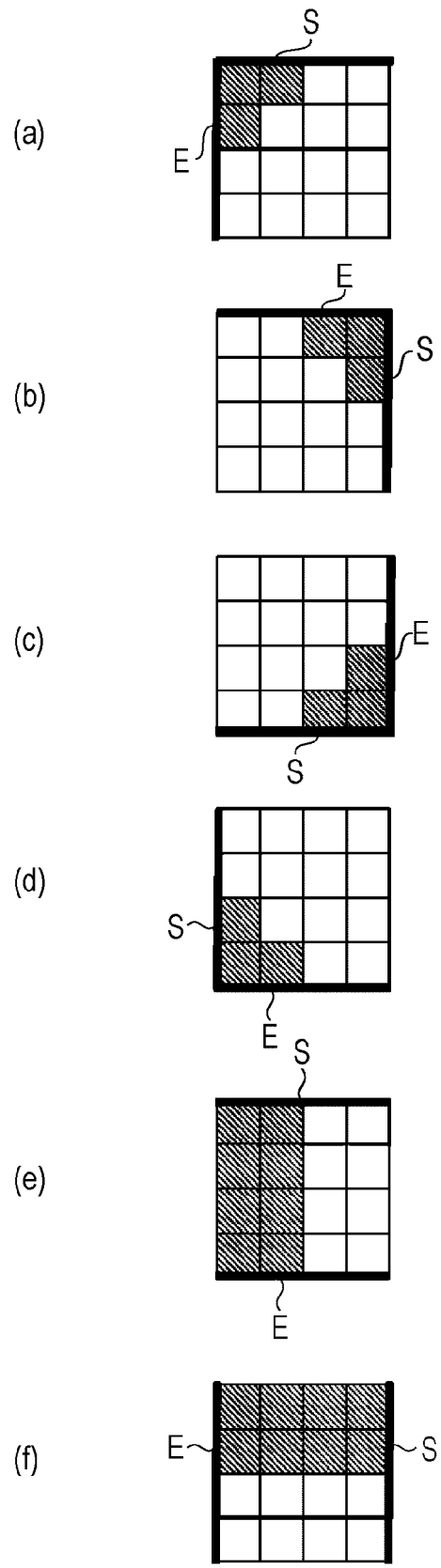
FIG. 13 is a diagram illustrating examples of other wedgelet patterns in a wedge orientation wedgeOri (wedgeOri=0 to 5) generated in a wedgelet pattern generation section 145T4 in DMM 1 prediction.

Hereinafter, the method of generating the wedge pattern table in the wedgelet pattern generation section 145T4 will be described. As illustrated in FIG. 13, the wedgelet pattern generation section 145T4 mainly generates wedgelet patterns of 6 types of wedge orientations wedgeOri (wedgeOri=0 to 5) according to the block sizes nS. A plurality of wedge patterns (wedge pattern set) are generated while shifting the positions of starting and ending points in one wedge orientation wedgeOri (wedgeOri=0 to 5).

FIG. 13(a) illustrates a wedgelet pattern of the wedge orientation wedgeOri=0 formed by two regions partitioned by a line segment connecting two points obtained by selecting a point on a line segment S of the top side of a block as a starting point and selecting a point on a line segment E of the left side of the block as an ending point.

FIG. 13(b) illustrates a wedgelet pattern of the wedge orientation wedgeOri=1 formed by two regions partitioned by a line segment connecting two points obtained by selecting a point on a line segment S of the right side of a block as a starting point and selecting a point on a line segment E of the top side of the block as an ending point.

FIG. 13(c) illustrates a wedgelet pattern of the wedge orientation wedgeOri=2 formed by two regions partitioned by a line segment connecting two points obtained by selecting a point on a line segment S of the bottom side of a block as a starting point and selecting a point on a line segment E of the right side of the block as an ending point.

FIG. 13(d) illustrates a wedgelet pattern of the wedge orientation wedgeOri=3 formed by two regions partitioned by a line segment connecting two points obtained by selecting a point on a line segment S of the left side of a block as a starting point and selecting a point on a line segment E of the bottom side of the block as an ending point.

FIG. 13(e) illustrates a wedgelet pattern of the wedge orientation wedgeOri=4 formed by two regions partitioned by a line segment connecting two points obtained by selecting a point on a line segment S of the top side of a block as a starting point and selecting a point on a line segment E of the bottom side of the block as an ending point.

FIG. 13(f) illustrates a wedgelet pattern of the wedge orientation wedgeOri=5 formed by two regions partitioned by a line segment connecting two points obtained by selecting a point on a line segment S of the left side of a block as a starting point and selecting a point on a line segment E of the right side of the block as an ending point.

In the embodiment, the wedgelet pattern of the wedge orientation wedgeOri=0 illustrated in FIG. 13(a) is referred to as a first basic pattern. The wedgelet patterns of the wedge orientations wedgeOri=1 to 3 illustrated in FIG. 13(b) are generated by rotating the wedgelet pattern of the wedge orientation wedgeOri=0. Further, the wedgelet pattern of the wedge orientation wedgeOri=4 illustrated in FIG. 13(e) is referred to as a second basic pattern. The wedgelet pattern of the wedge orientations wedgeOri=5 illustrated in FIG. 13(f) is generated by rotating the wedgelet pattern of the wedge orientation wedgeOri=4.

Figure 14:
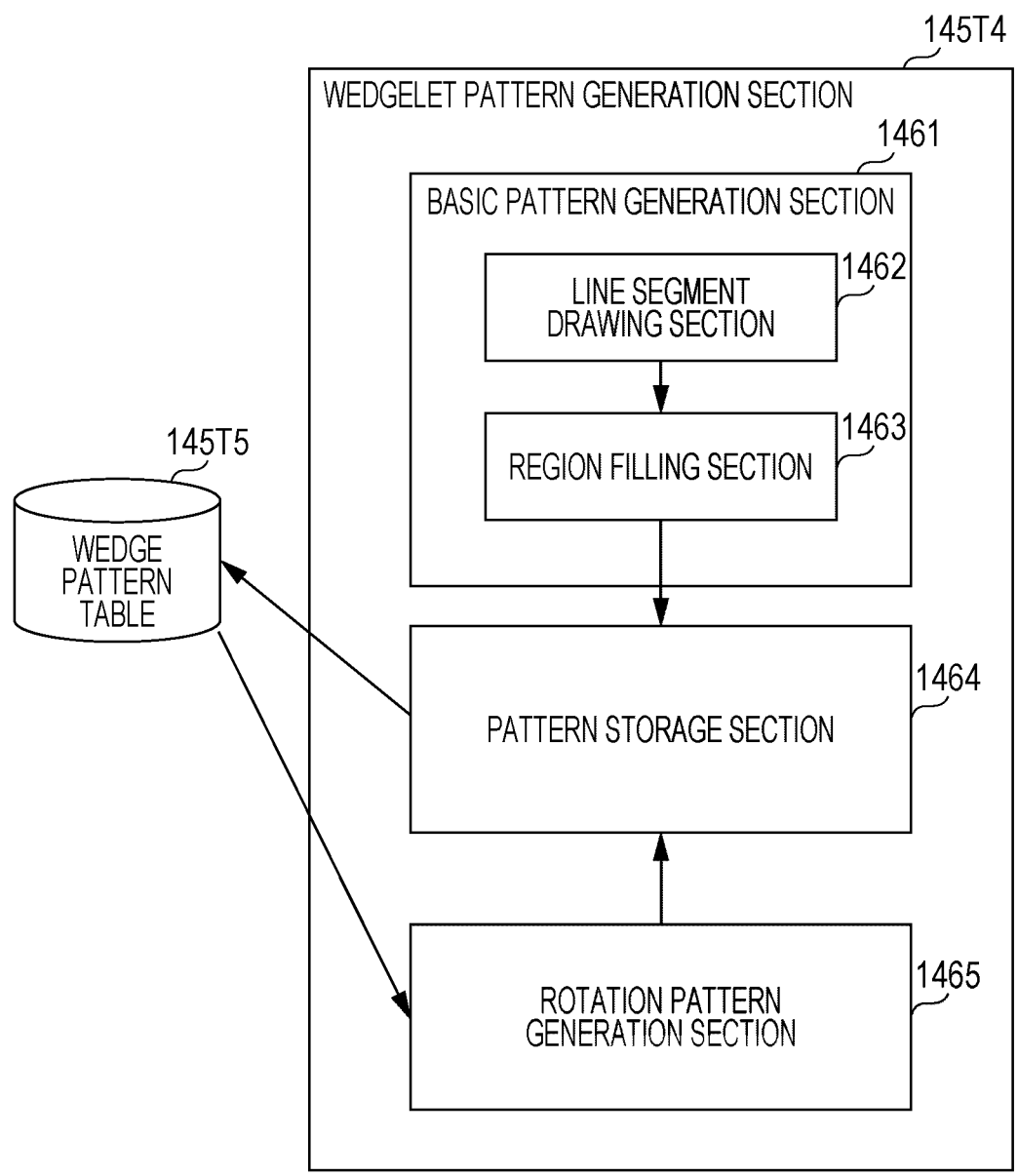
FIG. 14 is a block diagram illustrating the configuration of the wedgelet pattern generation section 145T4.

FIG. 14 is a block diagram illustrating the configuration of the wedgelet pattern generation section 145T4. The wedgelet pattern generation section 145T4 is configured to include a basic pattern generation section 1461, a pattern storage section 1464, and a rotation pattern generation section 1565. The basic pattern generation section 1461 is configured to include a line segment drawing section 1462 and a region filling section 1463.

The wedgelet pattern generation section 145T4 according to the embodiment does not generate all of the wedgelet patterns through a line segment drawing process and a region filling process performed using the line segment drawing section 1462 and the region filling section 1463 and generates some of the wedgelet patterns through a rotation process performed using the rotation pattern generation section 1565. Since the line segment drawing process and the region filling process in which a processing amount is large are substituted with a rotation process in which the processing amount is small, the advantageous effect of reducing the processes is obtained.

Figure 16:
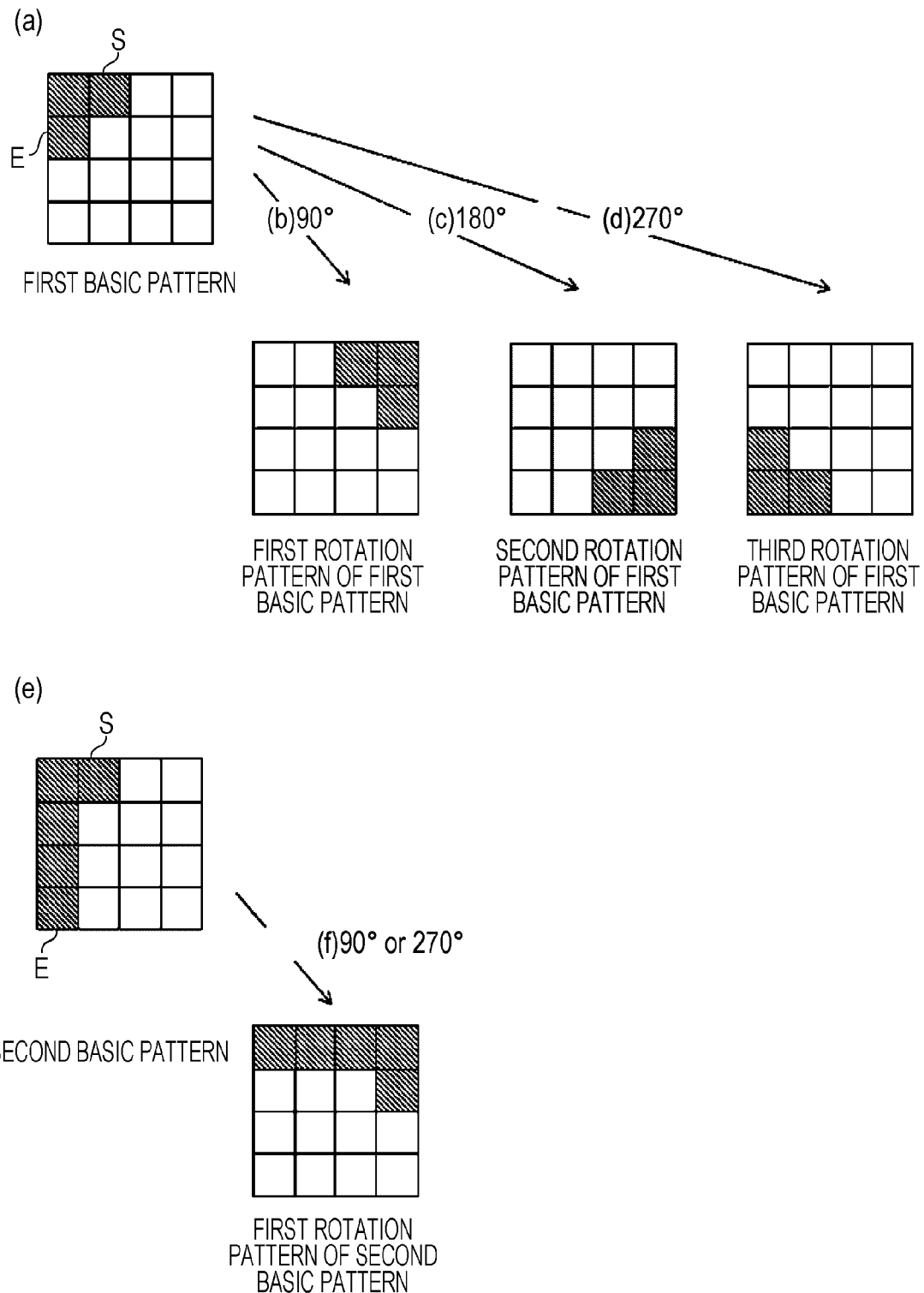
FIG. 16 is a diagram illustrating a wedgelet pattern generation process in the wedgelet pattern generation section 145T4.

FIG. 16 is a diagram illustrating a wedgelet pattern generation process in the wedgelet pattern generation section 145T4. As illustrated, the wedgelet pattern generation section 145T4 according to the embodiment generates a first rotation pattern of the first basic pattern, a second rotation pattern of the first basic pattern, and a third rotation pattern of the first basic pattern which are a wedgelet pattern set through rotation performed by the rotation pattern generation section 1565, as illustrated in (b), (c), and (d) of FIG. 16 with reference to respective wedgelet patterns included in the first basic pattern which is a wedgelet pattern set generated by the basic pattern generation section 1461, as illustrated in (a) of FIG. 16 and generates a first rotation pattern of the second basic pattern which is a wedgelet pattern set through rotation performed by the rotation pattern generation section 1565, as illustrated in (f) of FIG. 16 with reference to respective wedgelet patterns included in the second basic pattern which is a wedgelet pattern set generated by the basic pattern generation section 1461, as illustrated in (e) of FIG. 16. In the embodiment, clockwise 90 degrees, 180 degrees, and 270 degrees will be exemplified as examples of the first rotation pattern, the second rotation pattern, and the third rotation pattern. However, irrespective of this order, an order of 270 degrees, 180 degrees, and 90 degrees may be used as long as the pattern is rotated in units of 90 degrees. Also, an order of 180 degrees, 90 degrees, and 270 degrees may be used.

Figure 17:
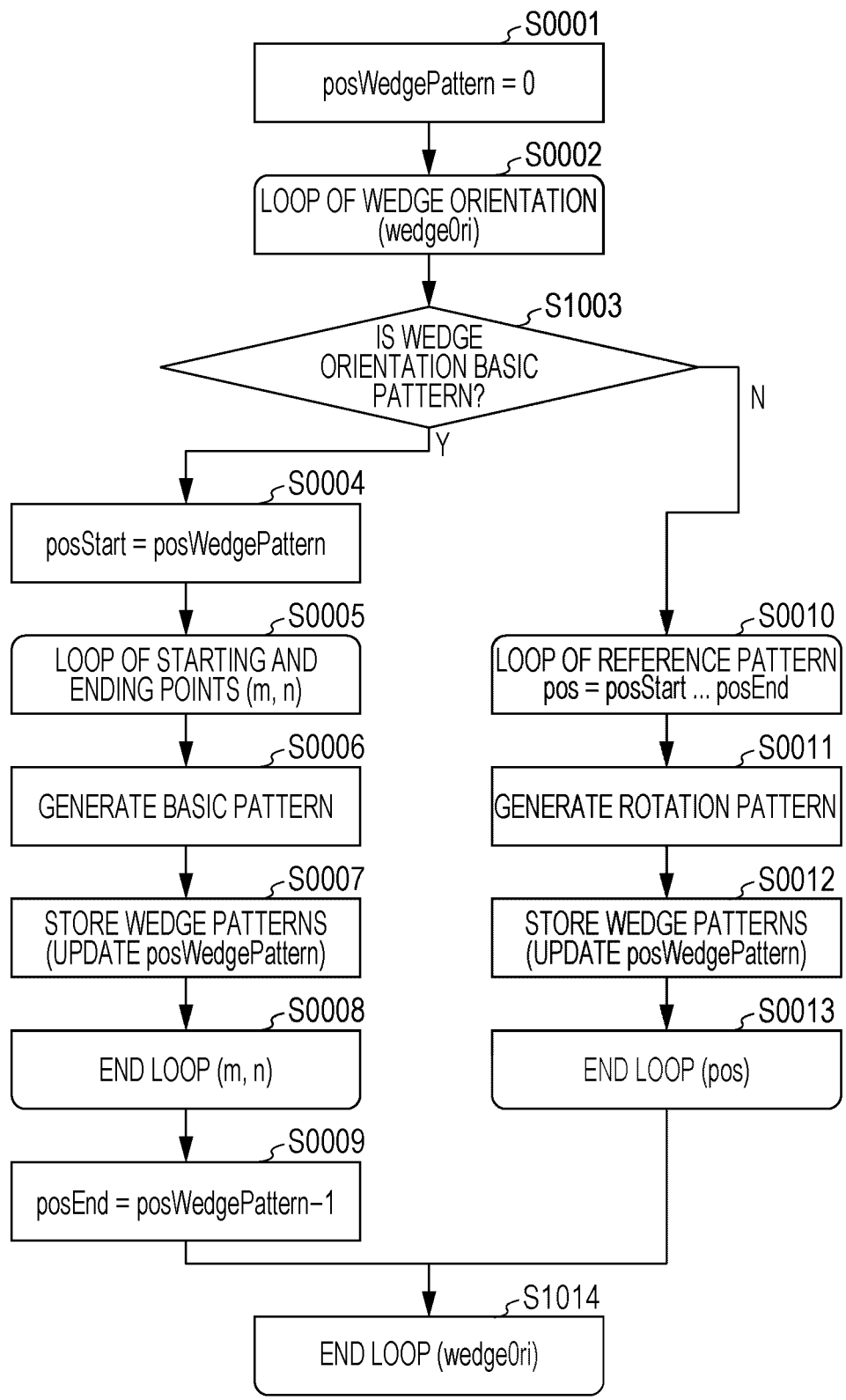
FIG. 17 is a flowchart illustrating an operation of the wedgelet pattern generation section 145T4.

FIG. 17 is a flowchart illustrating an operation of the wedgelet pattern generation section 145T4.

(S0001) A variable posWedgePattern is set to 0.

(S0002) A loop related to the wedge orientation wedgeOri starts. Then, 0, 1, 2, 3, 4, and 5 are set in order in the wedge orientation wedgeOri and processes from S0003 to S0014 are performed. Thus, the wedgelet pattern set of the wedge orientation wedgeOri is derived.

(S0003) In a case in which the wedge orientation wedgeOri has a value indicating the basic patterns (here, wedgeOri=0 and 4), the process transitions to S0004 to generate each wedgelet pattern of the wedge orientation wedgeOri through the line segment drawing process and the region filling process. In a case in which the wedge orientation wedgeOri has a value other than the values indicating the basic patterns (here, wedgeOri=1, 2, 3, and 5), the process transitions to S0010 to generate a wedgelet pattern through a rotation process.

(S0004) posWedgePattern which is the number of wedge patterns before generation of the basic patterns is set in a variable posStart. A loop related to variables m and n for controlling a starting point position and an ending point position of posStart=posWedgePattern (S0005) starts. Loop variables are assumed to be m and n. Hereinafter, the processes from S0006 to S0008 are performed on m and n of m=0 to wBlkSize−1 and n=0 to wBlkSize−1. Thus, the wedgelet patterns are generating while changing the starting and ending points of the wedge orientation wedgeOri. In addition, wBlkSize is a block size (virtual block size).

(S0006) the line segment drawing section 1462 draws a line segment and the region filling section 1463 fills a region to generate a wedgelet pattern with the starting and ending points indicated by the variables m and n and the wedge orientation wedgeOri.

(S0007) The pattern storage section 1464 stores the generated wedgelet pattern in the wedge pattern table 145T5. More specifically, in a case in which a matching determination condition indicated by the pattern storage section 1464 is satisfied, the wedgelet pattern is stored. In a case in which the wedgelet pattern is stored, the number of wedge patterns NumWedgePattern increases by 1. The number of wedge patterns NumWedgePattern at the time of the storage is set in posWedgePattern.

(S0008) The loop related to the variables m and n for controlling the starting point position and the ending point position ends.

(S0009) posWedgePattern−1 which is the number of wedge patterns after generation of the basic patterns is set in posEnd. posEnd=posWedgePattern−1.

(S0010) A loop related to the index pos of the reference pattern starts. A range of pos is a range from posStart to posEnd.

(S0011) The rotation pattern generation section 1465 generates the wedgelet pattern which is a rotation pattern using pos as the reference wedgelet pattern.

(S0012) The generated wedgelet pattern is stored in the wedge pattern table 145T5. More specifically, in a case in which a matching determination condition indicated by the pattern storage section 1464 is satisfied, the wedgelet pattern is stored. In a case in which the wedgelet pattern is stored, the number of wedge patterns NumWedgePattern increases by 1. The number of wedge patterns NumWedgePattern at the time of the storage is set in posWedgePattern.

(S0013) The loop related to the index pos of the reference pattern ends.

(S0014) The loop related to the wedge orientation wedgeOri ends.

Hereinafter, an operation of each means included in the wedgelet pattern generation section 145T4 will be described.

(Wedgelet Pattern Generation Section 145T4)

The wedgelet pattern generation section 145T4 generates a pattern with patternSize×patternSize using a block size (the size of a pattern) as patternSize (=nS). In the invention, it is assumed that a pattern of wBlkSize×wBlkSize is generated using a virtual block size wBlkSize which is equal to or twice the block size internally when the pattern of patternSize×patternSize is generated. Thus, the pattern can be generated in a finer unit. Here, wBlkSize=patternSize<<resShift is satisfied. A virtual expansion shift value resShift is set to 0 or 1. Here, the pattern size is patternSize=(1<<log 2BlkSize) when a base 2 logarithm log 2BlkSize of a target pattern is used.

The wedgelet pattern generation section 145T4 sets 2, 3, and 4 in the logarithm log 2BlkSize with the size of a wedge rate pattern and generates wedgelet patterns with sizes (4, 8, and 16). The pattern size patternSize, the virtual expansion shift value resShift, and the virtual block size wBlkSize are introduced in the following formulae.

$$resShift=(\log 2BlkSize==4)?0:1$$

$$patternSize=(1<<\log 2BlkSize)$$

$$wBlkSize=(patternSize<<resShift)=(1<<(\log 2BlkSize+resShift))$$

The wedgelet pattern generation section 145T4 sets 0 in the variable posWedgePattern (S0001).

The wedgelet pattern generation section 145T4 sets the wedge orientation wedgeOri (S0002) and generates a plurality of wedgelet patterns (wedgelet pattern set) corresponding to each wedge orientation wedgeOri. Specifically, 0, 1, 2, 3, 4, and 5 are used for the wedge orientations wedgeOri.

In the wedgelet pattern generation section 145T4, the basic pattern generation section 1461 generates the wedgelet patterns in a case in which the wedge orientation wedgeOri is 0 and 4 (S0004 to S0009). In a case in which the wedge orientation wedgeOri is 1, 2, 3, and 5, the rotation pattern generation section 1465 generates the wedgelet pattern by reading the wedgelet pattern stored in the wedge pattern table 145T and rotating the wedgelet pattern. The generated wedgelet pattern is stored in the wedge pattern table 145T by the pattern storage section 1464. The number of wedge tables according to the size log 2BlkSize is recorded in an array NumWedgePattern[ ]. NumWedgePattern[log 2BlkSize] is set in the variable posWedgePattern.

The wedgelet pattern generation section 145T4 sets posWedgePattern which is the number NumWedgePattern [log 2BlkSize] of the wedge table stored in the wedge pattern table 145T in the variable posStart at that time point before the derivation of the basic pattern (S0004).

The wedgelet pattern generation section 145T4 sets posWedgePattern−1 which is the number NumWedgePattern [log 2BlkSize] of the wedge table stored in the wedge pattern table 145T in the variable posEnd at that time point after the derivation of the basic pattern (S0009).

(Basic Pattern Generation Section)

The basic pattern generation section 1461 derives the first basic pattern (here, the wedgelet pattern set of the wedge orientation wedgeOri=0) and the second basic pattern (here, the wedgelet pattern set of the wedge orientation wedgeOri=4). Specifically, the starting and ending points of each wedgelet pattern belonging to each basic pattern are set, a line segment is set in the wedgelet pattern using the line segment drawing section 1462, and one of two regions partitioned by the line segment is set to 1 by the region filling section 1463 (S0006).

The basic pattern generation section 1461 performs the basic pattern (a wedge rate pattern that forms a basis) through the following processes in a case in which the wedge orientation wedgeOri is wedgeOri=0 (the wedge orientation corresponding to the first basic pattern) or wedgeOri=4 (the wedge orientation corresponding to the second basic pattern).

The variable m that takes each value in a range from 0 to wBlkSize−1 and the variable n that takes each value in a range from 0 to wBlkSize−1 are set, and starting points (xS, yS, xE, yE) are derived by the following formulae.

$$xS=m$$

$$yS=0$$

$$xE=(wedgeOri==0)?0:n$$

$$yE=(wedgeOri==0)?n:wBlkSize-1$$

The basic pattern generation section 1461 inputs the starting point (xS, yS) and the ending point (xE, yE) to the line segment drawing section 1462 and generates a line segment pattern as curPattern.

The basic pattern generation section 1461 inputs the starting point (xS, yS) and the ending point (xE, yE) to the region filling section 1463 and sets 1 in one of the regions of curPattern.

The basic pattern generation section 1461 inputs the pattern curPattern generated by the pattern storage section 1464.

(Line Segment Drawing Section 1462)

The line segment drawing section 1462 sets 1 in coordinates (xPos>>refShift, yPos>>refShift) obtained by shifting the line segment coordinates (xPos, yPos) to the right side by refShift where the coordinates (xPos, yPos) is obtained from the starting point (xS, yS) and the ending point (xE, yE) on an expanded block with a size patternSize<<refShift obtained by shifting the wedgelet pattern size patternSize to the left side by refShift. The line segment drawing section 1462 derives a line segment connecting the starting point (xS, yS) and the ending point (xE, yE) through a process indicated by the following pseudo-code and outputs the line segment to a pattern curPattern[ ][ ] (wedgePattern[ ][ ]).

```
x0 = xS
y0 = yS
x1 = xE
y1 = yE
if (abs (yE - yS) > abs (xE - xS)) {
    (x0, y0) = Swap (x0, y0)
    (x1, y1) = Swap (x1, y1)
}
if (x0 > x1) {
    (x0, x1) = Swap (x0, x1)
    (y0, y1) = Swap (y0, y1)
}
sumErr = 0
posY = y0
for (posX = x0; posX <= x1; posX++) {
    if (abs (yE - yS) > abs (xE - xS))
        curPattern[posY >> resShift][posX >> resShift] = 1
    else
        curPattern[posX >> resShift][posY >> resShift] = 1
    sumErr += (abs (y1 - y0) << 1)
    if (sumErr >= (x1 - x0)) {
        posY += (y0 < y1) ? 1 : --1
        sumErr --= (x1 - x0) << 1
    }
}
```

Also, x0, y0, x1, and y1 are variables indicating starting and ending points after conversion, sumErr indicates an increment, posX and posY indicate coordinates indicating a dot on a line connecting the starting point (xS, yS) to the ending point (xE, yE), and Swap (x, y) indicates a process of swapping x and y. Further, curPattern is a wedge pattern wedgePattern[ ][ ] which is a processing target.

Figure 20:
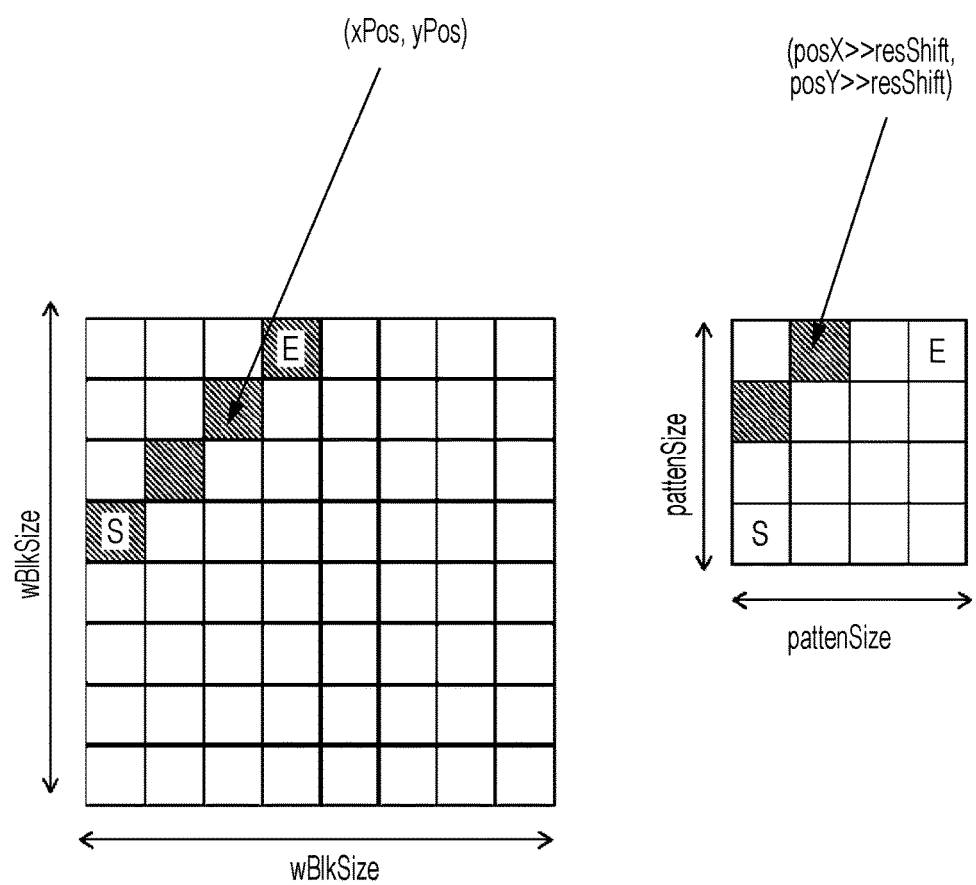
FIG. 20 is a diagram illustrating a relation between virtual coordinates (posX, posY) and a pattern according to the embodiment.

FIG. 20 is a diagram illustrating a relation between virtual coordinates (posX, posY) and a pattern according to the embodiment. The line segment drawing section 1462 sets the virtual coordinates (posX, posY) as a point on the line connecting the starting point (xS, yS) to the ending point (xE, yE) on a virtual block with wBlkSize×wBlkSize. The line segment drawing section 1462 does not ensure the virtual block on a memory and write 1 on the virtual coordinates (posX, posY), but writes 1 on coordinates (posY>>resShift, posX>>resShift) obtained by shifting the virtual coordinates to the right side by the virtual expansion shift value resShift on a memory equivalent to a pattern with patternSize×patternSize.

That is, the line segment drawing section 1462 has characteristics in which a line segment drawing process is operated by performing a process of setting a pixel at the virtual coordinates (posX, posY) to 1 by moving the starting point (xS, yS) and the ending point (xE, yE) on a virtual block size wBlkSize. Further, the line segment drawing section 1462 derives the coordinates (posY>>resShift, posX>>resShift) by shifting the virtual coordinates to the right side by the virtual expansion shift value resShift when 1 is substituted to the pattern curPattern[ ][ ]. In this way, when the pattern is actually stored while performing the drawing process at the coordinate system expanded by the virtual expansion shift value resShift, it is possible to obtain the advantageous effect of preventing a memory size used for the line segment drawing process from increasing by shifting the coordinates to the right side by the virtual expansion shift value resShift and returning the coordinates to the original coordinates. That is, a memory with wBlkSize×wBlkSize is not necessary while using expanded coordinates and a memory with patternSize×patternSize may be used.

(Region Filling Section 1463)

The region filling section 1463 fills one region with 1 between two regions divided by a line segment in the pattern curPattern derived by the line segment drawing section 1462. The other region is filled with 0. In the following filling process, a region is filled such that a value of the pattern at the top left coordinates is normally set to 1. In another configuration of the wedgelet pattern generation section 145T4, a region may be filled such that a value of the pattern at the top left coordinates is normally set to 0.

The region filling section 1463 fills the region by setting a value of the pattern curPattern[ ][ ] to 1 through a process indicated by the following pseudo-code.

```
for (iY = 0; iY <= yE >> resShift; iY++) {
    for (iX = 0; iX <= curSize -1 && curPattern[iX][iY] == 0; iX++)
        curPattern[iX][iY] = 1
}
```

That is, the region filling section 1463 performs the following process on the vertical component iY at the coordinate yE>>resShift of the ending point from 0. In addition, yE>>resShift is a coordinate on the wedgelet pattern derived by shifting the coordinate yE of the ending point in the virtual block to the right side by the virtual expansion shift value resShift. In addition, curPattern is a wedge pattern wedgePattern[ ][ ] which is a processing target.

The region filling section 1463 sets 1 at a point at which a value curPattern[iX][iY] of the pattern is not 0 by curPattern[iX][iY]=1 while searching for a position at which the value curPattern[iX][iY] of the pattern is 0 in regard to the horizontal component iX of curSize-1 from 0.

Figure 21:
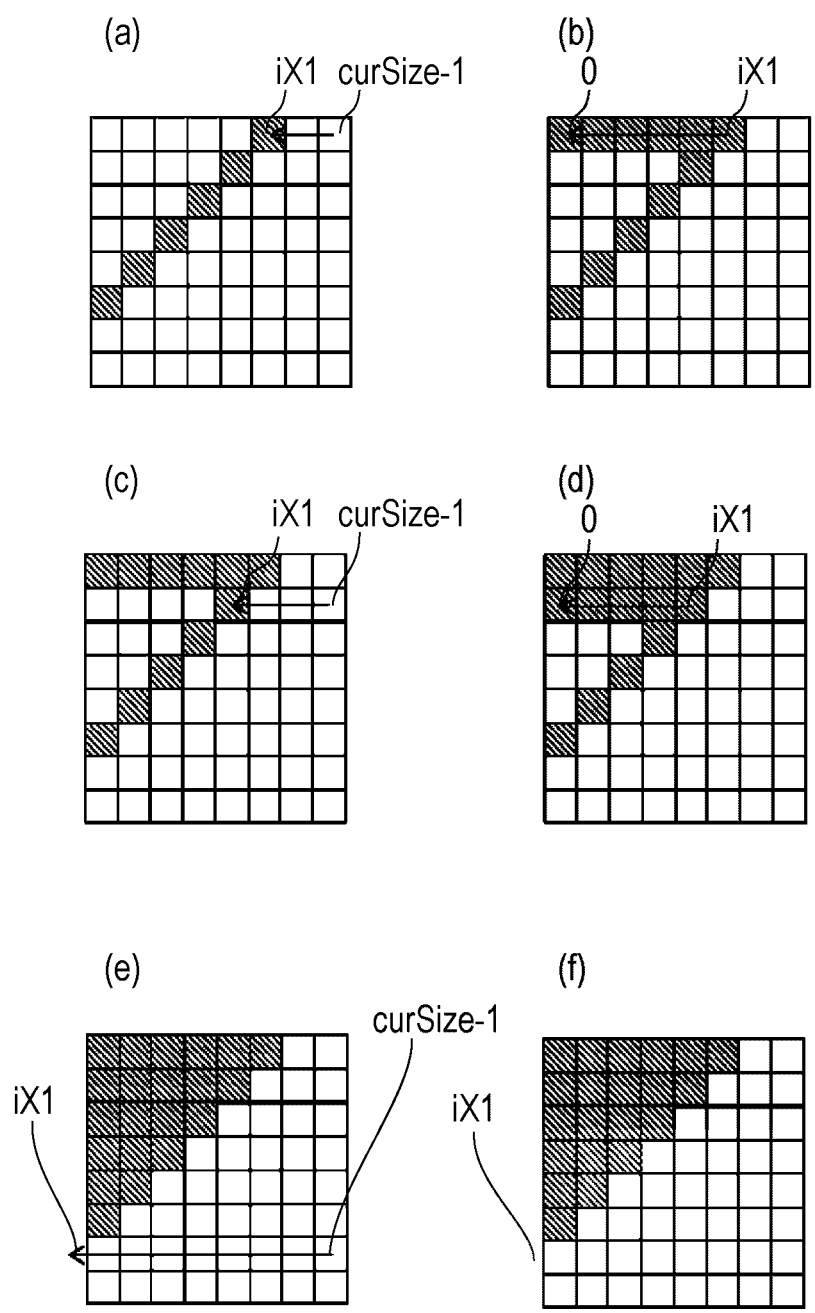
FIG. 21 is a diagram illustrating an operation of a region filling section 1463 according to the embodiment and illustrating a process in a first basic pattern.

The foregoing region filling section 1463 requires information regarding the ending point yE, but may perform another operation in which the information is not necessary. FIG. 21 is a diagram illustrating another operation of the region filling section 1463. Specifically, the region is filled by setting the value of the pattern curPattern[ ][ ] to 1 through a process indicated by the following pseudo-code.

```
    for (iY = 0; iY < curSize; iY++) {// loop B0
    // process B1
        for (iX = curSize --1; iX >= 0 || curPattern[iX][iY]
== 0; iX--) {
        }
    // process B2
        for (; iX >= 0; iX--) {
            curPattern[iX][iY] = 1
        }
    }
Here, curSize = patternSize.
```

The region filling section 1463 performs the following process on the vertical component iY of curSize−1 from 0 (loop B0). The region filling section 1463 searches for a position at which the value curPattern[iX][iY] of the pattern is 1 in regard to the horizontal component iX starting from curSize−1 (process B1). That is, the value of iX decreases one by one as long as the value curPattern[iX][iY] of the pattern is 0. In FIG. 21(*a*), a point iX1 is found.

Subsequently, when a point at which curPattern[iX][iY] is 1 is found, the region filling section 1463 sets 1 in the pattern as curPattern[iX][iY]=1 while decreasing the value of iX one by one until the value of iX becomes 0 (process B2). In FIG. 21(*b*), filling is performed with a value closer 0 than iX1. The region filling section 1463 performs a process B1 illustrated in FIG. 21(*c*) by repeating the same process in the loop of B0 and performs a process B2 illustrated in FIG. 21(*d*). When iX1 is not found between curSize−1 to 0 in the process B1 as in FIG. 21(*e*), iX=−1 is obtained in the process B1. In this case, in the process B2, the filling is not performed in this column as in FIG. 21(*f*) without performing the process. In the foregoing algorithm, it is possible to obtain the advantageous effect that the process is possible even when a pixel in which the pattern curPattern[iX][iY] is 1 is present or absent in each row in which the vertical component iY is a certain value. Specifically, when a pixel in which the pattern curPattern[iX][iY] is 1 in each row is present, all the left pixels of the pixel in which the pattern curPattern[iX][iY] is 1 are filled with 1. When a pixel in which the pattern curPattern[iX][iY] is 1 is absent, the process is not performed.

In the filling of the region, the region filling section 1463 performs, for example, a process of the following pseudocode so that the value of the pattern at the top left coordinates is normally 0.

```
    for (y = 0; y < curSize; y++)
    {
        for (x = curSize -1; x >= 0; x--)
        {
            if (curPattern [(y * curSize) + x])
                break;
            curPattern [(y * curSize) + x] = 1;
        }
        for (; x >= 0; x--)
        {
            curPattern [(y * curSize) + x] = 0;
        }
    }
```

(Rotation Pattern Generation Section 1465)

The rotation pattern generation section 1465 generates a rotation pattern of the basic pattern by reading the basic pattern stored in the wedge pattern table 145T one by one and rotating the basic pattern (equivalent to (b) of FIG. 16) (S0010 to S0013). Here, the wedgelet pattern of the wedge orientation wedgeOri=1 illustrated in FIG. 13(*b*) is generated. Specifically, a rotated pattern wedgePattern[ ][ ] is derived through the following process ROT using each WedgePatternTable[log 2BlkSize][pos] designated by pos from startPos (here, 0) to endPos in the wedge pattern table 145T as a reference pattern refPattern[ ][ ]

| (Process ROT) |
|---|
| cInc = wedgeOri == 2 ? −1 : 0;<br>sInc = (wedgeOri == 1 ? −1 : 1) * (1 + cInc)<br>iOffset = cInc + sInc < 0 ? patternSize − 1 ? 0<br>jOffset = −sInc + cInc + < 0 ? patternSize − 1 ? 0<br>for (y = 0; y < patternSize; y++)<br>    for (x = 0; x < patternSize; x++) {<br>        i = iOffset + cInc * x + sInc * y<br>        j = jOffset − sInc * x + cInc * y<br>        wedgePattern[x][y] = refPattern[i][j]     formula R1<br>    } |

In a case in which a target pattern wedgePattern[ ][ ] is generated from a reference pattern refPattern[ ][ ], the rotation pattern generation section 1465 converts coordinates (x, y) on a target pattern into coordinates (i, j) on a reference pattern to perform derivation by using a pixel refPattern[i][j] at the coordinates (i, j) on the reference pattern as a pixel wedgePattern[x][y] at the coordinates (x, y) on the target pattern as in formula R1.

wedgePattern[x][y]=refPattern[i][j] formula R1 In addition, i and j are values in the range of 0 to patternSize. Here, the coordinates (x, y) on the target pattern and the coordinates (i, j) on the reference pattern are assumed to be converted with a rotation matrix. That is, relations of x=(cos θ)i−(sin θ)j+offsetX and y=(sin θ)i−(cos θ)j+offsetY are satisfied. Here, offsetX and offsetY are offsets set so that it is satisfied that the coordinates (x, y) after the coordinate conversion are equal to or greater than 0 and equal to or less than patternSize−1. In the formula of the foregoing process ROT, cInc corresponds to cos θ, sInc corresponds to sin θ, and cInc2+sInc2=1 is satisfied.

In particular, any case of θ=90 degrees (PI/2 rad), 180 degrees (PI rad), and 270 degree (3 PI/2 rad) is used from a first rotation pattern to a third rotation pattern according to the embodiment. Here, PI is the circular constant and is 3.141592 . . . . Accordingly, the rotation pattern generation section 1465 performs a process in which 0 or −1 is set in cInc or one of 1, −1 (when cInc is 0), and 0 (when cInx is −1) is set in sInc through the process ROT.

In a case in which the target pattern wedgePattern[ ][ ] is generated from the reference pattern refPattern[ ][ ] as illustrated in the following process ROT', the rotation pattern generation section 1465 may perform coordinate conversion from the coordinates (i, j) on the reference pattern to the coordinates (x, y) on the target pattern and may use a pixel refPattern[i][j] at the coordinates (i, j) on the reference pattern as the pixel wedgePattern[x][y] at the coordinates (x, y) on the target pattern.

| (Process ROT') |
|---|
| xOffset = cInc − sInc < 0 ? patternSize − 1 ? 0<br>yOffset = sInc + cInc < 0 ? patternSize − 1 ? 0<br>for (j = 0; j < patternSize; j++)<br>    for (i = 0; i < patternSize; i++) {<br>        x = xOffset + cInc * i − sInc * j<br>        y = yOffset + sInc * i + cInc * j<br>        wedgePattern[x][y] = refPattern [i][j]<br>    } |

(Pattern Storage Section 1464)

In a case in which the wedgelet pattern matched (overlapped) to the wedgelet pattern generated by the basic pattern generation section 1461 and the rotation pattern generation section 1465 is not present in the wedge pattern table, the pattern storage section 1464, the wedgelet pattern is added to a wedge pattern table WedgePatternTable[log 2BlkSize][NumWedgePattern[log 2BlkSize]] with wBlksize×wBlksize. More specifically, a value of the generated wedgelet pattern wedgePattern[x][y] is set in a component corresponding to the wedge pattern table WedgePatternTable by the following formula.

WedgePatternTable[log 2BlkSize][NumWedgePattern [log 2BlkSize][x][y]=wedgePattern[x][y], with x=0 to wBlkSize−1 and y=0 to wBlkSize−1 The overlapped wedgelet pattern is the same partition pattern as the generated wedgelet pattern or the same partition pattern as the wedgelet pattern (for example, a partition pattern in which 0 is substituted with 1 and 1 is substituted with 0 in FIG. 11(b)) in which each component value of the generated wedgelet pattern is inverted. Here, wBlksize indicates a size of the width and height of a block generating a wedgelet pattern and an array NumWedgePattern[ ] indicates the number of wedgelet patterns (the number of wedge patterns) added to the wedge pattern table according to the block size in which the logarithmic value (log 2BlkSize) with the block size is an argument. Whenever a wedgelet pattern is added to the wedge pattern table, 1 is added to the number of wedge patterns NumWedgePattern[log 2BlkSize]. An initial value of NumWedgePattern is 0. The number of wedgelet patterns with the size log 2BlkSize stored in the wedge pattern table 145T5 is assumed to be NumWedgePattern[log 2BlkSize].

Figure 18:
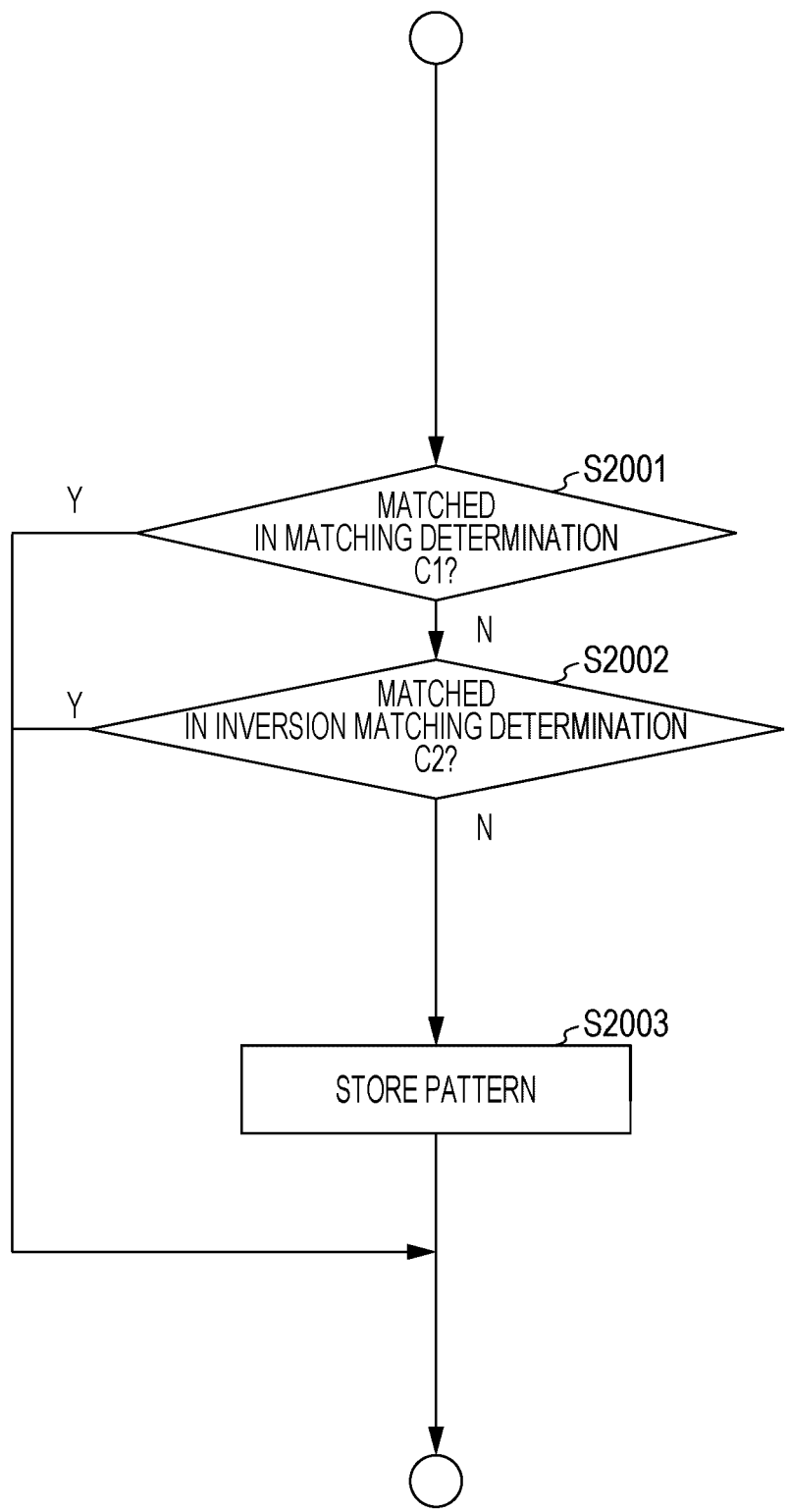
FIG. 18 is a flowchart illustrating an operation of a pattern storage section 1464.

FIG. 18 is a flowchart illustrating an operation of the pattern storage section 1464.

(S2001) The pattern storage section 1464 performs matching determination C1 and ends the process without storage in a case in which it is determined that the wedgelet pattern is matched. In a case in which it is determined that the wedgelet pattern is not matched, the process transitions to S2002. The pattern storage section 1464 compares the pattern WedgePatternTable[log 2BlkSize][k][x][y] stored in the wedge pattern table 145T5 of an index k (0 to NumWedgePattern[log 2BlkSize]−1) to a target pattern wedgePattern[x][y]. When any one pattern is not matched, a matching flag is set to 0 (a matching determination process C1).

```
// matching determination process C1
for k = 0 to NumWedgePattern[log2BlkSize] − 1
    patIdenticalFlag = 1
    for x, y = 0 to (1 << log2BlkSize) − 1,
        if (wedgePattern[x][y] !=
WedgePatternTable[log2BlkSize][k][x][y])
            patIdenticalFlag = 0
```

(S2002) The pattern storage section 1464 performs inversion matching determination C2 and ends the process without storing the pattern in a case in which the wedgelet pattern is matched. In other cases, the process transitions to S2003. The pattern storage section 1464 compares the pattern WedgePatternTable[log 2BlkSize][k][x][y] stored in the wedge pattern table 145T5 of the index k (0 to NumWedgePattern[log 2BlkSize]−1) to a target pattern wedgePattern[x][y]. When any one pattern is the same (when any one inverted pattern is different), a matching flag is set to 0 (an inversion matching determination process C2).

```
// inversion matching determination process C2
for k = 0 to NumWedgePattern[log2BlkSize] − 1
    patIdenticalFlag = 1
    for x, y = 0 to (1 << log2BlkSize) − 1,
        if (wedgePattern[x][y] ==
WedgePatternTable[log2BlkSize][k][x][y])
            patIdenticalFlag = 0
```

(S2003) The pattern storage section 1464 stores the generated wedgelet pattern in the wedge pattern table 145T5. A case in which the wedgelet pattern is stored is only a case in which it is determined that the wedgelet pattern is not matched in the matching determination C1 and the inversion matching determination C2 and patIdenticalFlag is 0. When the wedgelet pattern is stored, the number of wedge patterns NumWedgePattern[log 2BlkSize] increases by 1.

(Operation Procedure of Wedgelet Pattern Generation Section 145T4)

Figure 15:
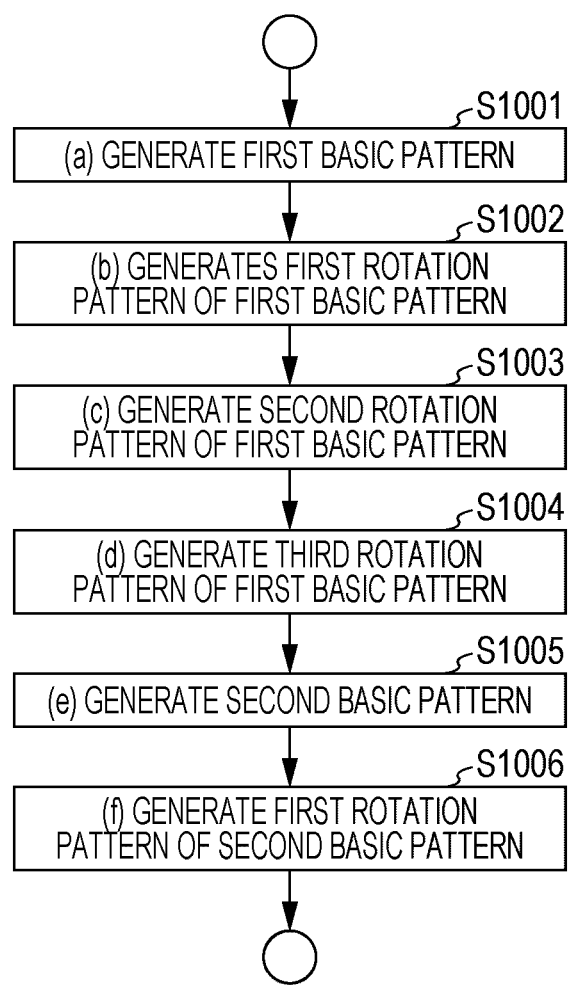
FIG. 15 is a flowchart illustrating a wedgelet pattern generation process in the wedgelet pattern generation section 145T4.

FIG. 15 is a flowchart illustrating a process mainly performed to generate each basic pattern and generate each rotation pattern in a wedgelet pattern generation process in the wedgelet pattern generation section 145T4. Hereinafter, a detailed operation of the wedgelet pattern generation section 145T4 will be described with reference to FIG. 15. FIG. 19 is a table illustrating parameters used to generate the basic patterns and generate the rotation patterns. By using the parameters, each pattern can be generated through a common process. Each basic pattern may be generated and each rotation pattern may be generated using an individual process (a program or a circuit) obtained by developing a generation parameter in the drawing without using the common process (a program or a circuit).

(S1001) Generating First Basic Pattern

The wedgelet pattern generation section 145T4 generates the first basic pattern in the basic pattern generation section 1461 (equivalent to (b) of FIG. 16). Here, the first basic pattern generation is the wedgelet pattern of the wedge orientation wedgeOri=0 illustrated in FIG. 13(a), but may be any one wedgelet pattern of the wedgelet patterns of the wedge orientations wedgeOri=0 to 3. The basic pattern is generated by setting a starting point and an ending point, drawing a line segment, and filling a region.

The basic pattern generation section 1461 sets the starting point (xS, yS) and the ending point (xE, yE). Specifically, in a first loop variable m (where m=0 to wBlkSize−1) and a second loop variable n (where n=0 to wBlkSize−1), xS, yS, xE, yE are set by the following formulae.

$xS=m$ $yS=0$ $xE=$(wedgeOri==0)?0:$n$ $yE=$(wedgeOri==0)?$n$:wBlkSize−1

Since wedgeOri==0, the following setting is performed.

$xS=m$ $yS=0$ $xE=0$ $yE=n$

Here, as described in FIG. 13(a), the starting point is a point on the line segment S of the top side of the block and the ending point is a point on the line segment E of the left side of the block.

The starting and ending points may be set as follows using xPosS, yPosS, xPosE, and yPosE as initial values and using xIncS, yIncS, xIncE, and yIncE as increments.

$$xS=(xPosS+m*xIncS)$$

$$yS=(yPosS+m*yIncS)$$

$$xE=(xPosE+n*xIncE)$$

$$yE=(yPosE+n*yIncE)$$

In a case in which the wedge orientation wedgeOri=0 is set as a basic pattern, the values illustrated in (a) of FIG. 19, xPosS=0, yPosS=0, xPosE=0, yPosE=0, xIncS=1, yIncS=0, xIncE=0, and yIncE=1, are set. Thus, the foregoing values are set.

The region filling section 1463 searches for a pixel in which the pattern is 1 and sets 1 in continuous pixels when there are the pixels in which the pattern is 1.

The second loop variable n may start from 1 (where n=1 to wBlkSize−1). Thus, it is possible to prevent a redundant pattern from being generated.

The region is filled using the common process between the first and second basic patterns. In the line segment drawing section 1462 according to the embodiment, it is possible to obtain the advantageous effect that one region filling process can be commonly used without using the region filling process different from each wedgelet pattern to be derived.

The pattern storage section 1464 stores the pattern filled by the region filling section 1463 in the wedge pattern table 145T. In the derivation of the basic pattern, the number of tables NumWedgePattern[log 2BlkSize] stored in the wedge pattern table 145T before the derivation of the basic pattern is set in the variable startPos and the number of tables NumWedgePattern[log 2BlkSize]−1 stored in the wedge pattern table 145T after the derivation of the basic pattern is set the variable endPos. Here, the variable startPos becomes 0 and the variable endPos becomes the number of the wedge pattern table 145T after the derivation of the first basic pattern.

(S1002) Generating First Rotation Pattern of First Basic Pattern

The rotation pattern generation section 1465 generates a rotation pattern of the basic pattern by reading the basic pattern stored in the wedge pattern table 145T one by one and rotating the basic pattern (equivalent to (b) of FIG. 16). Here, the wedgelet pattern of the wedge orientation wedgeOri=1 illustrated in FIG. 13(*b*) is generated. Specifically, a rotated pattern wedgePattern[ ][ ] is derived through the following process ROT90 obtained by substituting cInc=0 and sInc=−1 to the process ROT using each WedgePatternTable[log 2BlkSize][pos] designated by pos from startPos (here, 0) to endPos (here, the number of wedge tables−1 after derivation of the first basic pattern) in the wedge pattern table 145T as a reference pattern refPattern[ ][ ].

```
                  (Process ROT90)
      cInc = 0
      sInc = −1
      iOffset = patternSize − 1
      jOffset = 0
      for (y = 0; y < patternSize; y++)
          for (x = 0; x < patternSize; x++) {
              i = iOffset + cInc * x + sInc * y = patternSize −
1 − y
              j = jOffset − sInc * x + cInc * y = 0
              wedgePattern[x][y] = refPattern[i][j]
          }
```

The rotation pattern generation section 1465 according to the embodiment generates the target wedgelet pattern wedgePattern[x][y] from the input reference wedgelet pattern refPattern[i][j] and uses a value refPattern[i][j] at the coordinates (i, j) of the reference wedgelet pattern as a value wedgePattern[x][y] of the target wedgelet pattern at the coordinates (x, y) obtained by converting the coordinates (i, j) on the reference wedgelet pattern with rotation matrix. Since the line segment drawing process and the region filling process in which a processing amount is large are substituted with a rotation process in which the processing amount is small, the advantageous effect of reducing the processes is obtained.

The rotation pattern generation section 1465 derives the wedgelet pattern wedgePattern[ ][ ] which is rotation pattern using the wedgelet pattern between the starting and ending points set by the basic pattern setting section 1461 as an input refPattern[ ][ ].

The coordinates (x, y) on the target pattern may be converted into the coordinates (i, j) on the reference pattern without converting the coordinates (i, j) into the coordinates (x, y) on the target pattern, and a pixel refPattern[i][j] at the coordinates (i, j) on the reference pattern may be substituted as a pixel wedgePattern[x][y] at the coordinates (x, y) on the target pattern. Even in this case, (i, j) and (x, y) are assumed to be converted with a rotation matrix. That is, a relation of i=(cos θ)x+(sin θ)y and j=−(sin θ)x+(cos θ)y is satisfied.

In a generation example of the first rotation pattern of the first basic pattern, the following code may be set.

```
      for (y = 0; y < patternSize; y++)
          for (x = 0; x < patternSize; x++) {
              i = 0 * x + 1 * y
              j = −1 * x + 0 * y
              wedgePattern[x][y] = refPattern [i][j]
          }
```

The generated pattern wedgePattern[ ][ ] is stored in the pattern storage section 1464.

(S1003) Generating Second Rotation Pattern of First Basic Pattern

The rotation pattern generation section 1465 generates a rotation pattern of the basic pattern by reading the basic pattern stored in the wedge pattern table 145T one by one and rotating the basic pattern (equivalent to (c) of FIG. 16). Here, the wedgelet pattern of the wedge orientation wedgeOri=2 illustrated in FIG. 13(*c*) is generated. Specifically, a rotated pattern wedgePattern[ ][ ] is derived through the following process ROT180 obtained by substituting cInc=−1 and sInc=0 to the process ROT using each WedgePatternTable[log 2BlkSize][pos] designated by pos from startPos (here, 0) to endPos in the wedge pattern table 145T as a reference pattern refPattern[ ][ ].

```
                  (Process ROT180)
      cInc = −1
      sInc = 0
      iOffset = patternSize − 1
      jOffset = patternSize − 1
      for (y = 0; y < patternSize; y++)
          for (x = 0; x < patternSize; x++) {
              i = iOffset + cInc * x + sInc * y = patternSize −
1 − x
              j = jOffset − sInc * x + cInc * y = patternSize −
1 − y
              wedgePattern[x][y] = refPattern[i][j]
          }
```

The generated pattern wedgePattern[ ][ ] is stored in the pattern storage section 1464.

(S1004) Generating Third Rotation Pattern of First Basic Pattern

The rotation pattern generation section 1465 generates a rotation pattern of the basic pattern by reading the basic pattern stored in the wedge pattern table 145T one by one and rotating the basic pattern (equivalent to (d) of FIG. 16). Here, the wedgelet pattern of the wedge orientation wedgeOri=3 illustrated in FIG. 13(d) is generated. Specifically, a rotated pattern wedgePattern[ ][ ] is derived through the following process R270 obtained by substituting cInc=0 and sInc=−1 to the process ROT using each WedgePatternTable [log 2BlkSize][pos] designated by pos from startPos (here, 0) to endPos in the wedge pattern table 145T as a reference pattern refPattern[ ][ ].

---

(Process ROT270)

```
cInc = 0
sInc = −1
iOffset = 0
jOffset = patternSize − 1
for (y = 0; y < patternSize; y++)
    for (x = 0; x < patternSize; x++) {
        i = iOffset + cInc * x + sInc * y = y
        j = jOffset − sInc * x + cInc * y = patternSize − 1 − x
        wedgePattern[x][y] = refPattern[i][j]
    }
```

---

The generated pattern wedgePattern[ ][ ] is stored in the pattern storage section 1464.

(S1005) Generating Second Basic Pattern

The wedgelet pattern generation section 145T4 generates the second basic pattern in the basic pattern generation section 1461 (equivalent to (a) of FIG. 16).

The basic pattern generation section 1461 sets the starting point (xS, yS) and the ending point (xE, yE). Specifically, in the first loop variable m (where m=0 to wBlkSize−1) and the second loop variable n (where n=0 to wBlkSize−1), xS, yS, xE, yE are set by the following formulae.

$xS=m$ $yS=0$ $xE=(\text{wedgeOri}==0)?0:n$ $yE=(\text{wedgeOri}==0)?n:wBlkSize-1$ That is, the following setting is performed.

$xS=m*1$ $yS=0$ $xE=n$ $yE=wBlkSize-1$

The following derivation may be performed setting xPosS, yPosS, xPosE, and yPosE as initial values, using xIncS, yIncS, xIncE, and yIncE as increments, and using xPosS=0, yPosS=0, xPosE=0, yPosE=wBlkSize−1, xIncS=1, yIncS=0, xIncE=1, and yIncE=0 which are values illustrated in (e) of FIG. 19.

$xS=(xPosS+m*xIncS)$ $yS=(yPosS+m*yIncS)$ $xE=(xPosE+n*xIncE)$ $yE=(yPosE+n*yIncE)$

The second basic pattern is a pattern in which movement directions of the starting and ending points are parallel to each other. That is, the second basic pattern indicates a pattern in which the movement direction of the ending point is also a horizontal direction (xIncE=1, yIncE=0) in a case in which the movement direction of the starting point is a horizontal direction (xIncS=1, yIncS=0). A component in a direction vertical to the movement direction, here, the vertical direction, is a fixed value. When the movement directions are parallel to each other, the directions may be inverted as in (xIncS=1, yIncS=0) and (xIncE=−1, yIncE=0).

The second basic pattern described here is the pattern of the wedge orientation wedgeOri=4. As described in FIG. 13(e), the starting point is a point on the line segment S of the top side of the block and the ending point is a point on the line segment E of the bottom side of the block.

The second basic pattern can be set to the pattern of the wedge orientation wedgeOri=5. As described in FIG. 13(f), the starting point is a point on the line segment S of the left side of the block and the ending point is a point on the line segment E of the right side of the block. In a case in which the second basic pattern is set to the pattern of the wedge orientation wedgeOri=5, xPosS=0, yPosS=0, xPosE=patternSize−1, yPosE=0, xIncS=0, yIncS=1, xIncE=0, and yIncE=1 are set. That is, the following setting is performed.

$xS=0$ $yS=m*1$ $xE=\text{patternSize}-1$ $yE=n*1$

Even in this case, the second basic pattern is a pattern in which movement directions of the starting and ending points are parallel to each other. That is, the second basic pattern indicates a pattern in which the movement direction of the ending point is also a vertical direction (xIncE=0, yIncE=1) in a case in which the movement direction of the starting point is a vertical direction (xIncS=0, yIncS=1). A component in a direction vertical to the movement direction, here, the horizontal direction, is a fixed value. When the movement directions are parallel to each other, the directions may be inverted as in (xIncS=0, yIncS=1) and (xIncE=0, yIncE=−1).

The region filling section 1463 fills one region between two regions divided by a line segment derived by the line segment drawing section 1462 with 1. The other region remains as 0. Specifically, the filling is performed through a process indicated by the following pseudo-code.

The generated pattern wedgePattern[ ][ ] is stored in the pattern storage section 1464. In the derivation of the basic pattern, the number of tables NumWedgePattern[log 2BlkSize] stored in the wedge pattern table 145T before the derivation of the basic pattern is set in the variable startPos and the number of tables NumWedgePattern[log 2BlkSize]−1 stored in the wedge pattern table 145T after the derivation of the basic pattern is set the variable endPos.

(S1006) Generating First Rotation Pattern of Second Basic Pattern

The rotation pattern generation section 1465 generates a rotation pattern of the second basic pattern by reading the second basic pattern stored in the wedge pattern table 145T one by one and rotating the second basic pattern. Here, the wedgelet pattern of the wedge orientation wedgeOri=5 illustrated in FIG. 13(*f*) is generated. Specifically, a rotated pattern wedgePattern[ ] is derived using each WedgePatternTable[log 2BlkSize][pos] designated by pos from startPos to endPos in the wedge pattern table 145T as a reference pattern refPattern[ ][ ].

```
cInc = 0
sInc = 1
iOffset = 0
jOffset = patternSize − 1
for (y = 0; y < patternSize; y++)
    for (x = 0; x < patternSize; x++) {
        i = iOffset + cInc * x + sInc * y = y
        j = jOffset − sInc * x + cInc * y = patternSize −
1 − x
            wedgePattern[x][y] = refPattern[i][j]
    }
```

The generated pattern wedgePattern[ ][ ] is stored in the pattern storage section 1464.
(Embodiment of Wedgelet Pattern Generation Section 145T4)

Figure 22:
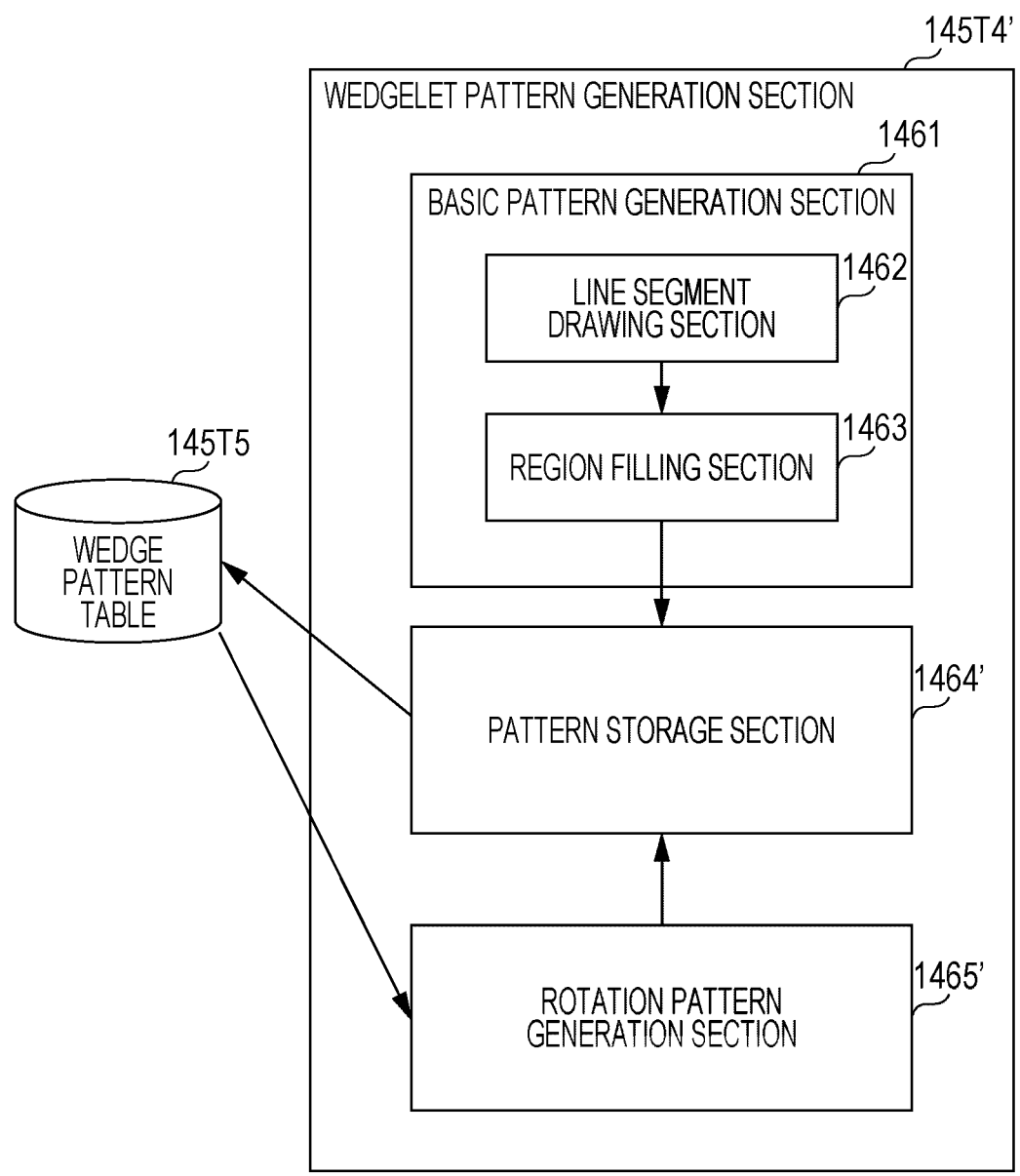
FIG. 22 is a diagram illustrating the configuration of a wedgelet pattern generation section 145T4'.

Hereinafter, a wedgelet pattern generation section 145T4' which is a modification example of the wedgelet pattern generation section 145T4 will be described. FIG. 22 is a diagram illustrating the configuration of the wedgelet pattern generation section 145T4'. The wedgelet pattern generation section 145T4' is configured to include the basic pattern generation section 1461, a pattern storage section 1464', and a rotation pattern generation section 1565'.
(Rotation Pattern Generation Section 1465')

The rotation pattern generation section 1465' performs inversion in some cases when a target pattern is set based on the reference pattern refPattern. Specifically, the rotation pattern generation section 1465' performs a process of a pseudo-code indicated in the following process ROT.

```
              (Process ROT)
cInc = wedgeOri == 2 ? −1 : 0;
sInc = (wedgeOri == 1 ? −1 : 1) * (1 + cInc);
iOffset = cInc + sInc < 0 ? patternSize − 1 ? 0
jOffset = −sInc + cInc + < 0 ? patternSize − 1 ? 0
for (y = 0; y < patternSize; y++) {
    for (x = 0; x < patternSize; x++) {
        i = iOffset + cInc * x + sInc * y
        j = jOffset − sInc * x + cInc * y
        wedgePattern[x][y] = refPattern[iOffset][jOffset] ?
refPattern[i][j] : 1− refPattern[i][j]       formula R2
    }
}
```

Formula R2 is a formula in a case in which inversion is performed according to a condition in addition to rotation so that the value of the wedgelet pattern at the top left coordinates (0, 0) of the target pattern is 1.

FIG. 24 is a diagram illustrating an operation of the rotation pattern generation section 1465' according to the embodiment. The region filling section 1463 generates a wedgelet pattern in which the value of the wedgelet pattern at the top left coordinates is 1. The rotation pattern generation section 1465' performing a process of formula R2 sets refPattern[i][j] as a target pattern wedgePattern[x][y] without inversion after the rotation process in a case in which the value of the wedgelet pattern at the top left coordinates after the rotation is 1, as illustrated in FIG. 24(*a*), and performs the inversion after the rotation process and sets 1−refPattern[i][j] (=! refPattern[i][j]) as the target pattern wedgePattern[x][y] in a case in which the value of the wedgelet pattern at the top left coordinates after the rotation is 0, as illustrated in FIG. 24(*b*). Here, the inversion refers to a manipulation of swapping 1 and 0.

Here, a value refPattern[i0][j0] of the reference pattern at the coordinates (i0, j0) on a certain reference pattern is referred as a value of the top left coordinates (0,0) of the rotated target pattern. The rotation pattern generation section 1465' sets refPattern[i][j] without inversion in a case in which the value refPattern[i0][j0] of the reference pattern at the top left coordinates after the rotation is 1, and performs the inversion and sets 1−refPattern[i][j] in a case in which the value refPattern [i0][j0] of the reference pattern is 0.

The coordinates (x, y) after the rotation is (0,0) and the coordinates (i0, j0) before the rotation is obtained as follows.

$$i0 = i\text{Offset} + c\text{Inc}*0 + s\text{Inc}*0 = i\text{Offset}$$

$$j0 = j\text{Offset} - s\text{Inc}*0 + c\text{Inc}*0 = j\text{Offset}$$

In sum, (i0, j0)=(iOffset, jOffset) and a value of the reference pattern mapped to the top left coordinates after the rotation is refPattern[iOffset][jOffset]. Accordingly, a rotation pattern in which the value of the pattern at the top left coordinates is normally 1 can be derived by setting refPattern[i][j] as the value of the rotation pattern without inverting the reference pattern refPattern[i][j] in a case in which refPattern[iOffset][jOffset] is 1 and by inverting the reference pattern refPattern[i][j] and setting 1−refPattern[i][j] as the value of the rotation pattern in a case in which refPattern [iOffset][jOffset] is 0.

In this way, in a case in which the region filling section 1463 included in the wedgelet pattern generation section 145T4' generates the wedgelet pattern in which the top left of the wedgelet pattern is normally 1, it is possible to obtain the advantageous effect that the rotation pattern generation section 1465' included in the wedgelet pattern generation section 145T4' can easily generate a pattern in which the top left of the wedgelet pattern is normally 1 (or normally 0).

Figure 23:
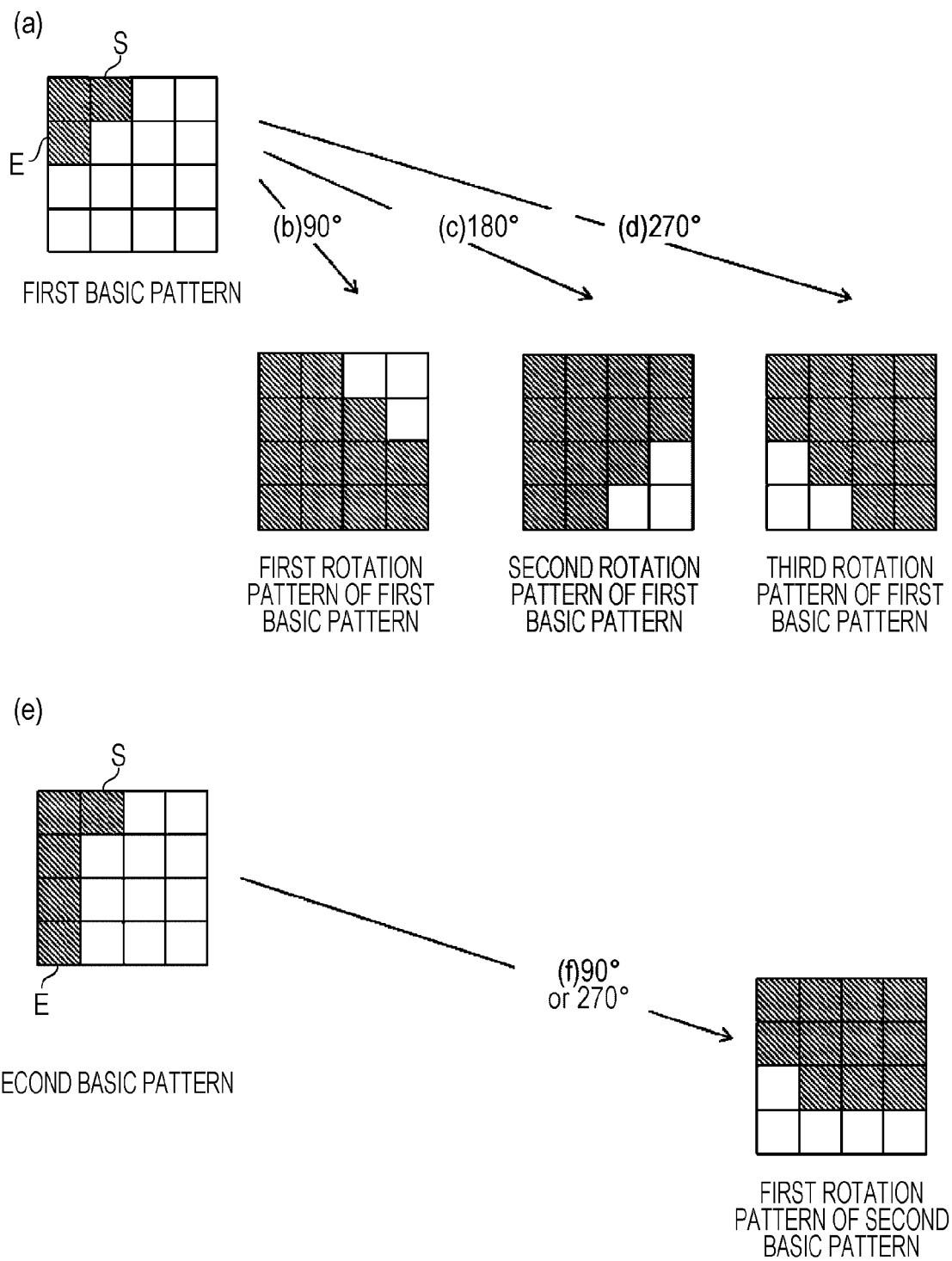
FIG. 23 is a diagram illustrating a wedgelet pattern generation process in the wedgelet pattern generation section 145T4.

FIG. 23 is a diagram illustrating a wedgelet pattern generation process in the wedgelet pattern generation section 145T4'. In FIG. 16, the pixel value at the top left coordinates of the wedgelet pattern is inverted before rotation and after rotation. In FIG. 23, however, the pixel value at the top left coordinates of the wedgelet pattern is not inverted. In FIG. 23, a change in the value of the wedgelet pattern at the top left coordinates can be eliminated by performing inversion according to a condition when the rotation pattern is generated as in formula R2. In a case in the value of the wedgelet pattern at the top left coordinates is fixed, a pattern in which 1 and 0 of the wedgelet pattern are inverted is not generated by the basic pattern generation section 1461 and the rotation pattern generation section 1565'. Therefore, a matching determination process in the pattern storage section 1464' can be simpler than that of the wedgelet pattern generation section 145T4.

FIG. 25 is a diagram illustrating an operation of the wedgelet pattern generation section 145T4' according to another embodiment of the embodiment. The wedgelet pattern generation section 145T4' includes a region filling section 1463' and a rotation pattern generation section 1465" instead of the region filling section 1463 and the rotation pattern generation section 1465. The region filling section 1463' fills the region so that the value of the pattern at the top left coordinates is normally 0. The rotation pattern generation section 1465" uses the following formula R2' instead formula R2.

wedgePattern[x][y]=refPattern[iOffset]
[jOffset]==0?refPattern[i][j]:1−refPattern[i][j]     formula R2' refPattern[iOffset][jOffset]==0 can also be processed even in ! refPattern[iOffset][jOffset] using the logic NOT !.

In a case in which the top left of the wedgelet pattern is normally 0 in the region filling section 1463 included in the wedgelet pattern generation section 145T4', it is possible to obtain the advantageous effect that the rotation pattern generation section 1465" with the foregoing configuration does not change the value of the pattern at the top left coordinates of the wedgelet pattern between before rotation and after rotation.

Figure 26:
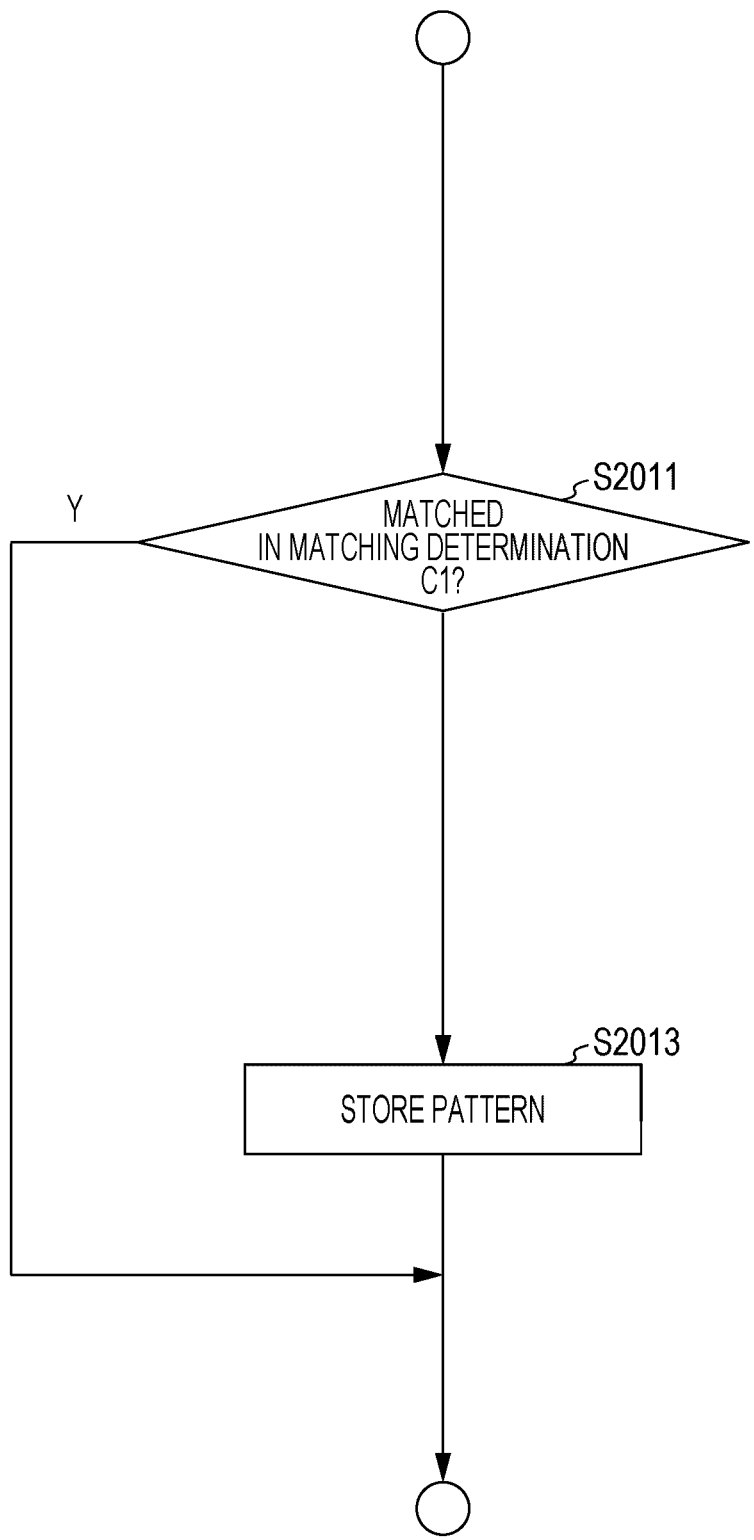
FIG. 26 is a flowchart illustrating an operation of a pattern storage section 1464' included in the wedgelet pattern generation section 145T4'.

FIG. 26 is a flowchart illustrating an operation of a pattern storage section 1464' included in the wedgelet pattern generation section 145T4'.

(S2011) In a case in which it is determined that the wedgelet pattern is matched in the matching determination C1, the pattern storage section 1464' ends the process without storage. In a case in which it is determined that the wedgelet pattern is not matched, the process transitions to S2013. The pattern storage section 1464 compares the pattern WedgePatternTable[log 2BlkSize][k][x][y] stored in the wedge pattern table 145T5 of an index k (0 to NumWedgePattern[log 2BlkSize]−1) to a target pattern wedgePattern[x][y]. When any one pattern is not matched, a matching flag is set to 0 (a matching determination process C1).

```
// matching determination process C1
for k = 0 to NumWedgePattern[log2BlkSize] − 1
    patIdenticalFlag = 1
    for x, y = 0 to (1 << log2BlkSize) − 1,
        if (wedgePattern[x][y] !=
WedgePatternTable[log2BlkSize][k][x][y])
            patIdenticalFlag = 0
```

(S2013) The pattern storage section 1464' stores the generated wedgelet pattern in the wedge pattern table 145T5 in a case in which the wedgelet pattern is not matched in the matching determination C1, that is, only in a case in which patIdenticalFlag is 0. When the wedgelet pattern is stored, the number of wedge patterns NumWedgePattern[log 2BlkSize] increases by 1.

In the wedgelet pattern generation section 145T4', the region filling section 1463 and the rotation pattern generation section 1465' (or the rotation pattern generation section 1465") generate the wedgelet pattern according to a rule that the top left pixel of the wedgelet pattern is normally 1 (or 0). Therefore, it is not necessary to perform the inversion matching determination C2 in the pattern storage section 1464'. Therefore, since only the matching determination C1 may be performed in the wedgelet pattern generation section 145T4', it is possible to obtain the advantageous effect of reducing a process of matching whether the wedgelet pattern stored in the wedge pattern table 145T5 is already matched with the generated pattern.

(Another Configuration of Rotation Pattern Generation Section 1465')

In the wedgelet pattern generation section 145T4', the rotation pattern generation section 1465' may use the following formula R3 simpler than formula R2 and formula R2'.

```
(Process ROT)

cInc = wedgeOri == 2 ? −1 : 0;
sInc = (wedgeOri == 1 ? −1 : 1) * (1 + cInc)
iOffset = cInc + sInc < 0 ? patternSize − 1 ? 0
jOffset = −sInc + cInc + < 0 ? patternSize − 1 ? 0
for (y = 0; y < patternSize; y++) {
    for (x = 0; x < patternSize; x++) {
        i = iOffset + cInc * x + sInc * y
        j = jOffset − sInc * x + cInc * y
        wedgePattern[x][y] = 1 − refPattern[i][j]     formula R3
    }
}
```

The rotation pattern generation section 1465' using formula R3 does not ensure that the top left pixel of the wedgelet pattern derived as a rotation pattern is normally 1 (or 0). However, in a case in which the wedgelet pattern is generated so that the top left pixel of the reference pattern is normally 1 (or 0), the top left pixel of the wedgelet pattern is 1 (or 0) in many cases. Thus, it is not necessary to perform the inversion matching determination C2 in the pattern storage section 1464'. Therefore, since only the matching determination C1 may be performed in the wedgelet pattern generation section 145T4', it is possible to obtain the advantageous effect of reducing a process of matching whether the wedgelet pattern stored in the wedge pattern table 145T5 is already matched with the generated pattern. Also, no problem occurs even when some of the inverted and matched patterns are stored in the wedge pattern table 145T5.

(Wedgelet Pattern Generation Section 145T4")

The wedge patterns (the wedgelet patterns) of the rotation patterns generated from the rotation pattern generation sections 1465 and 1465' are already generated in many cases, and are not matched with the wedge patterns (the wedgelet patterns) already generated and stored in the wedge pattern table 145T5. Therefore, it is suitable to simplify the operation of the pattern storage section so that the matching determination is omitted in the rotation pattern. Hereinafter, the wedgelet pattern generation section 145T4" including the pattern storage section 1464" with such a configuration will be described.

The wedgelet pattern generation section 145T4" has the same configuration as the wedgelet pattern generation section 145T4 and the wedgelet pattern generation section 145T4', but the pattern storage section 1464" is used instead of the pattern storage section 1464 and the pattern storage section 1464'.

Figure 27:
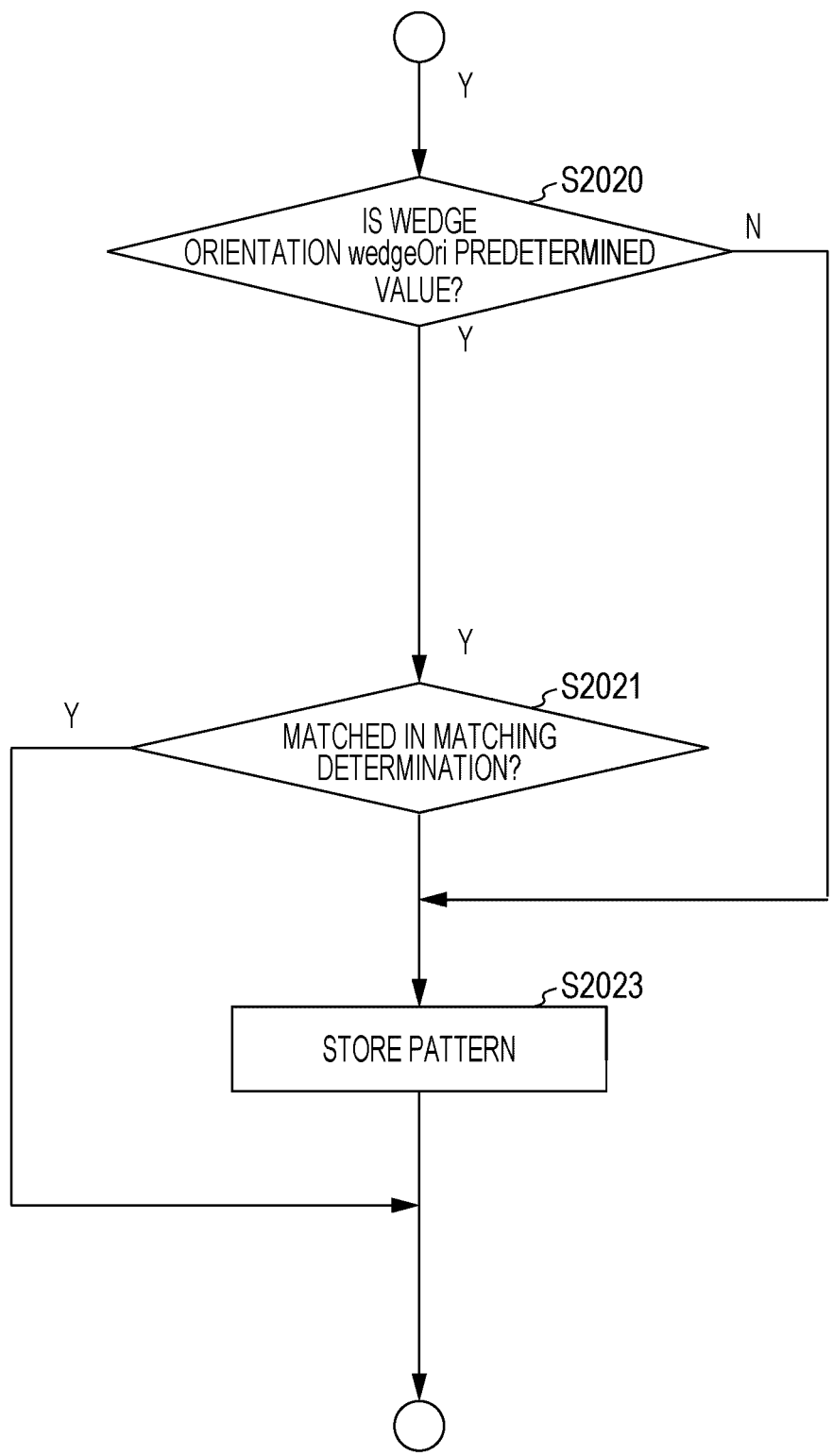
FIG. 27 is a flowchart illustrating an operation of a pattern storage section 1464" included in the wedgelet pattern generation section 145T4".

FIG. 27 is a flowchart illustrating an operation of a pattern storage section 1464" included in the wedgelet pattern generation section 145T4".

(S2020) In a case in which the wedge orientation wedgeOri is a predetermined value, here, the wedgeOri=0 or 4 indicating the basic pattern (the first basic pattern or the second basic pattern), the pattern storage section 1464" allows the process to transition to S2021 and stores the wedgelet pattern in the wedge pattern table 145T5 according to a condition. In other cases (here, wedgeOri=1, 2, 3, and 5 indicating the rotation patterns), the process transitions to S2023 and the wedgelet pattern is stored in the wedge pattern table 145T5 irrespective of the condition.

(S2021) The pattern storage section 1464" allows the process to transition to S2025 without storing the wedgelet pattern in a case in which the wedgelet pattern is already matched with the wedgelet pattern stored in the wedge pattern table 145T5. In a case in which the wedgelet pattern is not matched, the process transitions to S2023. In the matching determination, the matching determination C1 and the inversion matching determination C2 described above can be used. In a case in which the rotation pattern generation section 1465' generates the wedgelet pattern using formula R2 or R2' for the inversion according to the condition at the time of reference or formula R3 for normal inversion at the time of reference so that the top left pixel of the wedgelet pattern is 1 (or 0), it is suitable for the pattern storage section 1464" to perform only the matching determination C1 without performing the inversion matching determination C2 as in the pattern storage section 1464'.

(S2023) The pattern storage section 1464" stores the generated wedgelet pattern in the wedge pattern table 145T5. A case in which the wedgelet pattern is stored is a case of the basic pattern, a case in which the wedgelet pattern is not already matched with the wedgelet pattern stored in the wedge pattern table 145T5, or a case of the rotation pattern. When the wedgelet pattern is stored, the number of wedge patterns NumWedgePattern[log 2BlkSize] increases by 1.

In the wedgelet pattern generation section 145T4" including the pattern storage section 1464" with the foregoing configuration, it is possible to obtain the advantageous effect in which a processing amount used for the matching determination is small since the matching determination is performed only with pattern between the patterns matched with the basic pattern further in the wedge orientation wedgeOri.
(Example in which Second Basic Pattern is Derived Earlier)

Figure 28:
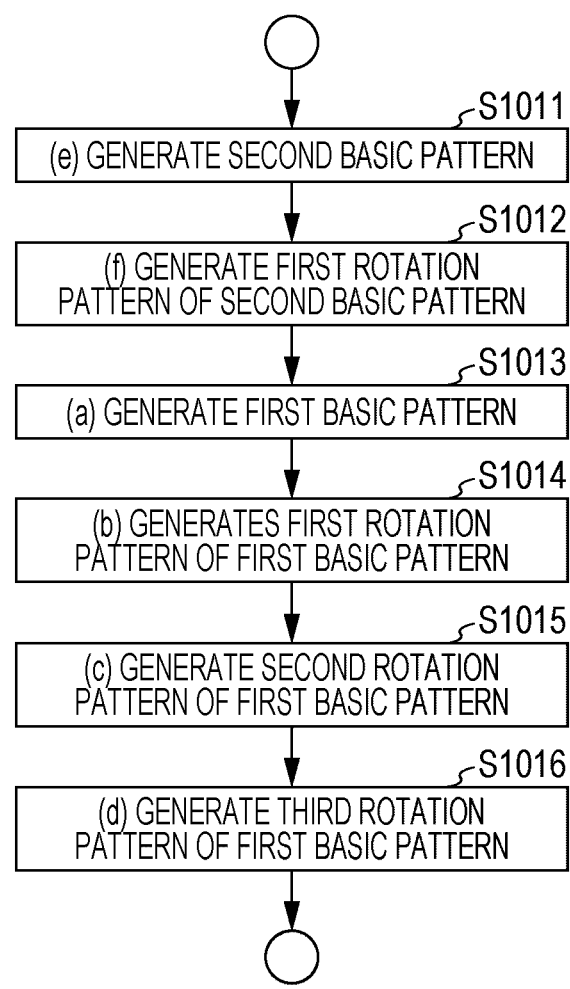
FIG. 28 is another example of a flowchart illustrating the wedgelet pattern generation process in the wedgelet pattern generation section 145T4 according to the embodiment and illustrating a case in which a first basic pattern is generated after a second basic pattern.

In the wedgelet pattern generation section 145T4, the wedgelet pattern generation section 145T4', and the wedgelet pattern generation section 145T4" described above, after the first basic pattern generated from the starting and ending points that have the relation in which the sides on which the starting and ending points are located are orthogonal to each other, the second basic pattern generated from the starting and ending points that have the relation in which the sides on which the starting and ending points are located are parallel to each other. However, the second basic pattern may be generated before the first basic pattern. FIG. 28 is another example of a flowchart illustrating the wedgelet pattern generation process in the wedgelet pattern generation section 145T4. The second basic pattern may be generated before the first basic pattern.

(S1011) Generating Second Basic Pattern

The second basic pattern is generated through the same operation as S1005 described above with reference to (e) of FIG. 16 and (e) of FIG. 23.

(S1012) Generating Second Basic Pattern and First Rotation Pattern

The first rotation pattern of the second basic pattern is generated through the same operation as S1006 described above with reference to (f) of FIG. 16 and (f) of FIG. 23.

(S1013) Generating First Basic Pattern

The first basic pattern is generated through the same operation as S1001 described above with reference to (a) of FIG. 16 and (a) of FIG. 23.

(S1014) Generating Second Basic Pattern and First Rotation Pattern

The first rotation pattern of the first basic pattern is generated through the same operation as S1002 described above with reference to (b) of FIG. 16 and (b) of FIG. 23.

(S1015) Generating Second Basic Pattern and First Rotation Pattern

The second rotation pattern of the first basic pattern is generated through the same operation as S1003 described above with reference to (c) of FIG. 16 and (c) of FIG. 23.

(S1016) Generating Second Basic Pattern and First Rotation Pattern

The third rotation pattern of the first basic pattern is generated through the same operation as S1004 described above with reference to (d) of FIG. 16 and (d) of FIG. 23.

In a case in which the second basic pattern is generated earlier, the advantageous effects of the wedgelet pattern generation section 145T4 are the same as those of the case in which the first basic pattern is generated earlier. That is, the wedgelet pattern generation section 145T4 according to the embodiment does not generate all of the wedgelet patterns through a line segment drawing process and a region filling process performed using the line segment drawing section 1462 and the region filling section 1463 and generates some of the wedgelet patterns through a rotation process performed using the rotation pattern generation section 1565. Since the line segment drawing process and the region filling process in which a processing amount is large are substituted with a rotation process in which the processing amount is small, the advantageous effect of reducing the processes is obtained.

[Wedge Pattern Table 145T5]

The wedge pattern table 145T5 records the wedge pattern table WedgePatternTable according to the block size supplied from the wedgelet pattern generation section 145T4.
(Operations and Advantageous Effects)

The wedgelet pattern generation section 145T4 included in the moving image decoding device 1 according to the above-described embodiment does not generate all of the wedgelet patterns through a line segment drawing process and a region filling process performed using the line segment drawing section 1462 and the region filling section 1463 and generates some of the wedgelet patterns through a rotation process performed using the rotation pattern generation section 1565. Since the line segment drawing process and the region filling process in which a processing amount is large are substituted with a rotation process in which the processing amount is small, the advantageous effect of reducing the processes is obtained.

The line segment drawing section 1462 included in the moving image decoding device 1 according to the above-described embodiment sets 1 in the coordinates (xPos>>refShift, yPos>>refShift) obtained by shifting, to the right side by refShift, the coordinates (xPos, yPos) of the line segment obtained from the starting point (xS, yS) and the ending point (xE, yE) on the expanded block with the size patternSize<<refShift obtained by shifting the wedgelet pattern size patternSize to the left side by refShift, and thus it is possible to obtain the advantageous effect of preventing the memory size used for the line segment drawing process from increasing.

It is possible to obtain the advantageous effect that the wedgelet pattern generation section 145T4' included in the moving image decoding device 1 according to the above-described embodiment can easily generate the pattern in which the top left of the wedgelet pattern is normally 1 (or normally 0) using the rotation pattern generation section 1465' for inversion along with rotation (in the case of formula R2). Alternatively, by using the rotation pattern generation section 1465' for inversion along with rotation, it is possible to easily generate the pattern in which the top left of the wedgelet pattern is 1 (or normally 0) in many cases (in the case of formula R3).

The region filling section 1463 included in the moving image decoding device 1 according to the above-described embodiment searches for a pixel in which a pattern is 1 and sets continuous pixels to 1 when there is the pixel in which the pattern is 1. Thus, it is possible to obtain the advantageous effect of commonly using one region filling process without using a different region filling process for each wedgelet pattern to be derived.

The pattern storage section 1464" of the wedgelet pattern generation section 145T4" included in the moving image decoding device 1 according to the above-described embodiment performs the matching determination on only the basic patterns and storing the rotation patterns without performing the matching determination. Therefore, it is possible to obtain the advantageous effect of reducing a processing amount.

(Modification Example of Wedgelet Pattern Generation Section 145T4)

Hereinafter, a wedgelet pattern generation section 145T4B which is a modification example of the wedgelet pattern generation section 145T4 will be described.

Figure 30:
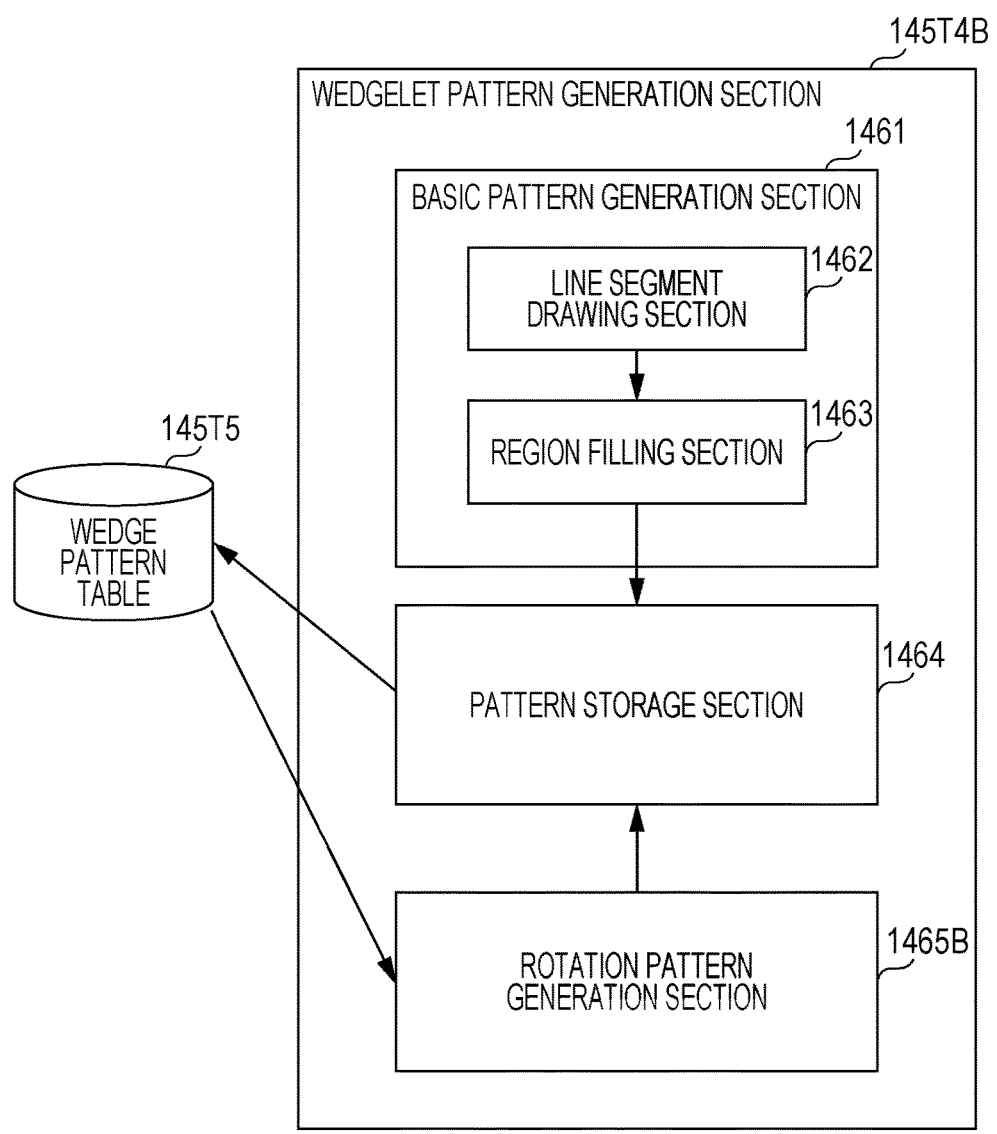
FIG. 30 is a block diagram illustrating the configuration of a wedgelet pattern generation section 145T4B according to the embodiment.

As illustrated in FIG. 30, the wedgelet pattern generation section 145T4B is configured to include a basic pattern generation section 1461, a pattern storage section 1464, and a rotation pattern generation section 1565B, as in wedgelet pattern generation section 145T4. The basic pattern generation section 1461 is configured to include a line segment drawing section 1462 and a region filling section 1463.

FIG. 31 is a diagram illustrating a wedgelet pattern generation process in the wedgelet pattern generation section 145T4. As illustrated in (a) of FIG. 31, in the wedgelet pattern generation section 145T4B according to the embodiment, the basic pattern generation section 1461 generates a wedgelet pattern set that forms the first basic pattern. Next, as illustrated in (b), the rotation pattern generation section 1465B generates a first rotation pattern of the first basic pattern (first rotation pattern) which is a wedgelet pattern set by rotating an individual wedgelet pattern included in the first basic pattern which is a immediately previously generated wedgelet pattern set. Next, as illustrated in (c), the rotation pattern generation section 1465B generates a second rotation pattern of the first basic pattern (second rotation pattern) which is a wedgelet pattern set by rotating an individual wedgelet pattern included in the first rotation pattern of the first basic pattern which is a immediately previously generated wedgelet pattern set. Next, as illustrated in (d), the rotation pattern generation section 1465B generates a third rotation pattern of the first basic pattern (third rotation pattern) by rotating an individual wedgelet pattern included in the second rotation pattern of the first basic pattern which is a immediately previously generated wedgelet pattern set. Further, as illustrated in (e) of FIG. 31, in the wedgelet pattern generation section 145T4B according to the embodiment, the basic pattern generation section 1461 generates a wedgelet pattern set that forms the second basic pattern. Next, as illustrated in (f), the rotation pattern generation section 1465B generates a first rotation pattern of the second basic pattern (fourth rotation pattern) which is a wedgelet pattern set by rotating an individual wedgelet pattern included in the second basic pattern which is a immediately previously generated wedgelet pattern set. In the embodiment, to generate the first rotation pattern, the second rotation pattern, the third rotation pattern, and the fourth rotation pattern, the rotation pattern generation section 1465B may perform clockwise rotation of, for example, 90 degrees. However, rotation of 270 degrees may be performed rather than 90 degrees.

FIG. 32 is a flowchart illustrating an operation of the wedgelet pattern generation section 145T4B.

(S0101) A variable posStart is set to 0.

(S0102) A loop related to the wedge orientation wedgeOri starts. Then, 0, 1, 2, 3, 4, and 5 are set in order in the wedge orientation wedgeOri and processes from S0103 to S0114 are performed.

(S0103) The number of wedge patterns NumWedgePattern at the present time point is set in the variable posStart (also referred to as posWedgePattern).

(S0104) In a case in which the wedge orientation wedgeOri is the basic pattern, that is, a case in which wedgeOri=0 or wedgeOri=4, the process transitions to S0105 to generate each wedgelet pattern of the wedge orientation wedgeOri through the line segment drawing process and the region filling process. In a case in which the wedge orientation wedgeOri is a pattern other than the basic pattern (wedgeOri=1, 2, 3, and 5), the process transitions to S0109 to generate the wedgelet pattern through a rotation process.

(S0105) A loop related to variables m and n for controlling a starting point position and an ending point position starts. Loop variables are assumed to be m and n. Hereinafter, the processes from S0106 to S0108 are performed on m and n of m=0 to wBlkSize−1 and n=0 to wBlkSize−1. Thus, the wedgelet patterns are generating while changing the starting and ending points of the wedge orientation wedgeOri. In addition, wBlkSize is a block size (virtual block size). As will be described below and will be described below in a modification example of the basic pattern generation section 1461, the processes from S0106 to S0108 are performed on m and n of m=0 to (wBlkSize/sizeScaleS)−1 and n=0 to (wBlkSize/sizeScaleE)−1.

(S0106) the line segment drawing section 1462 draws a line segment and the region filling section 1463 fills a region to generate a wedgelet pattern which is a basic pattern with the starting and ending points indicated by the variables m and n and the wedge orientation wedgeOri. Specifically, the basic pattern generation section 1461 derives the starting point (xS, yS) and the ending point (xE, yE) by the following formulae.

$$xS=m$$

$$yS=0$$

$$xE=(\text{wedgeOri}==0)?0:n$$

$$yE=(\text{wedgeOri}==0)?n:w\text{BlkSize}-1$$

The basic pattern generation section 1461 may derive the starting point (xS, yS) and the ending point (xE, yE) by the following formulae, as will be described below as a modification example.

$$xS=m*\text{sizeScaleS}$$

$$yS=0$$

$$xE=(\text{wedgeOri}==0)?0:\text{sizeScale}E$$

$$yE=(\text{wedgeOri}==0)?n*\text{sizeScale}E:w\text{BlkSize}-1$$

In addition, sizeScaleS and sizeScaleE are variables for changing the starting and ending points at the intervals of sizeScaleS and sizeScaleE, respectively, and are derived by the following formulae.

$$\text{sizeScale}S=(\log 2\text{BlkSize}>3)?2:1$$

$$\text{sizeScale}E=(\text{wedgeOri}<4\&\&\log 2\text{BlkSize}>3)?2:1$$

Here, log 2BlkSize is a logarithm of the block size to base 2.

(S0107) When the generated wedgelet pattern satisfies a predetermined condition, the wedgelet pattern is stored in the wedge pattern table 145T5. In a case in which the wedgelet pattern is stored, the number of wedge patterns NumWedgePattern increases by 1.

(S0108) The loop related to the variables m and n for controlling the starting point position and the ending point position ends.

(S0109) The number of wedge patterns NumWedgePattern−1 at the current time point is set in posEnd.

(S0110) A loop related to the index pos of the reference pattern starts. A range of pos is a range from posStart to posEnd.

(S0111) The rotation pattern generation section 1465B generates the wedgelet pattern which is a rotation pattern using the wedgelet pattern indicated by pos stored in the wedge pattern table 145T5 as the reference wedgelet pattern.

(S0112) When the generated wedgelet pattern satisfies the predetermined condition, the wedgelet pattern is stored in the wedge pattern table 145T5. In a case in which the wedgelet pattern is stored, the number of wedge patterns NumWedgePattern increases by 1.

(S0113) The loop related to the index pos of the reference pattern ends.

(S0114) The loop related to the wedge orientation wedgeOri ends.

Here, the predetermined condition is that the matching determination C1 or C2 is performed in the pattern storage section 164 and the stored wedgelet pattern is not overlapped with the generated wedgelet pattern as a result.

As described above, in the operation of the basic pattern generation section 1461, the starting point (xS, yS) and the ending point (xE, yE) are set in the variable m that takes each value in the range from 0 to wBlkSize−1 and the variable n that takes each value in the range from 0 to wBlkSize−1 in wedgeOri=0 (the first basic pattern) and wedgeOri=4 (the second basic pattern), and each pattern is derived by the line segment drawing section 1462 and the region filling section 1463. Since the line segment drawing section 1462 and the region filling section 1463 have been described above, the line segment drawing section 1462 and the region filling section 1463 will not be described.

(Modification Example of Basic Pattern Generation Section)

The basic pattern generation section 1461 may change a unit used to generate a wedge rate table as a modification example in addition to the above-described method. Specifically, the variable m that takes each value in a range from 0 to (wBlkSize/sizeScaleS)−1 and the variable n that takes each value in a range from 0 to (wBlkSize/sizeScaleE)−1 are set, and the starting points (xS, yS), and the ending point (xE, yE) are derived by the following formulae.

$xS=m*sizeScaleS$ $yS=0$ $xE=(wedgeOri==0)?0:sizeScaleE$ $yE=(wedgeOri==0)?n*sizeScaleE:wBlkSize-1$ At this time, sizeScaleS and sizeScaleE are variables for processing a generation unit (thinning). The line segment drawing section 1462 and the region filling section 1463 draw a line segment and fill a region using a starting point changed in a sizeScaleS unit and an ending point changed in a sizeScaleE unit to derive a wedgelet pattern.

(Rotation Pattern Generation Section 1465B)

As illustrated in FIG. 31, the rotation pattern generation section 1465B generates a rotation pattern by reading the wedgelet pattern stored in the wedge pattern table 145T one by one and rotating the wedgelet pattern (equivalent to S0110 to S0113 of FIG. 32). Specifically, a rotated pattern wedgePattern[ ][ ] is derived using each WedgePatternTable [log 2BlkSize][pos] designated by pos from startPos to endPos in the wedge pattern table 145T as a reference pattern refPattern[ ][ ].

The rotation pattern generation section 1465B included in the wedgelet pattern generation section 145T4B will be described. The above-described rotation pattern generation section 1465 has rotations of 90 degrees, 180 degrees, and 270 degrees, but the rotation pattern generation section 1465B according to the embodiment has only one rotation direction (specifically, 90 degrees or 270 degrees).

The rotation pattern generation section 1465B according to the embodiment performs a rotation process of 90 degrees indicated by the following process. As described above in the process ROT90, this case is equivalent to a case in which cInc=0 and sInc=1 are set in the process ROT described in the rotation pattern generation section 1465. Here, a case of formula R1 in which inversion is not performed at the time of deriving the rotation pattern wedgePattern[x][y] from the reference pattern will be described. However, formula R2 or R2' in which the reference pattern refPattern[i][j] is inverted according to the condition or formula R3 in which the reference pattern is normally inverted may be used.

(Process ROT90)

```
for (y = 0; y < patternSize; y++)
    for (x = 0; x < patternSize; x++) {
        i = y
        j = patternSize − 1 − x
        wedgePattern[x][y] = refPattern[i][j]        formula R1
    }
```

Since the reference pattern refPattern=wedgePatternTable [log 2BlkSize][pos], a reference process and a rotation process of the reference pattern refPattern included in the wedge pattern table are simultaneously expressed as follows. Here, an example is indicated in which formula R3 (formula R3') that normally inverts the reference pattern refPattern[i][j] (where i=y and j=patternSize−1−x) is used at the time of deriving the rotation pattern wedgePattern[x][y] from the reference pattern refPattern[i][j].

```
for (y = 0; y < patternSize; y++)
    for (x = 0; x < patternSize; x++) {
        WedgePattern[x][y] = 1 −
        WedgePatternTable[log2BlkSize][pos][y][patternSize − 1 − x]
        formula R3'
    }
```

Instead of formula R3 (formula R3') that normally inverts a pattern to be referred to, formula R1 that does not invert a pattern or formula R2 or R2' that inverts a pattern according to a condition may be used. In a case in which formula R2' is used, iOffset=0 and jOffset=patternSize−1 are satisfied in cInc=0 and sInc=1. Therefore, the following formula R2B' obtained by substituting iOffset and jOffset to formula R2' is used.

$wedgePattern[x][y]=refPattern[0][patternSize-1]==0?refPattern[i][j]:1-refPattern[i][j]$   formula R2B'

Instead of the foregoing process, the rotation pattern generation section 1465B may perform a rotation process of 270 degrees indicated by the following process, as described above in the process ROT270 (a rotation pattern generation section 1465C). This case is equivalent to a case in which cInc=0 and sInc=−1 are set in the process ROT described in the rotation pattern generation section 1465.

```
for (y = 0; y < patternSize; y++)
    for (x = 0; x < patternSize; x++) {
        i = patternSize − 1 − y
        j = x
        wedgePattern[x][y] = −refPattern[i][j]    formula R3
    }
```

Instead of formula R3, formula R1, R2, or R2' described above may be used. In the case of formula R2', iOffset=patternSize−1 and jOffset=0 are satisfied in cInc=0 and sInc=−1. Therefore, the following formula R2C' obtained by substituting iOffset and jOffset to formula R2' is used.

wedgePattern[$x$][$y$]=refPattern[patternSize− 1][0]==0?refPattern[$i$][$j$]:1−refPattern[$i$][$j$]    formula R2C'

A rotation process of 270 degrees in a case in which formula R3 that normally inverts a pattern to be referred is used is as follows.

```
for (y = 0; y < patternSize; y++)
    for (x = 0; x < patternSize; x++) {
        WedgePattern[x][y] = 1 −
    WedgePatternTable[log2BlkSize][pos][patternSize − 1 − y][x]
        formula R3 (formula R3")
    }
```

The wedgelet pattern generation section 145T4B according to the above-described embodiment does not generate all of the wedgelet patterns through a line segment drawing process and a region filling process performed using the line segment drawing section 1462 and the region filling section 1463 and generates some of the wedgelet patterns through a rotation process performed using the rotation pattern generation section 1565B. Since the line segment drawing process and the region filling process in which a processing amount is large are substituted with a rotation process in which the processing amount is small, the advantageous effect of reducing the processes is obtained. Further, since the rotation pattern generation section 1565B performs a process of only rotation of a single angle (here, 90 degrees or 270 degrees), it is possible to obtain the advantageous effect that a necessary rotation process is easy.

[Moving Image Coding Device]

Figure 29:
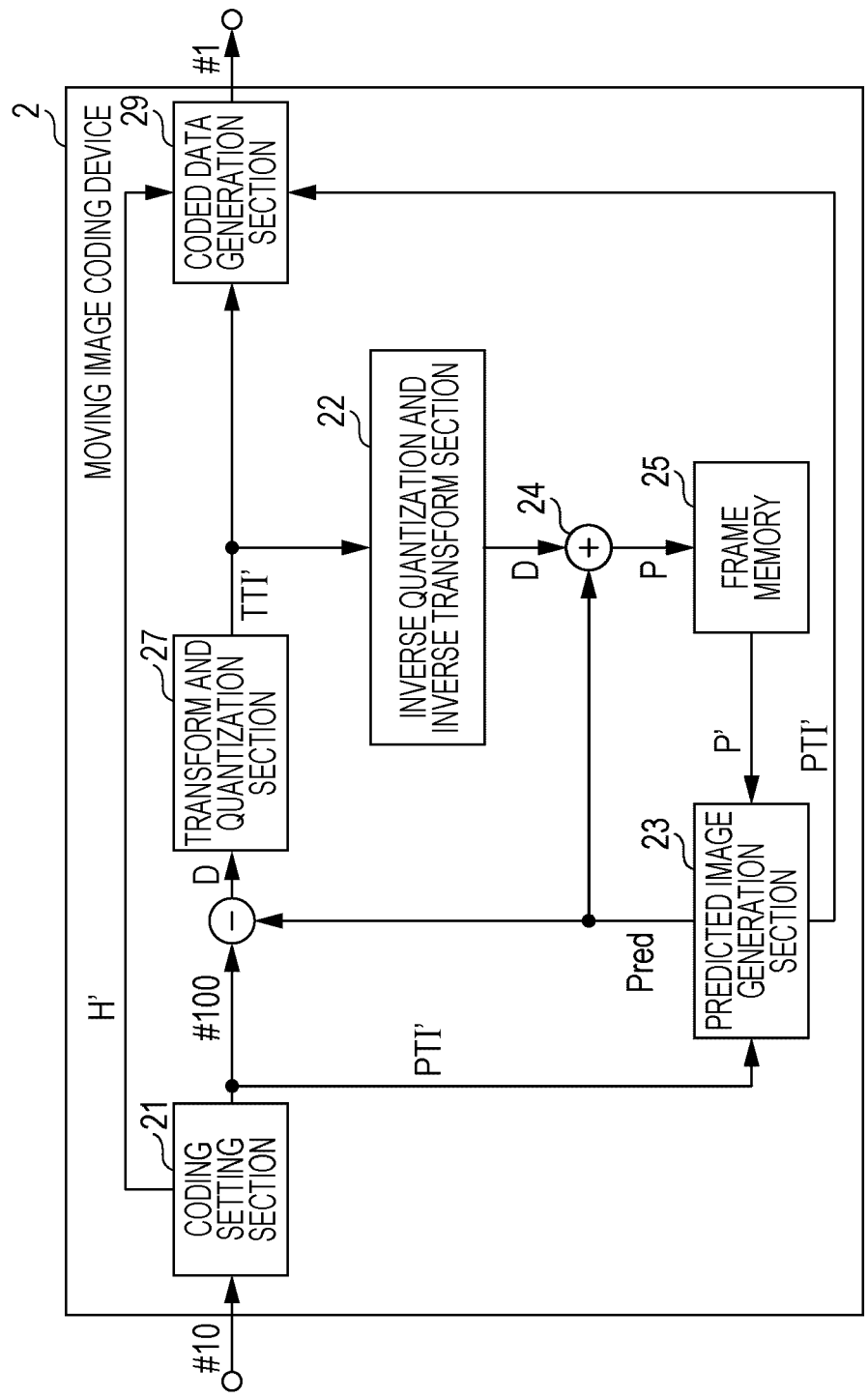
FIG. 29 is a functional block diagram illustrating the configuration of a moving image coding device according to an embodiment of the invention.

Hereinafter, the moving image coding device 2 according to the embodiment will be described with reference to FIG. 29.

(Overview of Moving Image Coding Device)

Roughly speaking, the moving image coding device 2 is a device that generates the coded data #1 by coding an input image #10 and outputs the coded data #1. Here, the input image #10 is a layer image that is formed by one or a plurality of viewpoint images TexturePic and a depth map DepthPic of the same time corresponding to the viewpoint image TexturePic.

(Configuration of Moving Image Coding Device)

First, an example of the configuration of the moving image coding device 2 will be described with reference to FIG. 29. FIG. 29 is a functional block diagram illustrating the configuration of the moving image coding device 2. As illustrated in FIG. 29, the moving image coding device 2 includes a coding setting section 21, an inverse quantization and inverse transform section 22, a predicted image generation section 23, an addition section 24, a frame memory 25, a subtraction section 26, a transform and quantization section 27, and a coded data generation section 29.

The coding setting section 21 generates image data and various kinds of setting information related to the coding based on the input image #10.

Specifically, the coding setting section 21 generates subsequent image data and setting information.

First, the coding setting section 21 generates a CU image #100 in regard to the target CU by sequentially separating the input image #10 in the slice unit, the tree block unit, and the CU unit.

The coding setting section 21 generates header information H' based on a result of the partition process. The header information H' includes (1) information regarding the size and shape of a tree block belong to a target slice and the position of the tree block in the target slice and (2) CU information CU' regarding the size and shape of the CU belonging to each tree block and the position of the CU in the target tree block.

The coding setting section 21 further generates PT setting information PTI' with reference to the CU image #100 and the CU information CU'. The PT setting information PTI' includes (1) a partition pattern allocatable to each PU of the target CU and (2) information regarding all combinations of the prediction modes allocated to each PU.

The coding setting section 21 supplies the CU image #100 to the subtraction section 26. The coding setting section 21 supplies the header information H' to the coded data generation section 29. The coding setting section 21 supplies the PT setting information PTI' to the predicted image generation section 23.

The inverse quantization and inverse transform section 22 restores the prediction residual for each block by executing inverse quantization and inverse orthogonal transform the quantized prediction residual of each block supplied from the transform and quantization section 27. Since the inverse orthogonal transform has been described above in the inverse quantization and inverse transform section 13 illustrated in FIG. 3, the description thereof will be omitted here.

The inverse quantization and inverse transform section 22 integrates the prediction residuals of the blocks according to the partition pattern designated by the TT partition information (to be described later) to generate a prediction residual D in regard to the target CU. The inverse quantization and inverse transform section 22 supplies the generated prediction residual D in regard to the target CU to the addition section 24.

The predicted image generation section 23 generates a predicted image Pred in regard to the target CU with reference to the decoded image P' and the PT setting information PTI' recorded on the frame memory 25. The predicted image generation section 23 sets the prediction parameters obtained through the predicted image generation process in the PT setting information PTI' and transmits the set PT setting information PTI' to the coded data generation section 29. Since the predicted image generation process executed by the predicted image generation section 23 is the same as that of the predicted image generation section 14 included in the moving image decoding device 1, the description thereof will be omitted here. That is, the predicted image generation section 14 includes the DMM prediction section 145T configured to include the wedge pattern derivation section 145T2 and the DC prediction value derivation section 145T3. The DMM prediction section 145T includes the wedgelet pattern generation section 145T4. The wedgelet pattern generation section 145T4 is configured to include the basic pattern generation section 1461, the pattern storage section 1464, and the rotation pattern generation section 1565, and the basic pattern generation section 1461 is configured to include the line segment drawing section 1462 and the region filling section 1463. Instead of the wedgelet pattern generation section 145T4, the wedgelet pattern generation section 145T4' or the wedgelet pattern generation section 145T4' may be used. Instead of the wedgelet pattern generation section 145T4, the wedgelet pattern generation section 145T4B including the above-described rotation pattern generation section 1465B may be used.

The addition section 24 generates a decoded image P in regard to the target CU by adding the predicted image Pred supplied from the predicted image generation section 23 and the prediction residual D supplied from the inverse quantization and inverse transform section 22.

The decoded images P are sequentially recorded on the frame memory 25. The decoded images corresponding to all of the tree blocks (for example, all of the tree blocks previous in a raster scan procedure) decoded earlier than the target tree block are recorded at a time point at which the target tree block is decoded on the frame memory 25.

The subtraction section 26 generates the prediction residual D in regard to the target CU by subtracting the predicted image Pred from the CU image #100. The subtraction section 26 supplies the generated prediction residual D to the transform and quantization section 27.

The transform and quantization section 27 generates a quantized prediction residual D by executing orthogonal transform and quantization. Here, the orthogonal transform refers to transform to a frequency domain from a pixel region. Examples of inverse orthogonal transform include a discrete cosine transform (DCT transform) and discrete sine transform (DST transform).

Specifically, the transform and quantization section 27 decides the partition pattern to one or a plurality of blocks of the target CU with reference to the CU image #100 and the CU information CU'. The prediction residual D is partitioned into prediction residuals of the blocks according to the decided partition pattern.

The transform and quantization section 27 generates a quantized prediction residual of each block by generating the prediction residual in a frequency domain through orthogonal transform on the prediction residual in regard to each block and subsequently quantizing the prediction residual in the frequency domain. In a case in which the SDC flag is 1, the transform and quantization section 27 omits the frequency conversion and the quantization and sets the prediction residual D (or resSamples[x][y]) for each pixel of the target TU to 0.

The transform and quantization section 27 generates TT setting information TTI' including the generated quantized prediction residual of each block, the TT partition information for designating the partition pattern of the target CU, and information regarding all of the possible partition patterns to the blocks of the target CU. The transform and quantization section 27 supplies the generated TT setting information TTI' to the inverse quantization and inverse transform section 22 and the coded data generation section 29.

The coded data generation section 29 codes the header information H', the TT setting information TTI', and the PT setting information PTI', multiplex the coded header information H, the TT setting information TTI, and the PT setting information PTI to generate the coded data #1, and outputs the coded data #1.

(Operations and Advantageous Effects)

The wedgelet pattern generation section 145T4 included in the moving image coding device 2 according to the above-described embodiment does not generate all the wedgelet patterns through the line segment drawing process and the region filling process performed using a line segment drawing section 1462 and a region filling section 1463, but generates some of the wedgelet patterns through a rotation process performed using the rotation pattern generation section 1565. Since the line segment drawing process and the region filling process in which a processing amount is large are substituted with a rotation process in which the processing amount is small, the advantageous effect of reducing the processes is obtained.

The line segment drawing section 1462 included in the moving image coding device 2 according to the above-described embodiment sets 1 in the coordinates (xPos>>refShift, yPos>>refShift) obtained by shifting, to the right side by refShift, the line segment coordinates (xPos, yPos) obtained from the starting point (xS, yS) and the ending point (xE, yE) on the expanded block with the size patternSize<<refShift obtained by shifting the wedgelet pattern size patternSize to the left side by refShift, and thus it is possible to obtain the advantageous effect of preventing the memory size used for the line segment drawing process from being increased.

The wedgelet pattern generation section 145T4' included in the moving image coding device 2 according to the above-described embodiment obtain the advantageous effect that the line segment drawing section 1462 and the rotation pattern generation section 1465' can easily generate the pattern in which the top left of the wedgelet pattern is normally 1 (or normally 0) (in the case of formula R2) or can easily generate the pattern in which the top left of the wedgelet pattern is 1 in many cases (or normally 0) by using inversion along with rotation (in the case of formula R3).

The region filling section 1463 included in the moving image coding device 2 according to the above-described embodiment searches a pixel in which the pattern is 1 and sets 1 in continuous pixels when there are the pixels in which the pattern is 1. Thus, it is possible to obtain the advantageous effect that one region filling process can be used without using the region filling process different from each wedgelet pattern to be derived.

The pattern storage section 1464" of the wedgelet pattern generation section 145T4" included in the moving image coding device 2 according to the above-described embodiment performs the matching determination on only the basic pattern and stores the rotation pattern without performing the matching determination, and thus it is possible to obtain the advantageous effect of reducing a processing amount.

The wedgelet pattern generation section 145T4B included in the moving image coding device 2 according to the above-described embodiment performs the matching determination on only the basic pattern and stores the rotation pattern without performing the matching determination, and thus it is possible to obtain the advantageous effect of reducing a processing amount.

A part of the moving image decoding device 1 or the moving image coding device 2 according to the above-described embodiment may be realized by a computer. In this case, a program realizing the control function may be recorded on a computer-readable recording medium and a computer system may be caused to read and execute the program recorded on the recording medium. The "computer system" stated herein is a computer system embedded in either the moving image decoding device 1 or the moving image coding device 2 and is assumed to include hardware such as an OS or a peripheral device. The "computer-readable recording medium" refers to a portable medium such as a flexible disc, a magneto-optical disc, a ROM, or a CD-ROM or a storage device such as a hard disk embedded in a computer system. Further, the "computer-readable recording medium" may include a recording medium that retains a program dynamically for a short time, such as a communication line in a case in which a program is transmitted via a network such as the Internet or a communication line such as a telephone line or a recording medium that retains a program for a fixed time, such as a volatile memory inside a computer system serving as a server or a client in this case. The program may be a program that realizes some of the above-described functions or may be a program that is realized by combining the above-described functions with a program already recorded on a computer system.

Parts or both of the moving image decoding device 1 and the moving image coding device 2 according to the above-described embodiment may be realized as an integrated circuit such as a large scale integration (LSI). Each of the functional blocks of the moving image decoding device 1 and the moving image coding device 2 may be individually processed or some or all of the functional blocks may be integrated to be processed. An integrated circuit system is not limited to an LSI, but may be realized as a dedicated circuit or a general processor. In a case in which an integrated circuit technology with which an LSI is substituted with an advance in semiconductor technologies appears, an integrated circuit may be used in accordance with this technology.

[Supplements]

According to an aspect of the invention, in a DMM prediction device that includes DC prediction value derivation means for deriving a prediction value for each wedge pattern derived by wedgelet pattern generation means and for each region partitioned from the wedge pattern, the wedgelet pattern generation means includes the basic pattern generation section that generates a basic pattern and the rotation pattern generation section that derives a rotation pattern.

According to the aspect of the invention, the basic pattern generation section is configured to include the line segment drawing section and the region filling section.

According to the aspect of the invention, the rotation pattern generation section generates a target wedgelet pattern from an input reference wedgelet pattern and derives a value of the target wedgelet pattern at coordinates (x, y) using a value of the reference wedgelet pattern at coordinates (i, j) obtained by converting the coordinates (x, y) with a rotation matrix.

According to the aspect of the invention, the rotation pattern generation section uses a value obtained by inverting the value of the reference wedgelet pattern on the coordinates (i, j) as the value of the target wedgelet pattern.

According to the aspect of the invention, the first and second basic patterns are generated by the basic pattern generation section. The wedgelet patterns are generated from the first rotation pattern of the first basic pattern, the second rotation pattern of the first basic pattern, and the third rotation pattern of the first basic pattern generated from the first basic pattern by the rotation pattern generation section and are generated from the first rotation pattern of the second basic pattern generated from the second basic pattern by the rotation pattern generation section.

According to the aspect of the invention, the rotation pattern generation section derives the rotation pattern using the wedgelet pattern between the starting and ending points set in the basic pattern setting section as an input.

According to the aspect of the invention, the line segment drawing section sets 1 in the coordinates (xPos>>refShift, yPos>>refShift) obtained by shifting, to the right side by refShift, the coordinates (xPos, yPos) on the expanded block with the size patternSize<<refShift obtained by shifting the wedgelet pattern size patternSize to the left side by refShift.

According to the aspect of the invention, the region filling section searches for a pixel in which the pattern is 1 and sets 1 in continuous pixels when there are the pixels in which the pattern is 1.

According to the aspect of the invention, the pattern storage section that performs the matching determination on only the basic pattern and stores the rotation pattern without performing the matching determination is further included.

According to the aspect of the invention, the first and second basic patterns are generated by the basic pattern generation section, the rotation patterns, the first to fourth rotation patterns, are generated by the rotation pattern generation section, and the rotation pattern is generated based on an immediately previously generated pattern by the rotation pattern generation section.

According to the aspect of the invention, when the number of patterns before generation of a pattern of a certain group is a starting position posStart and the number of patterns−1 before generation of the rotation pattern is an ending position posEnd, the rotation pattern generation section in the DMM prediction device generates the rotation pattern by rotation by the rotation pattern generation section with reference to a pattern of each certain position pos from the starting position to the ending position.

According to the aspect of the invention, the rotation pattern generation section uses rotation of 90 degrees.

According to the aspect of the invention, with reference to a value refPattern[x+y][wBlkSize−1−x+y] of a reference pattern refPattern at a position (x+y, wBlkSize−1−x+y) obtained by converting coordinates (x, y) by rotation of 90 degrees, the rotation pattern generation section derives a value Pattern[x][y] of the rotation pattern at the position of (x, y).

According to the aspect of the invention, the rotation pattern generation section uses rotation of 270 degrees.

According to an aspect of the invention, an image decoding device includes the above-described DMM prediction device.

According to an aspect of the invention, an image coding device includes the above-described DMM prediction device.

The embodiment of the invention has been described above in detail with reference to the drawings, but specific configurations are not limited to the above-described configurations. Various designs can be changed within the scope without departing from the gist of the invention.

INDUSTRIAL APPLICABILITY

The invention can be applied to an image decoding device that decodes coded data obtained by coding image data and an image coding device that generates coded data by coding image data. The invention can also be appropriately applied to a data structure of coded data generated by the image coding device and referred to by the image decoding device.

REFERENCE SIGNS LIST 1 moving image decoding device (image decoding device)

11 variable-length decoding section
111 DC offset information decoding section
13 inverse quantization and inverse transform section
14 predicted image generation section
141 prediction unit setting section
142 reference pixel setting section
143 switch
144 reference pixel filtering section
145 predicted image derivation section
145D DC prediction section
145P planar prediction section
145A angular prediction section
145T DMM prediction section (DMM prediction device)
145T2 wedge pattern derivation section
145T3 DC prediction value derivation section
145T4, 145T4B wedgelet pattern generation section
145T5 wedge pattern table (buffer)
1461 basic pattern generation section
1462 line segment drawing section
1463 region filling section
1464, 1464', 1464" pattern storage section
1465, 1465', 1465", 1465B rotation pattern generation section
15 addition section
16 frame memory
2 moving image coding device (image coding device)
21 coding setting section
22 inverse quantization and inverse transform section
23 predicted image generation section
24 addition section
25 frame memory
26 subtraction section
27 transform and quantization section
29 coded data generation section

The invention claimed is:

1. An image decoding device that decodes an image, comprising:
wedge pattern derivation circuitry that derives a wedge pattern indicating a partition pattern of a target block based on at least a wedge pattern table, a block size and a wedge pattern index;
DC prediction value derivation circuitry that derives a predicted image using the partition pattern and a reference value; and
wedgelet pattern generation circuitry that derives a first wedgelet pattern and stores the first wedge let pattern into the wedge pattern table in a case that a value of a wedge orientation is equal to 0 or 4 and derives a second wedgelet pattern using the wedge pattern table in a case that the value of the wedge orientation is equal to 1, 2, 3, or 5,
wherein the value of the second wedgelet pattern with coordinates (x, y) is derived using a value of the wedge pattern table with associated coordinates (i, j),
wherein the associated coordinates (i, j) of the wedge pattern table are converted coordinates obtained by converting the coordinates (x, y) of the second wedgelet pattern, and
wherein the predicted image is used to generate a decoded image.

2. The image decoding device according to claim 1, wherein the wedgelet pattern generation circuitry includes line segment drawing circuitry and region filling circuitry.

3. The image decoding device according to claim 1, wherein the associated coordinates (i, j) of the wedge pattern table are set equal to the converted coordinates (y, patternSize−1−x), where patternSize is a block size of the second wedgelet pattern.

4. The image decoding device according to claim 1, wherein the wedgelet pattern generation circuitry derives the second wedgelet pattern by 1 minus a value of the first wedge pattern table.

5. The image decoding device according to claim 1, the wedgelet pattern generation circuitry sets a starting point (xS, yS) on a block to a first point (m*sizeScaleS, 0), where the sizeScaleS is a variable and sets an ending point (xE, yE) on the block to a second point (0, n*sizeScaleE) or a third point (sizeScaleE, wBlkSize−1) according to whether the value of the wedge orientation being equal to 0, where the sizeScaleE is a variable and the wBlkSize is a bock size.

6. The image decoding device according to claim 1, wherein the second wedgelet pattern is derived using an index, wherein the range of the index is a variable posStrat to the number of the wedge patterns minus 1 in the wedge pattern table.

* * * * *

UNITED STATES PATENT AND TRADEMARK OFFICE
CERTIFICATE OF CORRECTION

PATENT NO. : 10,244,256 B2  
APPLICATION NO. : 15/517429  
DATED : March 26, 2019  
INVENTOR(S) : Tomohiro Ikai et al.

Page 1 of 1

It is certified that error appears in the above-identified patent and that said Letters Patent is hereby corrected as shown below:

On the Title Page

Under item (30), please add the following:
-- Oct. 08, 2014 (JP) 2014-206955 --

Signed and Sealed this
Fourth Day of February, 2020

Andrei Iancu
*Director of the United States Patent and Trademark Office*